United States Patent [19]

Laurance et al.

[11] Patent Number: 4,860,352

[45] Date of Patent: Aug. 22, 1989

[54] SATELLITE COMMUNICATION SYSTEM AND METHOD WITH MESSAGE AUTHENTICATION SUITABLE FOR USE IN FINANCIAL INSTITUTIONS

[75] Inventors: Joel E. Laurance, Gaithersburg; Walter M. Stewart, Potomac, both of Md.

[73] Assignee: Satellite Financial Systems Corporation, Gaithersburg, Md.

[21] Appl. No.: 736,093

[22] Filed: May 20, 1985

[51] Int. Cl.$^4$ .............................................. H04K 9/00
[52] U.S. Cl. ..................................... 380/23; 342/357;
342/450; 342/457; 340/825.34; 455/5; 455/12;
364/408; 364/449
[58] Field of Search ............... 178/22.08, 22.09, 22.17;
343/357, 6.5 LC; 380/28, 48, 24, 25; 342/357,
455, 42, 44, 45, 46, 50, 450, 451, 454, 457, 463,
465; 340/825.34; 455/3, 5, 12; 364/408, 449

[56] References Cited

U.S. PATENT DOCUMENTS

| | | | |
|---|---|---|---|
| 3,906,204 | 9/1975 | Rigdon et al. ........................ | 343/357 |
| 4,077,005 | 2/1978 | Bishop ................................... | 380/49 |
| 4,359,733 | 11/1982 | O'Neill .......................... | 343/6.5 LC |
| 4,418,425 | 11/1983 | Fennel, Jr. et al. ............... | 178/22.17 |
| 4,423,287 | 12/1983 | Zeidler .............................. | 178/22.09 |
| 4,531,021 | 7/1985 | Bluestein et al. ................. | 178/22.08 |
| 4,531,023 | 7/1985 | Levine ............................... | 178/22.08 |

Primary Examiner—Salvatore Cangialosi
Assistant Examiner—Bernarr Earl Gregory
Attorney, Agent, or Firm—Laurence R. Brown; Alfred J. Managels

[57] ABSTRACT

A satellite communications system apparatus and method for authenticating data transmissions uses the position of the transmitter, which position is determined by the satellite communications system. The transmitter position information is appended to the message (which can be either clear text or encrypted), which is sent to the receiver at a second location by the satellite system. A receiver can then authenticate the received message by comparing the received transmitter position with stored transmitter position information. The mobile transceiver syncing versions of the present invention allow the transceiver to be mobile, as opposed to being stationary. In this mobile version, each succeeding message is encrypted using the previous position of the mobile transceiver. Examples of transceivers implementing the apparatus and method of the present invention are shown, as are the specific vertical market applications of financial networks and automatic weather observation and reporting systems. In each version of the present invention, the determination of the location of the transmitter for each message that is received introduces an independently verifiable authentication parameter.

51 Claims, 36 Drawing Sheets

SATELLITE COMMUNICATION SYSTEM AND METHOD WITH MESSAGE AUTHENTICATION SUITABLE FOR USE IN FINANCIAL INSTITUTIONS

BACKGROUND OF THE INVENTION

1. Field of the Invention

The present invention relates to satellite communications systems and methods having message authentication.

2. Related Art

Telecommunications and computers have revolutionized modern society In the past, information was exchanged by much slower methods, such as letters and written documents. Business records were kept using manual systems The information used in these manual systems typically was stored on paper, which was locked up and kept secure from unauthorized users.

Telecommunications and computers have produced an incredible increase in efficiency and productivity. It is for these reasons that experts believe that the proliferation of telecommunications and computers into all aspects of modern life will continue to accelerate in the future. Such technology literally will permeate society in the not too distant future.

The so-called electronic office is predicated to be commonplace within the next five years in major corporations in the industrialized world. Such an electronic office will allow users to access vast amounts of information stored in centralized electronic databases. These electronic databases will replace the manual files used in the past. Remote terminals located throughout the corporation or entity having the system will allow individuals to communicate between terminals and with the centralized data bank. Electronic mail will become extremely commonplace, replacing the written documents that are mailed today. Communications will be almost instantaneous. The vital information relating to the business or entity owning the system will be available to unauthorized users who can gain access into such systems.

Communications and telecommunications have also had a profound impact on merchandising of products and services. Terminals can be located at geographically separated locations where retail stores or service offices are located. They can communicate with each other and with central administration and shipping sites via electronic networks. This allows the accounting and inventory functions to be performed substantially in real-time. Again, if an unauthorized user can gain access into such a system, he or she will be able to steal information or products from the owner of the system.

Perhaps one of the industries most affected by these advances in telecommunications and computers is the financial industry. These two technologies have spawned many new financial services, such as automatic teller machines (ATMs) and electronic fund transfers (EFTs). These technologies have introduced new scales of efficiency. They have improved the speed and integrity of almost all financial transactions. However, many people believe that these technologies have also produced a concomitant increase in the vulnerability of the financial industry to sophisticated thieves, who are able to gain unauthorized access into the financial network through these electronic systems. It is essential that the financial information communicated over these electronic networks be secure and accurate.

It is commonplace today for banks to transfer large amounts of money very rapidly using electronic fund transfer systems. General consumer transactions involving banking customers increasingly are using these electronic systems, due to the cost savings that are obtained by eliminating the manual help used previously.

However, all of these financial data transactions conducted over these electronic systems are subject to unauthorized modification, disclosure or use. Such invasion of the communication path of the electronic network by an unauthorized user or party may be labeled as either an "active" or "passive" attack.

An active attack is one in which the unauthorized party modifies data traveling along the communications path or link, or injects a fraudulent simulation of a valid communication from a point along the communications path or link. An active attack may also result where the communications channel or link itself introduces distortion into the transmitted information, which is not detected by the receiving station. Any of these occurrences results in improper information being received by the receiving station. If the receiving station should act upon this information, the result can be a loss to the owner of the system. Obviously, with the vast amounts of money that are being exchanged over these electronic systems daily, this problem becomes particularly acute when the system is being attacked by a sophisticated thief who is able not only to steal the money, but to make it appear that the money has not been stolen.

A passive attack, on the other hand, is one in which the unauthorized party intercepts information traveling along the communications path or link without altering the information. In certain financial situations, a passive attack is not of very great concern because the unauthorized listener cannot modify the information being exchanged to produce a desired result. However, many times very confidential information is exchanged over these electronic networks. If an unauthorized party is able to obtain this information surreptitiously, he or she may be able to use it for his or her gain and to the detriment of the rightful owner of this information. This can occur, for example, in financial transactions that are very time-sensitive, such as mergers and acquisitions, where the unauthorized user can make vast sums of money by buying stock right before such business deals are announced. Also, oftentimes confidential information concerning new products or services are exchanged from various sites within the network. A competitor who can obtain this information will be at an advantage, particularly if this information is obtained without detection.

Traditionally, both active and passive attacks on telecommunications networks or systems have been guarded against by encrypting the data that is transmitted. Considerable work has been done to develop elaborate encryption schemes that are allegedly resistant to both active and passive attack. Another approach that has been used is that of access codes. Access codes are used to identify valid communications and to prevent an unauthorized party from entering the communications network. Often these access codes are changed periodically.

As a general rule, the more complex the encryption scheme or the access code, the more difficult it is for an unauthorized user to break or obtain it. However, it is also a general rule that with a sufficient amount of time and computer power, most encryption schemes and access codes can be broken. Further, access codes oftentimes can be stolen and used by unauthorized parties without detection. It literally has become a cat and mouse game, with the owner of the electronic system constantly trying to make it more difficult for unauthorized users to infiltrate the electronic system, and with the unauthorized users becoming increasingly more sophisticated as they overcome the obstacles set before them.

The complexity of the traditional methods of encryption and access codes has also been increased by the increase in the complexity of the communications systems or networks themselves. The rapid proliferation of the microcomputer has been followed with the concept of a microcomputer network. In essence, this allows microcomputers to be linked to each other over a common communications network. This network can be connected to more powerful main frame computers and to other electronic devices and peripherals. What results is a communications network having hundreds to thousands of remote terminals all connected to each other electronically. These terminals can communicate with each other simultaneously or approximately simultaneously in real time.

These advances in communications networking have resulted in communications systems being established throughout the world. With such geographic dispersion of remote computer locations, the satellite has come into play as an important communications tool. However, the introduction of satellite communication systems causes new problems relating to security and accuracy. Satellite communication channels are exposed both to active and passive attack. A satellite communications channel comprises at least two communication links: the first is the uplink from the transmitter or source of information to the satellite; and, the second is the downlink from the satellite to the remote receiver. Information in the satellite communication channel can be intercepted simply by positioning an antenna within the broadcast range of the downlink transmission.

Similarly, unauthorized information may be injected into the communications path simply by introducing a transmission anywhere along the path of the uplink or the downlink. Thus, it is seen that a satellite communications system is particularly susceptible to an active attack. To prevent active attack on a satellite communications network, it is known to provide each user of the network with an access or identification code. This access or identification code must be verified by a receiver before the information on the communications path or link will be recognized as valid. In this manner, an unauthorized user will be prevented from interjecting information without an access code.

Similarly, both active and passive attack may be inhibited by encrypting the data to be transmitted. In this manner, an unauthorized user who intercepts the communications will not be able to decipher the information from the satellite system without the key to the encryption code. Further, the unauthorized user will not be able to provide encrypted unauthorized messages into the communications link since he will not be able to properly encrypt the unauthorized message.

Each of the traditional active and passive attack prevention methods, no matter how complex, suffers from an inherent drawback: no protection is provided against an unauthorized party who has knowledge of the access code or the encryption key. Thieves thus go to great lengths to obtain the access code and encryption key. One method that is used by them is to intercept a transmitted encrypted message, and then to "reverse engineer" or analyze the message to determine its encryption key. Oftentimes, however, considerable cryptanalytic skill is needed to successfully reverse engineer the encryption key.

Another method is "key exhaustion." Here, brute force combined with computer speed used to try every possible key combination until the correct key combination is reached. For example, with an n bit key, $2^n$ key combinations will guarantee a solution. The key exhaustion approach is particularly dangerous since no cryptanalytic skill is needed. Any computer "hacker" can use it. Under either approach, once the encryption code is broken, it is useless. Oftentimes, the owner of the communications network cannot tell when a particular encryption key has been broken. Thus, the system can be vulnerable for a long period of time after the encryption key has been obtained.

The financial industry is increasingly utilizing electronic fund transfer techniques and automatic teller machines. Both of these devices create potentially very large risks to the financial network. In response to these risks, the financial industry has put great effort into increasing the complexity of the access and encryption codes in order to decrease the possibility that the codes will be broken. However, if sufficient computational power is brought to bear on the financial network, and sufficient time is available, many experts believe that any encryption scheme presently used may be broken. Given the increased amount of money being transferred by such financial networks (which oftentimes use satellite communications systems), the reward to a thief who can break the code has become so high that, in conjunction with the rapidly decreasing cost of computational power, the risk in investing in computational power sufficient to break a complex code has become reasonable.

Because the complexity of the encryption scheme can no longer guarantee immunity from active attack, there is a great need in the financial industry, as well as in other industries, for a new method of protection for data exchanges, particularly those over satellite communications networks. Further, there is a need for a method of protection which may be implemented using general purpose/cost-effective terminals and communications equipment. Current commercial cryptographic systems are generally not easy to implement or maintain because of complicated key management requirements. In other words, the encryption keys must be updated constantly. Often, the only effective way of doing this is to physically visit the remote site at which the key is being updated and to input the new key there. This is very time-consuming and costly to do.

Other non-commercial cryptographic systems are equally impractical for the financial industry, as well as other industries. Such systems generally fall into three categories: specialized hardware devices, specific software methodologies, and hybrid systems. Specialized hardware devices are often not commercially feasible due to cost, method of transmission, or maintainability. They often can be defeated simply by stealing or otherwise duplicating the hardware device. Software methods offer security through algorithmic complexity, but depend on the secrecy of the key or scramble method to avoid compromise. Hybrid systems gain strength by having advantages of both hardware and software schemes, but they, like the other systems, ultimately depend on some part or parts of the process being kept secret from others, but known to authorized users. Obviously, once these part or parts are no longer secret to unauthorized users, the system has been compromised and is vulnerable to active and/or passive attack.

SUMMARY OF THE INVENTION

Broadly, the present invention is a satellite communications system and method where the determination of the location of the transmitter for each message that is received introduces an independently verifiable authentication parameter, which makes the present invention highly resistant to active attack from an unauthorized user. The high active attack resistance is due to the fact that the present invention requires an unauthorized user to be located at the authorized transmitter location in order for the present invention to be compromised. The physical proximity within which the unauthorized user must be is very small, and is defined by the position resolution capability of the satellite system that is used. Typically, the unauthorized user must be within ±1 meter of the proper transmitter location in order for the unauthorized transmission to go undetected. This is usually not possible since the transmitter location can be physically guarded and made inaccessible to unauthorized users. In this way, the present invention exhibits a very high resistance to active attack.

There are four versions of the present invention employing stationary transmitters. Within each of these four versions, there is a version for use with a generalized satellite positioning system, and another version for use with the satellite positioning system disclosed in U.S. Pat. No. 4,359,733 to O'Neill (the "Geostar satellite system"), which patent is incorporated by reference herein.

For each of these four stationary versions, both with respect to the general satellite system example and the Geostar satellite system example, there is disclosed a transceiver (transmitter and receiver) for use with that version of the present invention. In addition, two versions of a mobile transceiver variation of the present invention are shown for the generalized satellite system, and two versions of the mobile transceiver version for use with the Geostar satellite system are also shown. Examples of transceivers for use with these mobile versions are also shown. Finally, application of the present invention to a financial transaction system and to an automatic weather observation and reporting system are disclosed.

More specifically, the generalized example of the clear text version of the system and method of the present invention comprise a transmitter at a first location and a receiver at a second location. The satellite system determines the position of the transmitter at the first location for each received message, and appends this transmitter position to the received message, which is sent by the satellite system to the receiver at the second location. Specifically, the transmitter constructs a message based on data received from the authorized user. This message is sent to the satellite system via a communications link. The satellite system determines the position of the transmitter sending the message that is received. It appends the position of the transmitter to the received message, and then forwards it to the receiver via a second transmission link. The receiver receives the message with the appended transmitter position, extracts the transmitter position data, and then retrieves an authorized transmitter position from a storage means. It then compares the extracted (actual) transmitter position with the stored transmitter position. If the positions correlate, the receiver knows that it has received an authentic message from the satellite system.

The transmitter portion of the transceiver for this generalized example of the clear text version of the present invention comprises a message means which supplies the authorized user's message to the transmitter electronics. The transmitter electronics transmits the message to the satellite system over the first link using an antenna of conventional design. The antenna also receives any message from the satellite.

The receiver portion of the transceiver is equivalent to the receiver at the second location discussed above. Since bidirectional communications typically occur between the first location and the second location, the transceiver version is shown for purposes of brevity. The received message from the antenna is provided to receiver electronics, which extracts the transmitter position appended to the message, and then compares the extracted transmitter position with a stored transmitter position in a position comparator. If the position comparator indicates that a proper correlation has occurred, a message authentication stage indicates to the user that an authentic message has been received.

The clear text version of the present invention utilizing the Geostar satellite system is as follows. The transmitter at the first location transmits the authorized user's message to the three satellites in the Geostar satellite system. Two of the satellites then transmit the received message to the third satellite, which is in communications with a ground station. The third satellite then sends the three received messages to the ground station spaced in time equal to the time at which they were received by the third satellite, either directly from the transmitter or from one of the other satellites. The ground station then calculates the position of the transmitter that has sent the received messages. The ground station then transmits the received message along with the transmitter position back up to the third satellite. The third satellite then retransmits the message and the appended transmitter position to the receiver the second location. The receiver compares the received transmitter position with the stored transmitter position in the manner set forth above with respect to the generalized example of the clear text version of the present invention. If correlation of the received transmitter position and the stored transmitter position occurs, the receiver knows that it has received an authentic message. Note that the transceiver described above can be utilized with this version.

For purposes of brevity, only the differences between the versions just described and the more elaborate versions of the present invention are discussed below. In the generalized example of the position encryption version of the present invention, the message from the user is encrypted by the transmitter with a transmitter position element. The transmitter position element is the proper position of the transmitter at the first location. This encrypted message is sent to the satellite, which determines the position of the received encrypted message, and appends this transmitter position information to the encrypted message, which is then sent to the receiver at the second location. The receiver extracts the position data from the message and compares it with the stored transmitter position to determine whether an authentic message has been received. If coincidence is detected, the receiver then decrypts the received message using either the received transmitter position or the stored transmitter position. Alternately, the receiver can do the decryption using either the received transmitter position or the stored transmitter position, and then can evaluate the correlation between the received transmitter position and the stored transmitter position. Note that the clear text transmitter position data appended to the message can also be encrypted.

In the transceiver for this version, a stage is provided for supplying the transmitter position element to an encryption stage, which encrypts the authorized user's message. On the receiver side, the decryption of the message only takes place after the message authentication has occurred. A transmitter position storage stage provides to the decryption stage either the received transmitter position or the stored transmitter position. As stated above, either of these can be used to decrypt an authentic message.

The position encryption version of the present invention utilizing the Geostar satellite system has the transmitter at the first location transmit the encrypted message that has been encrypted using the proper transmitter position. These encrypted messages, which are received by each of the three satellites, are supplied by the third satellite to the ground station, spaced in time as they are received by the third satellite. The ground station determines the position of the transmitter. It then sends to the third satellite the encrypted message along with the transmitter position. This encrypted message having the transmitter position appended thereto is then sent by the third satellite to the receiver, which authenticates and decrypts it according to the approach just described.

The generalized example of the non-position encryption version of the present invention is as follows. The message from the authorized user at the transmitter at the first location is encrypted with a non-position element, and the encrypted message is sent by the transmitter to the satellite system. The satellite system determines the position of the transmitter at the first location, and appends this transmitter position to the encrypted message, which message and transmitter position are sent to the receiver at the second location. The receiver extracts the transmitter position from the encrypted message and then compares it with the authorized transmission position that it has stored. If coincidence of these positions is detected, a receiver then decrypts the message using the non-position element that it has stored for this purpose.

The transceiver for implementing the non-position encryption version of the present invention on the transmitter side has a stage for supplying the non-position element to the encryption stage. The encryption stage encrypts the message from the user using this non-position element. On the receiver side, the decryption takes place after message authentication has occurred. The decryption stage utilizes the non-position element that is stored at the receiver.

The non-position encryption version of the present invention utilizing the Geostar satellite system is as follows. The transmitter at the first location sends the message encrypted using the non-position element to the three satellites. Two of the three satellites supply the received encrypted message to the third satellite, which supplies each of the three messages spaced in time of receipt to the ground station. The ground station then determines the position of the transmitter at the first location. It then transmits the encrypted message along with the transmitter position to the third satellite, which retransmits it to the receiver at the second location. The receiver decrypts the encrypted message in the same way as described above with respect to the generalized version.

The generalized example of the position plus non-position encryption version of the present invention is as follows. Here, the transmitter encrypts the user's message using both the transmitter position element and a non-position element. The encrypted message is sent to the satellite system. The satellite system determines the position of the transmitter at the first location, and appends this transmitter position to the encrypted message, which is sent to the receiver at the second location. The receiver extracts the transmitter position data and compares it with stored transmission position data. If a correlation is detected, it then decrypts the authentic message using a combination key made up of the transmitter position element and the non-position element(s).

The transceiver for implementing the position plus non-position encryption version of the present invention includes on the transmitter side a stage which provides the position and non-position encryption elements to an encryption stage. The encryption stage encrypts the authorized user's message using these elements. On the receiver side, an authentic message is decrypted using the position and non-position elements that are stored at the receiver.

A position plus non-position encryption version of the present invention utilizing the Geostar satellite system only differs from the encrypted versions previously described in that the encryption key comprises the position and non-position elements. Otherwise, everything is the same.

Turning now to the versions of the present invention which allow the transceiver to change its position, the generalized example of this mobile position syncing version of the present invention is as follows. An initial transmission sequence is required in order for the receiver at the second location to start the syncing process. The mobile transceiver sends a position request to the satellite system, which determines the position$_0$ of the mobile transceiver, and then sends this position$_0$ back to the transceiver. The transceiver stores this position$_0$ data. Thereafter, a sync message is constructed, which is sent to the satellite system. The satellite system then again determines the position$_0$ of the mobile transceiver, and appends this position$_0$ to the sync message which is sent to the receiver at the second location. The receiver extracts the transceiver position$_0$ data from the sync message. It then compares this received transceiver position$_0$ data with a reference position$_0$ data to determine whether the mobile transceiver has initialized the syncing operation. If these positions$_0$ correlate, the received transmitter position$_0$ data is stored for use in decryption of subsequent message received from the mobile transceiver.

The next message from the mobile transceiver after the initialization transmission sequence is as follows. The mobile transceiver sends a request to the satellite, which responds by indicating the new position (MTX/MRX position$_1$ of the mobile transceiver). This MTX/MRX position$_1$ data is stored. The MTX/MRX position$_0$ data from a previous transmission is then retrieved and used to encrypt the message that has been provided by the authorized user. This encrypted message is sent to the satellite system, which again determines the position$_1$ of the mobile transceiver, and appends this MTX/MRX position$_1$ to the encrypted message. The receiver receives the encrypted message from the satellite system along with the MTX/MRX position$_1$ data, which is extracted and stored. Thereafter, the MTX/MRX position$_0$ data from the previous initialization transmission is retrieved from storage and used to decrypt the received position$_1$ message.

An alternate version of the method of implementing the position syncing version of the present invention is as follows. Here, the authorized user (sender) initializes the system by having a sync message transmitted to the satellite system. The satellite system determines the position$_0$ of the mobile transceiver and sends back this MTX/MRX position$_0$ data to the mobile transceiver, which extracts this MTX/MRX position$_0$ data and stores it. The satellite system also sends the sync message along with the appended MTX./MRX position$_0$ data to the receiver at the second location. The receiver extracts the MTX/MRX position$_0$ data and stores it for decryption of the first message received after the initialization transmission sequence, as described above.

The subsequent transmission is as follows. The mobile transceiver receives the MTX/MRX positon$_0$ data from storage, and uses it to encrypt the message from the authorized user. The encrypted message is sent to the satellite system. The satellite system determines the position$_1$ of the mobile transceiver, and then sends the encrypted message with the MTX/MRX position$_1$ data both to the mobile transceiver at position$_1$ and to the receiver at the second location. At the mobile transceiver, the MTX position$_1$ data is extracted from the received message and stored for use in encrypting the subsequent message. At the receiver, the MTX/MRX position$_1$ data is also extracted and stored for subsequent use. The MTX/MRX position$_0$ data is retrieved from storage and is used to decrypt the received position$_1$ message.

An embodiment of a transceiver for implementing the position syncing message of the present invention further includes, on the transmitter side, a stage for generating the request message and the sync message. On the receiver side, the storage stage for storing the MTX/MRX position$_0$ data is connected with an MTX,/MX position$_0$ comparator stage. This comparator stage compares the received MTX/MRX position$_0$ data with the stored MTX/MRX position$_0$ data to determine whether the initialization of the system has occurred at position has occurred.

The position syncing version of the present invention utilizing the Geostar satellite system performs all of the steps discussed above with respect to the generalized version. The main difference is that the Geostar satellite system employs three satellites to determine the position of the mobile transceiver for each transmission.

The generalized example of the position plus non-position mobile syncing version of the present invention is the same as the generalized example of the mobile syncing version discussion above, with the addition of the use of non-position element(s) to also encrypt the messages that are sent from the mobile transceiver to the receiver.

The position plus non-position syncing version of the present invention utilizing the Geostar satellite system is the same as the generalized version, except that the Geostar satellite system, as discussed above, utilizes three satellites to determine the position of the mobile transceiver.

An example of the mobile transceiver used for the position plus non-position syncing version of the present invention includes a storage stage for storing the position and the non-position data. This position and non-position data is used to encrypt the message that is sent by the transmitter of the mobile transceiver to the satellite system. On the receiver side, the position and non-position data is used for decrypting the received information once position authentication has occurred.

An embodiment applying the present invention to a financial network is shown. Remote terminals or nodes in the system transmit and receive data through the satellite system. A main frame host computer at the central site communicates with the satellite system through a front end computer. The satellite system determines the position of the remote terminals or nodes for each transmission, and utilizes this position information in the manner set forth above. Similarly, the satellite system determines the position of the transmissions from the host computer and also uses this position information to authenticate the messages in the manner discussed above. This application of the present invention can employ clear text, position encryption, non-position encryption, or position and non-position encryption, along with other type's of encryption schemes.

An example of the front end teleprocessor and network controller which interfaces the host computer with the satellite system is shown. Similarly, an example of the financial terminal which interfaces a remote computer location with the satellite communication system for the financial network is also shown.

Finally, an example of the application of the present invention to automatic weather observation and reporting is also disclosed. Other vertical market applications of the present invention are envisioned and are covered by this application.

BRIEF DESCRIPTION OF THE DRAWINGS

These and other features and advantages of the present invention will be more readily appreciated from the following detailed description in connection with the appended drawings in which.

Detailed Description of the Preferred Embodiments

Table of Contents

I. THE METHODOLOGY

Figure 1:
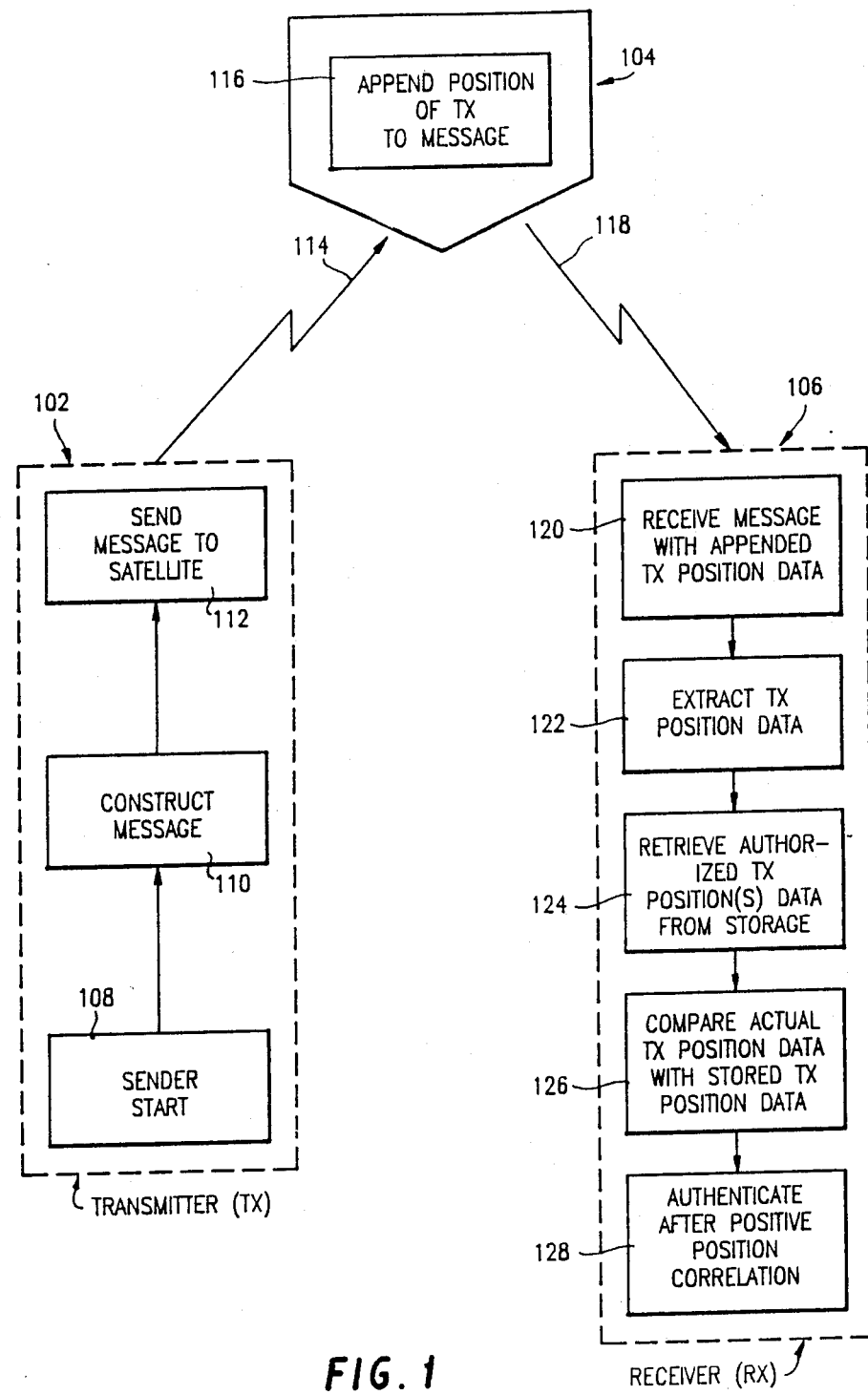
FIG. 1 is a block diagram of the generalized example of the clear text version of the present invention.

Overview
2. Clear Text Stationary Transmitter Version
   a. Generalized Example
   b. Transceiver Example
   c. Geostar Example
3. Position Encryption Stationary Transmitter Version
   a. Generalized Example
   b. Transceiver Example
   c. Geostar Example
4. Non-Position Encryption Stationary Transmitter Version
   a. Generalized Example
   b. Transceiver Example
   c. Geostar Example
5. Position Plus Non-Position Erection Stationary Transmitter Version
   a. Generalized Example
   b. Transceiver Example
   c. Geostar Example
6. Position Syncing Mobile Transceiver Version
   a. Generalized Example
   b. Alternative Generalized Example
   c. Transceiver Example
   d. Geostar Example
   e. Alternative Geostar Example
7. Position Plus Non-Position Syncing Mobile Transceiver Version
   a. Generalized Example
   b. Alternative Generalized Example
   c. Transceiver Example
   d. Geostar Example
   e. Alternative Geostar Example II. SPECIFIC APPLICATIONS
1. Financial Network
   a. Generalized Example
   b. Front End Teleprocessor and Network Controller Example
   c. Financial Terminal Example
2. Automatic Weather Observation and Reporting Network

I. THE METHODOLOGY

Overview

The present invention is a satellite communication system and method which gains its message authorization strength by being highly resistant to active attack. The high resistance to active attack is due to the use of the position of the stationary transmitter or the mobile transceiver for authenticating each message that is received by a receiver at a location in communication with the stationary transmitter or the mobile transceiver using the satellite system. For practical purposes, active attack can only successfully occur against the present invention if the unauthorized user is able to transmit a message (that is properly encrypted if encryption is used) from the proper transmitting location. Since the transmitting location can be protected physically, it is very unlikely that an unauthorized user will be able to transmit from the proper transmitting location without detection.

Normally, satellite communications systems are highly vulnerable to both active and passive attack. They are extremely vulnerable to active attack since they typically operate in the broadcast mode: their antennas receive signals over a wide geographical reception area below their orbit, which typically is geostationary. Oftentimes, this reception area spans thousands of miles in both directions.

The present invention overcomes this vulnerability and is highly resistant to active attack because it requires the satellite system to be able to determine the location of the transmitter of each message that is received. The location from which each message has been transmitted is used by the present invention to authenticate the received message. If proper authentication of transmitter position does not occur, the present invention can immediately determine that an unauthorized message has been received.

The determination of the location of the transmitter for each message that is received introduces an independently verifiable authentication parameter. This additional authentication parameter can be combined with any state-of-the-art encryption technique to increase security. It is the opinion of the inventors that this independently verifiable authentication parameter eliminates a security weakness inherent in all conventional systems that require authentication.

Any unauthorized user can intercept the transmissions from the satellite system by positioning its receiving antenna within the transmission footprint of the satellite. Satellite systems do not have antennas which are so directive as to attenuate the signal sufficiently outside of the designated receiving location so as to prevent an unauthorized user located adjacent to it from also picking up the message. The present invention is resistant to such passive attack by utilizing the transmitter position information to encrypt the transmitted message. In other versions, a non-position encryption element(s) is employed, or a non-position encryption element(s) is used together with the transmitter position information or element. In those versions where the transmitter position element is used for encryption, the unauthorized user must use this element in order to perform the decryption. Where a non-position element(s) is also used, the unauthorized user must also know it in order to be able to decrypt the received message.

There are stationary transmitter versions of the present invention where the transmitter is located at a first location and the receiver is located at a second location, and the transmitter does not move from its first location. In these versions, the receiver at the second location is provided with the proper position of the first location in order to be able to authenticate the messages received from the first transmitter location. These versions typically are used in networks where the transmitter locations are stationary, and only have to be moved on an infrequent basis. This movement requires that the new proper transmitter location(s) be provided to the receiver(s) in order for message authentication to occur.

Other versions of the present invention allow for the transmitter location to be moving. Here, a mobile transceiver is used for these moving transmitter locations. A position syncing technique is employed, where the receiver at the second location, after position initialization, utilizes the position of the previous message to decrypt the immediately subsequent message. Since the preceding location of the mobile transceiver is used to decrypt the next subsequent message, this version of the present invention is called a position syncing version. A more secure variation of the mobile transceiver system also employs non-position encryption along with the position syncing encryption.

In each of the versions, the receiver at the second location can either be stationary or mobile. Oftentimes, the receiver at the second location also has a transceiver, since bidirectional communication usually is required in electronic communication networks. For purposes of explanation, however, only the receiver portion is described with respect to the second location. It should be understood that the first and second locations can be reversed such that the "receiver" at the second location transmits back a message to the "transmitter" at the first location. Also, with respect to the mobile transceiver versions, mobile transceivers can be used at both the first and second locations.

In the generalized versions, any satellite system which can provide the position of the transmitter at the first location to the receiver at the second location can be used. The present invention, however, has specific application to the satellite positioning system shown in U.S. Pat. No. 4,359,733 to O'Neill, assigned to Geostar (hereinafter referred to as the "Geostar satellite system" or "Geostar positioning system"), which patent is incorporated herein by reference in its entirety.

Also shown are representative examples of a transceiver that can be used with the particular version of the present invention being described. A transceiver, having a transmitter portion and a receiver portion, is used for the explanation, since it includes the transmitter (used to transmit messages from the first location in the stationary versions) and a receiver (used to receive the message at the second location in either the stationary first location or the mobile first location versions). In those situations where only a transmitter is located at the first location and only a receiver is located at the second location, it should be understood that the transmitter portion of the transceiver would be located at the first location and the receiver portion of the transceiver would be located at the second location. However, as noted above, bidirectional communications between the first and second locations typically is the case for electronic networks. For this reason, a transceiver is shown.

Also, in the mobile first position versions employing position syncing, both a transmitter and a receiver are required in order to receive position information from the satellite system. The present invention should not be limited to the particular transceiver arrangements that are shown, but should encompass any type of transceiver that can be used to implement the position authentication approach of the present invention.

Two specific applications of the present invention are shown: a financial network and an automatic weather observation and reporting network. The financial network shows how the present invention can be applied to networks of remotely located financial terminals, ATMs or other utilization devices. It has broad application to the financial community. The second application, an automatic weather observation and reporting system, has particular application for monitoring the weather at a plurality of points, such as unmanned airports, to provide pilots with critical information about the weather conditions at those airports. It should be understood that the present invention can be applied to any particular application, and that the two examples shown are illustrative only.

The following numbering approach has been used with the drawings. Like numbers refer to like components or stages or systems or steps from drawing to drawing. When a particular component, stage, or step first appears, it is numbered. If it should first appear in FIG. 5, for example, it has been assigned a 500 level number. If it should first appear in FIG. 12, it is assigned as 1200 level number. In this way, the reader is able to determine when a particular element, stage, component or step first appears in the explanation. Further, for purposes of brevity, description of elements previously described in subsequent sections of the explanation is not done. Thus, the reader should refer to the specific section when a particular element is first introduced in order to obtain the full explanation for that particular aspect of the present invention.

2. Clear Text Stationary Transmitter Version a Generalized Example

Referring now to FIG. 1, a block diagram of the generalized example of the clear text version of the present invention is shown. A transmitter (TX) 102 is located at a first location. A receiver (RX) 106 is located at a second position. A satellite system 104 provides a first communications link 114 from transmitter 102 to satellite 104, and a second transmission link 118 from satellite 104 to receiver 106, in order to provide the message data and transmitter position information from the transmitter 102 to the receiver 106.

Satellite system 104 can be of any type that can determine the location of the transmitter 102 for each message received from transmitter 102 via communications link 114, and which also can relay the received message with the appended position of the transmitter to the receiver 106 via the communications link 118. Satellite system 104 can determine the position of transmitter 102 for each message received on communications link 114 either at the satellite or at a remote ground station. One or more satellites can be used for satellite system 104. Any frequency range for the transmission link 114 and/or for the transmission link 118 can be used. The satellites can be orbiting or geostationary. Any suitable type of modulation can be used. Broadcast or zone antennas can be used. Messages can be relayed from communications link 114 to communications link 118 in real time, or they can be stored and rebroadcast at a later time.

Turning now to the transmitter 102, a sender start command designated by block 108 is received from the authorized user (not shown) to indicate to the transmitter 102 that system operation is to begin and that a message is to be sent. Next, a message is constructed as indicated by block 110 based on data received from the authorized user. The authorized user may provide the message in individual components, as would be the case where the transmitter would accumulate a certain amount of data equal to the message length before the message is constructed and sent to the receiver 106. Alternately, the message can be received from the user all at once and can be used to construct the message that will be sent. What should be understood is that messages of specific length are transmitted by the present invention. This data communications approach, which is typically referred to as packet communications, is used in communications networks as opposed to continuous streams of data. This packet approach allows a multiplicity of transmitting locations within the satellite system of the present invention to be communicating with a multiplicity of receivers at different locations using the same communications link. Note, however, that the present invention is not restricted to packet communications.

The constructed message from block 110 is then supplied to block 112, which causes the message to be sent by the transmitter at location 102 on communications link 114 to the satellite system 104.

Satellite system 104 then determines the position of transmitter 102. The position of transmitter 102 is appended to the data message received from the transmitter 102, as indicated by a block 116. The message with the appended transmitter position is then sent by the satellite system 104 on communications link 118 to the receiver 106.

The receiver 106 receives the message with the appended transmitter position, as indicated by a block 120. The receiver then extracts the transmitter position data appended to the message, as indicated by a bloc 122. It then retrieves the authorized transmitter position(s) data from a storage location, as indicated by block 124. The receiver 106 must store one or more authorized transmitter positions in a memory location. There must be a stored authorized transmitter position for the location of each transmitter 102 that the receiver 106 can receive messages from via the satellite system 104.

The receiver 106 then compares the actual transmitter position data that it has received along with the message data from the satellite system 104 with the stored authorized transmitter position for the proper location of transmitter 102. This is indicated by a block 126. If coincidence of the actual transmitter position data and the stored authorized position data occurs, the receiver 106 knows that it has received an authentic message from satellite 104 from the transmitter 102. This authentication is indicated by a block 128. The authentic message is then provided by the receiver 106 to the user or to a utilization device (not shown).

The physical proximity within which the unauthorized user must be in is very small, and is defined by the position resolution capability of the satellite system. Typically, the unauthorized user must be within ±1 meter of the proper transmission location in order for the unauthorized transmission to go undetected. This is usually not possible since the transmission location can be guarded or made inaccessible to unauthorized users. In this way, the present invention exhibits a very high resistance to active attack, particularly when used with a three-dimensional satellite positioning system.

The present invention is highly resistant to active attack. This resistance is due to the fact that the receiver 106 will not accept a message received from the satellite system 104 unless the transmitter 102 position data for that message correlates with the proper location for the transmitter 102. As discussed above, an unauthorized user who transmits an unauthorized message from a location other than the proper location of transmitter 102 will not be able to "fool" the present invention since the receiver 106 will determine that this message has been transmitted from an incorrect transmitting location. Furthermore, if the unauthorized user is able to substitute a properly encrypted unauthorized message (if encryption is used) either at the satellite 104 or along the transmission link 118, he will also not be able to fool the present invention if the substituted message does not contain the proper transmitter position location data.

It is important that the satellite system 104 be able to determine the location of messages transmitted by the transmitter 104 within a very small zone, as discussed above. Obviously, the greater the position determining capability of the satellite system 104, the smaller the zone will be around the proper transmitting location 102 within which an unauthorized user must be in order to effectively attack the present invention. If the position determining capability of the satellite system 104 is ±1 meter, for example, it is readily seen that the unauthorized user must be at the actual transmitting antenna location in order to be able to effectively attack the present invention. Normally, physical barriers can be erected and procedures established which can make this very difficult, if not impossible, for an unauthorized user to accomplish. It is for this reason that the present invention is highly resistant to active attack.

b. Transceiver Example

Figure 2:
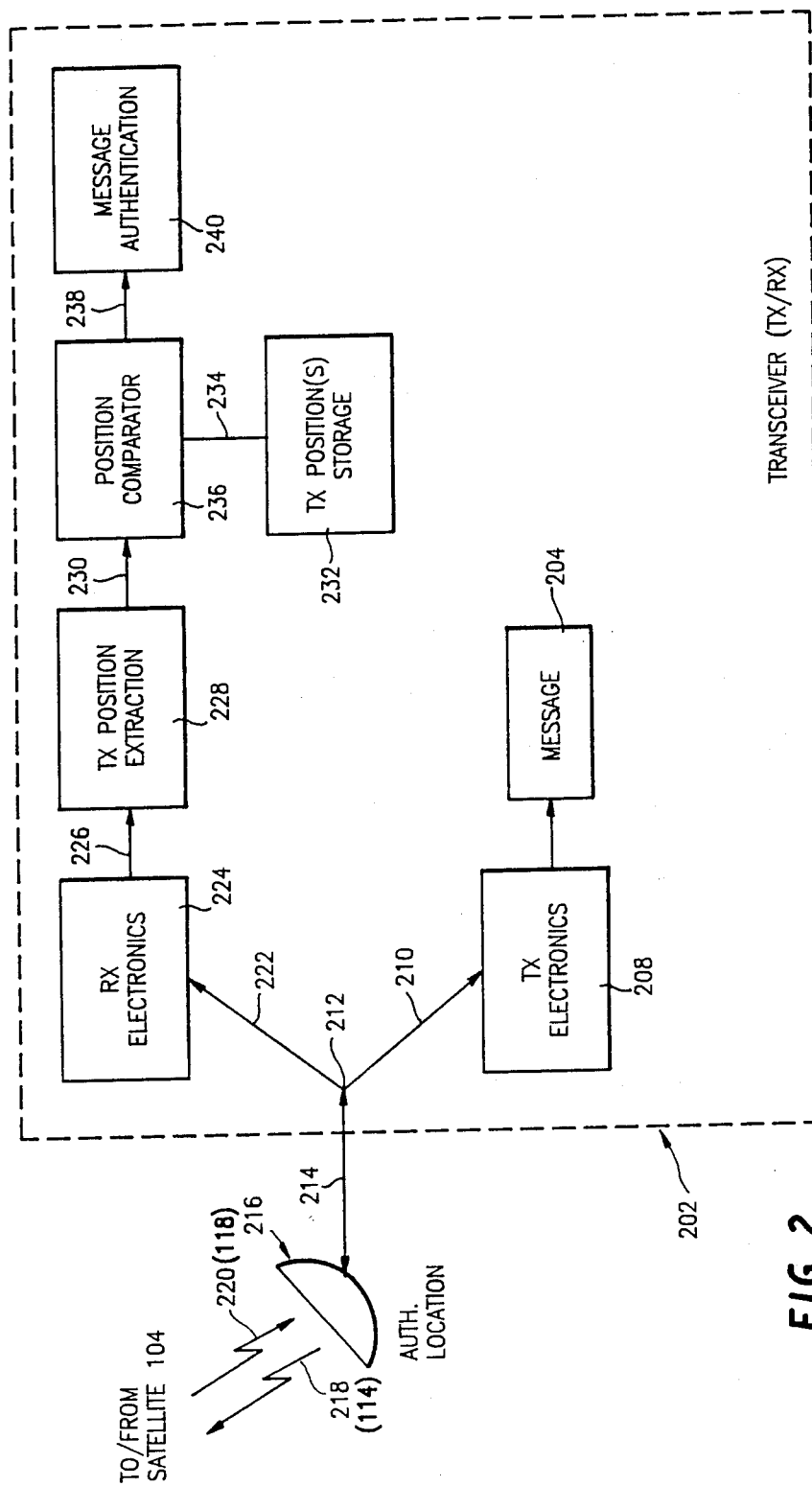
FIG. 2 is a block diagram of a transceiver for implementing the clear text version of the present invention.

A block diagram of a transceiver example for implementing the clear text version of the present invention is shown in FIG. 2. As discussed above in section I.1, the transceiver 202 comprises a transmitter portion or side, and a receiver portion or side. The transmitter portion or side comprises transmitter 102 at the first location of FIG. 1, and the receiver portion or side comprises receiver 106 at the second location. For purposes of illustration, transceiver 202 is shown as having both a transmitter portion and a receiver portion, which are separated in FIG. 1. Normally, however, bidirectional communication occurs between location 1 and location 2 in the network of the present invention. It is for this reason that the transceiver 202 comprises a transmitter portion and a receiver portion.

A message stage 204 collects the data from the authorized user (not shown) and constructs the message by accumulating this data received from the authorized user. The message is supplied via a line 206 to the input of a transmitter (TX) electronics stage 208 of conventional design. The transmitter electronics stage 208 takes the received data message and converts it to an output signal having the proper frequency and modulation scheme. As stated above, any suitable modulation scheme or frequency can be used.

The signal from the output of transmitter electronics stage 208 is supplied via a line 210 to a junction 212. Junction 212 supplies the signal to a bidirectional line 214 connected to an antenna 216, of conventional design. The antenna 216, which is located at the authorized transmitting location, is pointed at the satellite system 104 (not shown in FIG. 2). Antenna 216 transmits this signal on a communications link 218 to the satellite system 104. Note that communications link 218 of FIG. 2 corresponds to communications link 114 of FIG. 1.

Turning now to the receiver side of transceiver 202, the satellite system 104 sends the message with the appended transmitter position on a communications link 220 to the antenna 216. Note that communications link 220 corresponds to communications link 118 of FIG. 1. Antenna 216 supplies the message and position data received on link 220 via line 214, junction 212, and a line 222 to the input of a receiver (RX) electronics stage 224, of conventional design. Receiver electronics stage 224 frequency translates and demodulates the received signal. The base band signal having the received message and transmitter location appended thereto is supplied at an output of the receiver electronic stage 224 via a line 226 to the input of a transmitter (TX) position extraction stage 228.

Transmitter position extraction stage 228 extracts the transmitter position data appended to the message. Stage 228 is of conventional design. The extracted transmitter position is supplied by stage 228 on a line 230 to the input of a position comparator stage 236 of conventional design. Position comparator stage 236 compares the actual transmitter position received from the satellite system 104 with the stored authorized transmitter position to determine whether an authentic message has been received. Specifically, a transmitter position(s) storage stage 232 of conventional design supplies over a line 234 the authorized transmitter position to the position comparator stage 236. Note that the transmitter position(s) storage stage 232 may store more than one authorized transmitter position. This would be the case where the receiver was receiving messages from more than one authorized transmitter location, which typically will be the case in a communications network. It can be seen that the network can be configured so that certain receivers cannot receive messages from certain transmitter locations merely by not providing these transmitter locations for that given receiver.

If the position comparator stage 236 finds a coincidence between the actual transmitter position and the authorized transmitter position, it indicates via a line 238 to a message authentication stage 240 that an authentic message has been received. Message authentication stage 240, which is of conventional design, can then provide the message to the user or to a utilization device (not shown). In any event, once an authorized message has been received, it can be used for the intended communications purposes with the knowledge that it is authorized and has not been sent by an unauthorized user. Since position comparator stage 236 will only indicate that an authentic message has been received when there is this coincidence between the actual transmitter location and the authorized transmitter location, the present invention is highly resistant to active attacks.

c. Geostar Example

Figure 3:
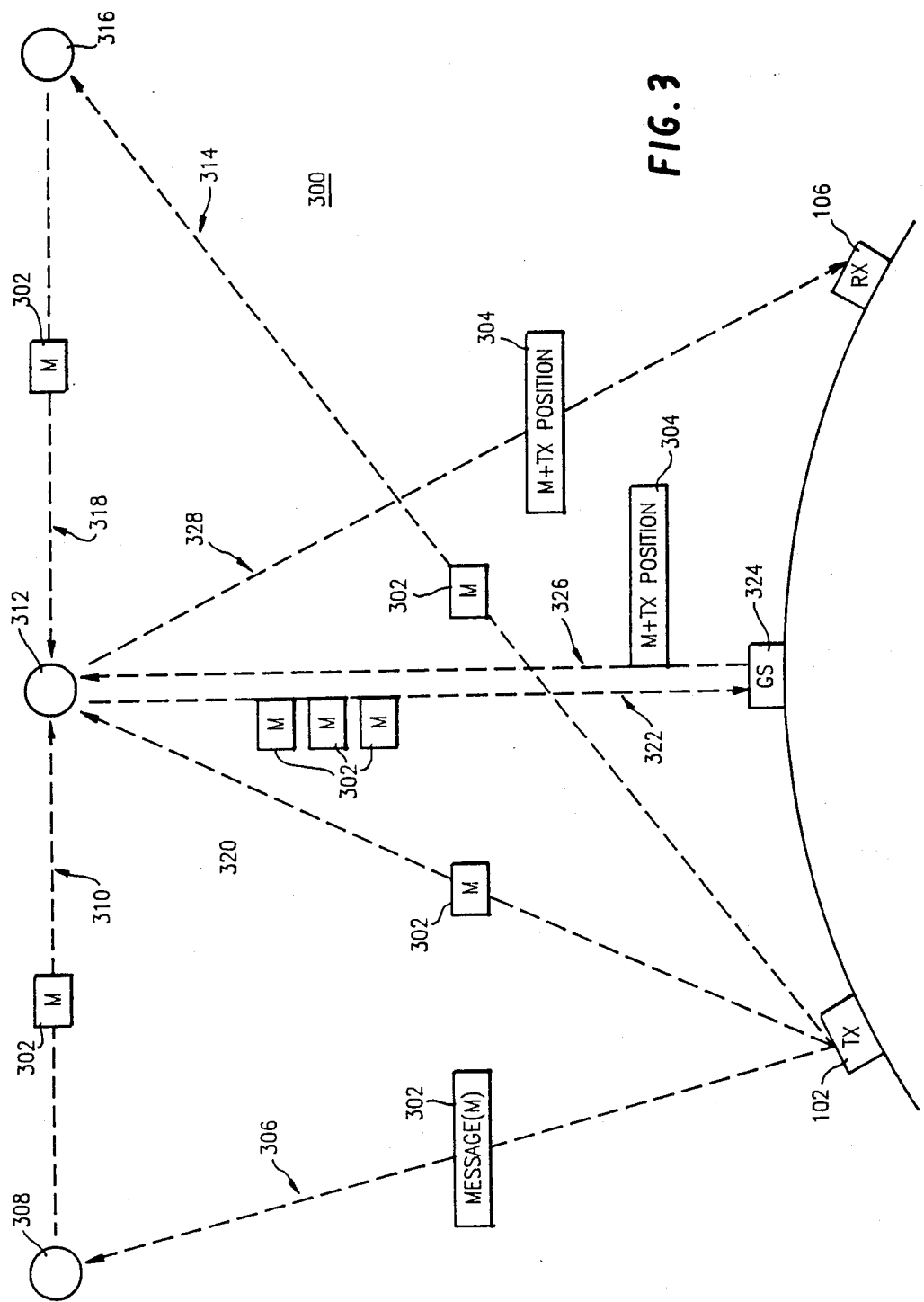
FIG. 3 is a block diagram of the clear text version of the present invention utilizing the Geostar satellite system.

The present invention utilizing the Geostar satellite positioning system disclosed in the O'Neill patent is shown in block diagram form in FIG. 3. Transmitter 102 at the first location constructs and sends a message (M), as indicated by a block 302, to each of the three satellites in geostationary orbit that make up the Geostar satellite positioning system: satellite 308, satellite 312, and satellite 316. Satellite 308 takes the message 302 received on communications link 306 and retransmits it on a communications link 310 to satellite 312. Similarly, satellite 316 takes the message 302 received on a communications link 314 and retransmits it via a communications link 318 to satellite 312. Satellite 312 also has received message 302 on a communications link 320 directly from transmitter 102 at the first location.

Satellite 312 retransmits the three messages 302 that it has received to a ground station 324 via a communications link 322. FIG. 3 shows the three messages 302 spaced apart in time. This indicates the time relationship between these three messages, which is based on the communications time introduced by the various communications links 306, 310, 314, 318 and 320 for the respective messages 302. Since satellites 308, 312 and 316 retransmit the received messages in real time, the ground station 324 is able to determine the position of the transmitter 102 at the first location based on these time differences and using triangulation techniques.

After ground station 324 has determined the position of the transmitter 102 at the first location, it appends the transmitter position onto the received message and retransmits the message with the appended transmitter position, as indicated by a block 304, via a communications link 326 to satellite 312. Satellite 312 then transmits the received message with appended transmitter position 304 to the receiver 106 at the second location using a transmission link 328. Receiver 106 extracts the transmitter position from the received message plus transmitter position 304, and utilizes the received transmitter position for determining whether the receiver message is authentic by comparing the received transmitter position with the stored authorized transmitter position, as discussed above in connection with the generalized example and with the transceiver example. Thus, it is seen that the Geostar version 300 of the present invention allows data to be communicated over the Geostar system and makes the Geostar system highly resistant to active attack for such data communications.

3. Position Encryption Stationary Transmitter Version a. Generalized Example

Figure 4:
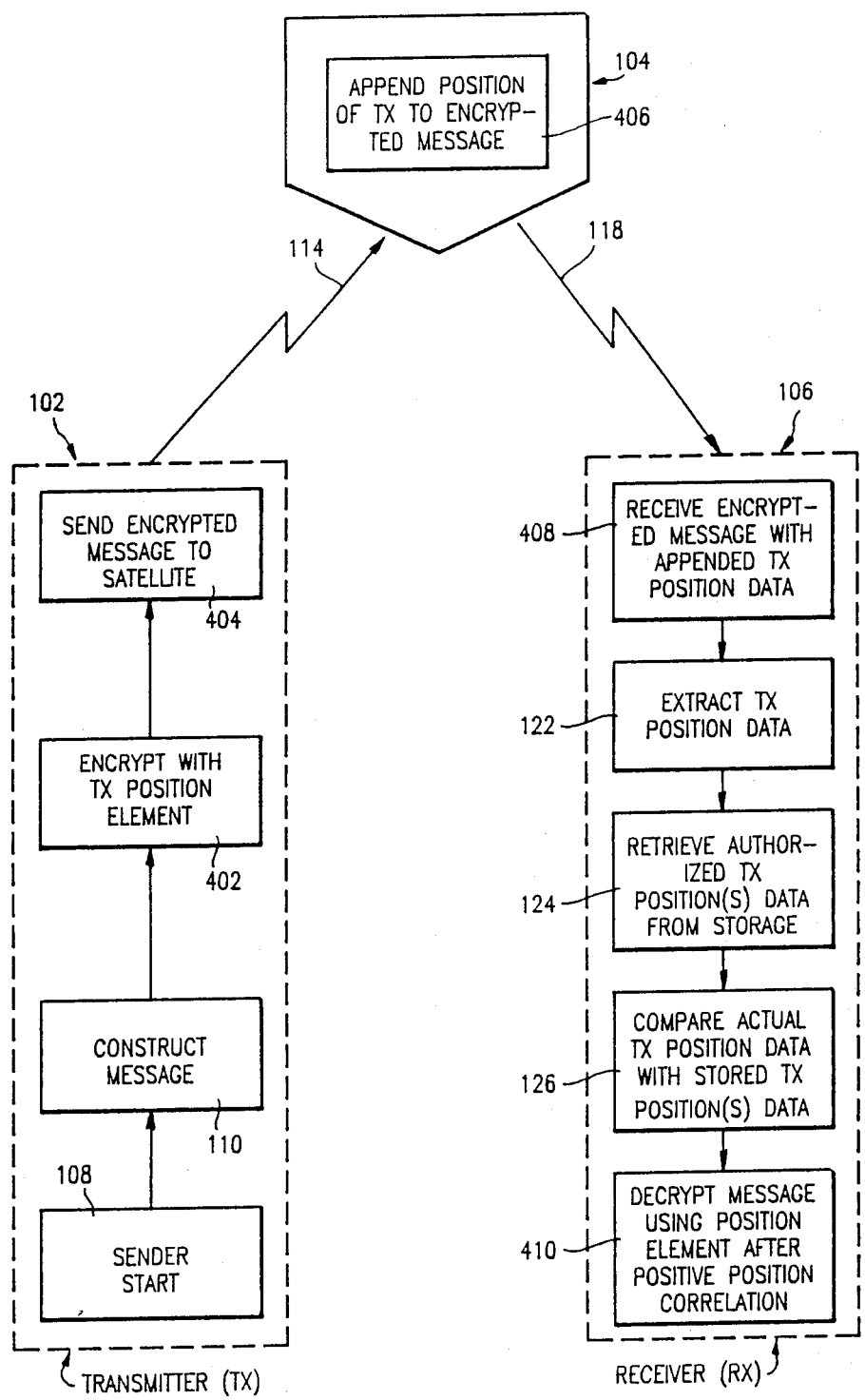
FIG. 4 is a block diagram of a generalized example of the position encryption version of the present invention.

Up to now, clear text messages have been sent in the versions of the present invention that have been described. A generalized example of the position encryption version of the present invention, where messages are encrypted rather than being sent in clear text, is shown in block diagram form in FIG. 4. As stated above, like numbers refer to like stages, components, or steps.

Transmitter 102 at the first location receives a sender start (block 108) from the authorized user (not shown), and constructs a message (indicated by block 110) based on the data received from the authorized user. The constructed message is then encrypted using a transmitter (TX) position element for encryption, as indicated by a block 402. Typically, the transmitter position element used for encryption will be the actual location of the antenna for transmitter 102, positioned at the authorized first location. It can be appreciated that using the actual transmitter location as the encryption element can make the system resistant to passive attack also.

The encrypted message is sent to the satellite on communications link 114, as indicated by a block 104. Satellite system 104 determines the position of the message received from transmitter 102 via the communications link 114. The transmitter position that is determined is then appended to the encrypted message, as indicated by a block 406, and then sent over communications channel 118 to the receiver 106 at the second location.

The receiver 106 receives the encrypted message with the appended transmitter position data, as indicated by a block 408. It then extracts the transmitter position data, as indicated by a block 122, and then retrieves the authorized transmitter position(s) data from the storage device, as indicated by block 124. The receiver then compares the actual transmitter position received with the message with the stored authorized transmitter position(s) data to determine whether an authentic message has been received, as indicated by block 126. If coincidence of these two transmitter positions occurs, indicating that an authentic message has been received, receiver 106 then decrypts the received message using the transmitter position element, as indicated by a block 410. The transmission position element can either be the actual transmitter position received with the message or can be the stored transmitter position that is received for the authentication step.

The decrypted message is then provided by the receiver 106 to the authorized user or to a utilization device (not shown). As explained above, only those messages are authenticated where proper correlation has occurred between the received transmitter position and a stored transmitter position. In this way, the user can be certain that he has received an authentic message.

b. Transceiver Example

Figure 5:
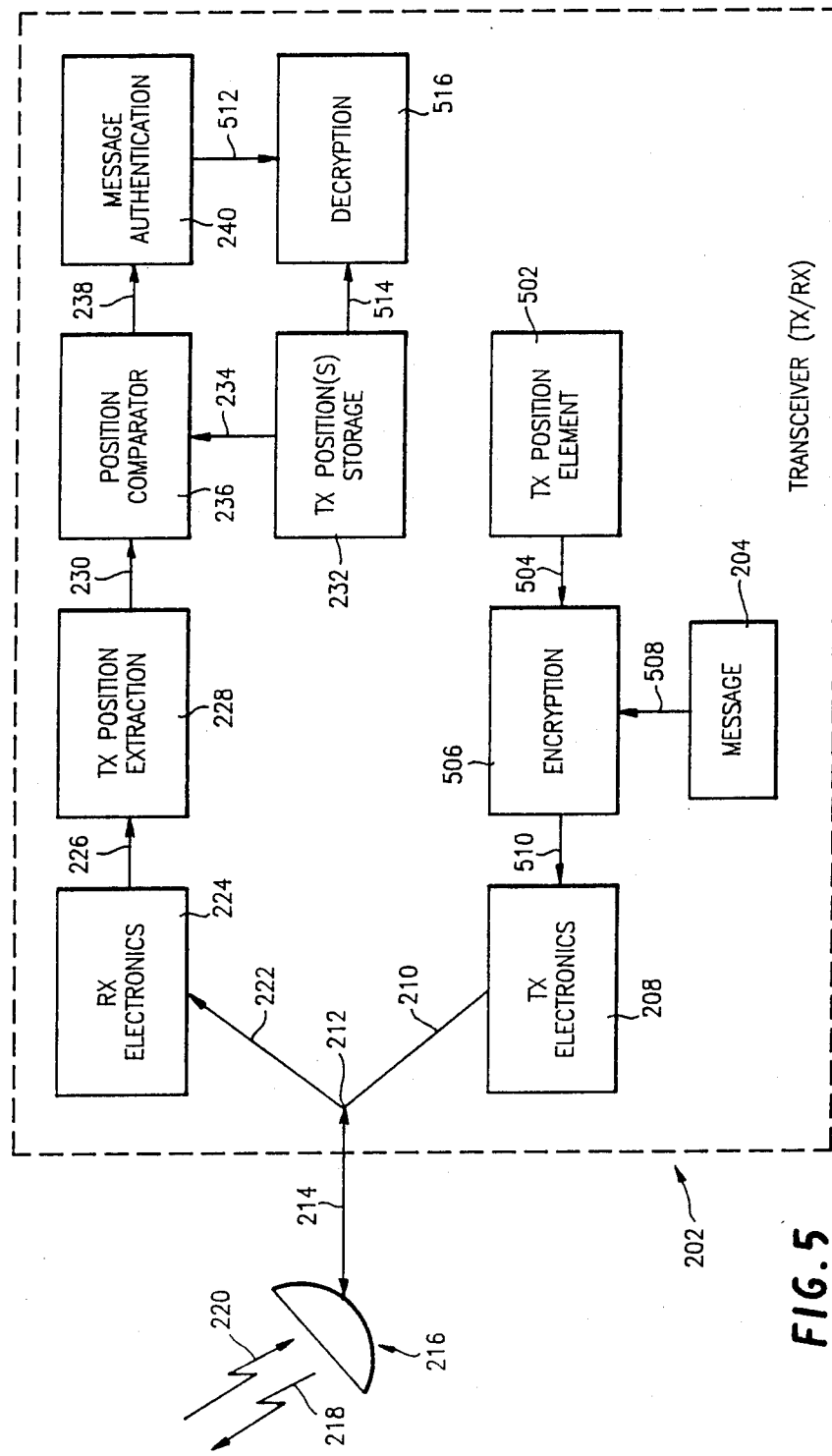
FIG. 5 is a block diagram of a transceiver for implementing the position encryption version of the present invention.

A block diagram of a transceiver example for implementing the position encryption version of the present invention is shown in FIG. 5. Referring to the transmitter side or portion of transceiver 202, a transmitter (TX) position element stage 502 supplies the transmitter position element on a line 504 to an encryption stage 506, of conventional design. The message from the authorized user which has been assembled by stage 204 is supplied over a line 508 to the other input of an encryption stage 506. Encryption stage 506 encrypts the message using the transmitter position element. The encrypted message, sent over a line 510, is converted to a signal of proper frequency and modulation by the transmitter electronics stage 208. The signal at the output of transmitter electronic stage 208 is supplied via line 210, junction 212, and line 214 to antenna 216, which sends it to the satellite system 104 over the communications link 218.

Referring now to the receiver side of transceiver 202, satellite system 104 sends the encrypted message with the appended transmitter position data over communications link 220 to antenna 216. Antenna 216 supplies the received encrypted message plus position data over a line 214, junction 216 and line 222 to the input of receiver electronics 224. Receiver electronics 224 converts the received encrypted message plus transmitter position data to base band, and supplies this base band signal over line 226 to the transmitter position extraction stage 228.

As stated above, transmitter position extraction stage 228 extracts the transmitter position data and supplies it via line 230 to the position comparator stage 236, which compares it with the stored authorized transmitter position(s) data from stage 232 to determine whether there is coincidence, indicating that an authentic message has been received. If the position comparator stage 236 determines that an authentic message has been received, it provides a signal on a line 238 to a message authentication stage 240, and then provides the message that has been received to a decryption stage 516 of conventional design on a line 512. Decryption stage 516 is also supplied with the transmitter position element (either the stored authorized transmitter position or the received transmitter position). The decryption stage 516 uses this transmitter position element to decrypt the message supplied by the message authentication stage 240. The decrypted message is supplied by the decryption stage 516 to the authorized user or to a utilization device (not shown).

c. Geostar Example

Figure 6:
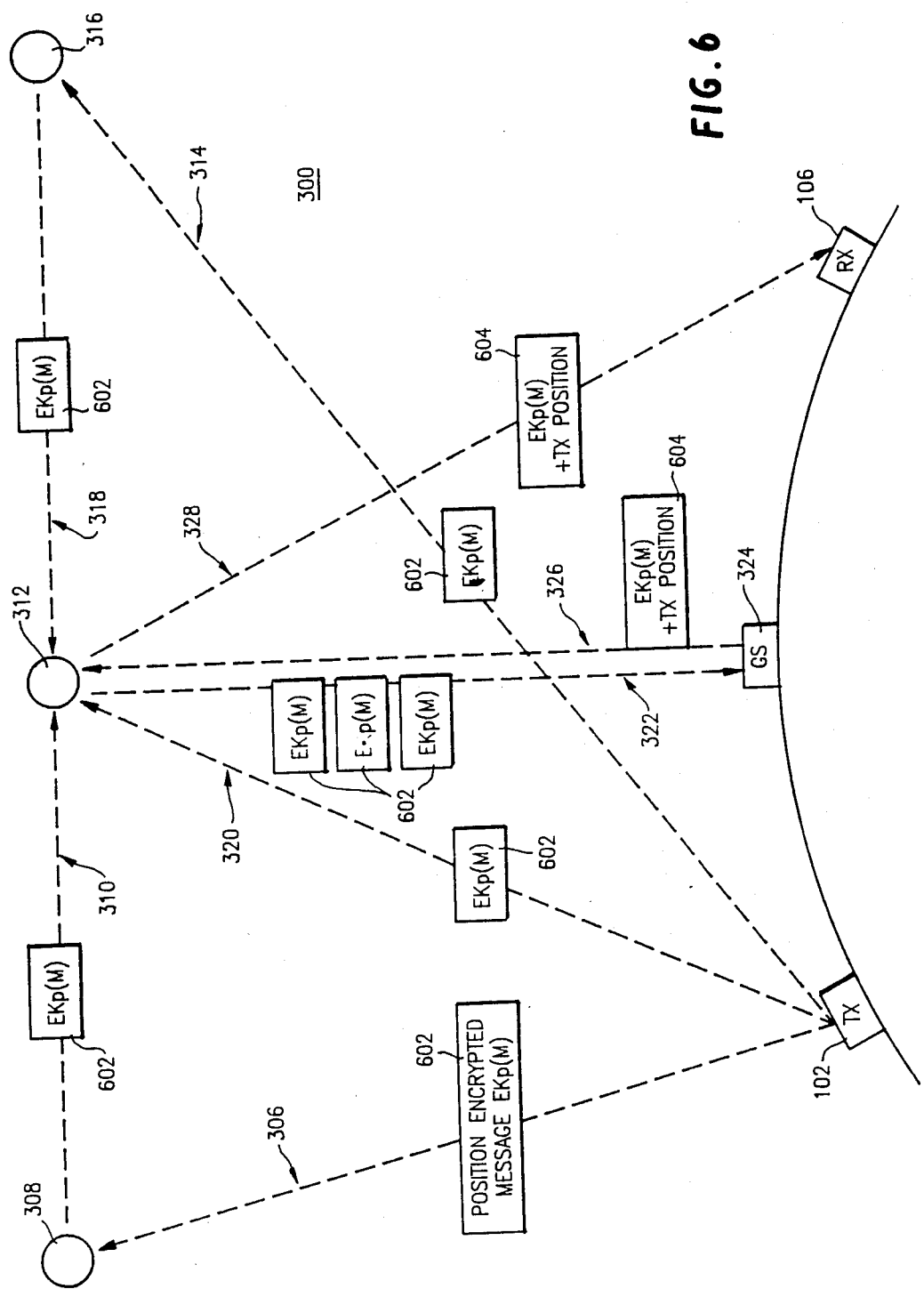
FIG. 6 is a block diagram of the position encryption version of the present invention utilizing the Geostar satellite system.

The position encryption version of the present invention utilizing the Geostar satellite system is shown in block diagram form in FIG. 6. Comparing this version with the clear text version shown in FIG. 3, it is seen that the major difference is that transmitter 102 provides the position encrypted message $EK_p(M)$, as indicated by a block 602 of FIG. 6, as compared to the clear text message (M) 302 of the clear text version shown in FIG. 3.

Similarly, the ground station after determining the transmitter position based on the three received messages from satellite 312 sends the encrypted message $EK_p(M)$ with the appended transmitter (TX) position, as indicated by a block 604, back to satellite 312. Satellite 312, in turn, transmits the encrypted message $EK_p(M)$ with the appended transmitter (TX) position 604 to the receiver 106 located at the second location. The receiver 106 determines whether the received encrypted message is authentic using the coincidence between the received transmitter position and the stored authorized transmitter position, as discussed above with respect to the generalized example and the transceiver example. If an authentic message is detected, it is then decrypted using the transmitter position element. The decrypted message is provided to the authorized user or to a utilization device (not shown).

4. Non-Position Encryption Stationary Transmitter Version a. Generalized Example

Figure 7:
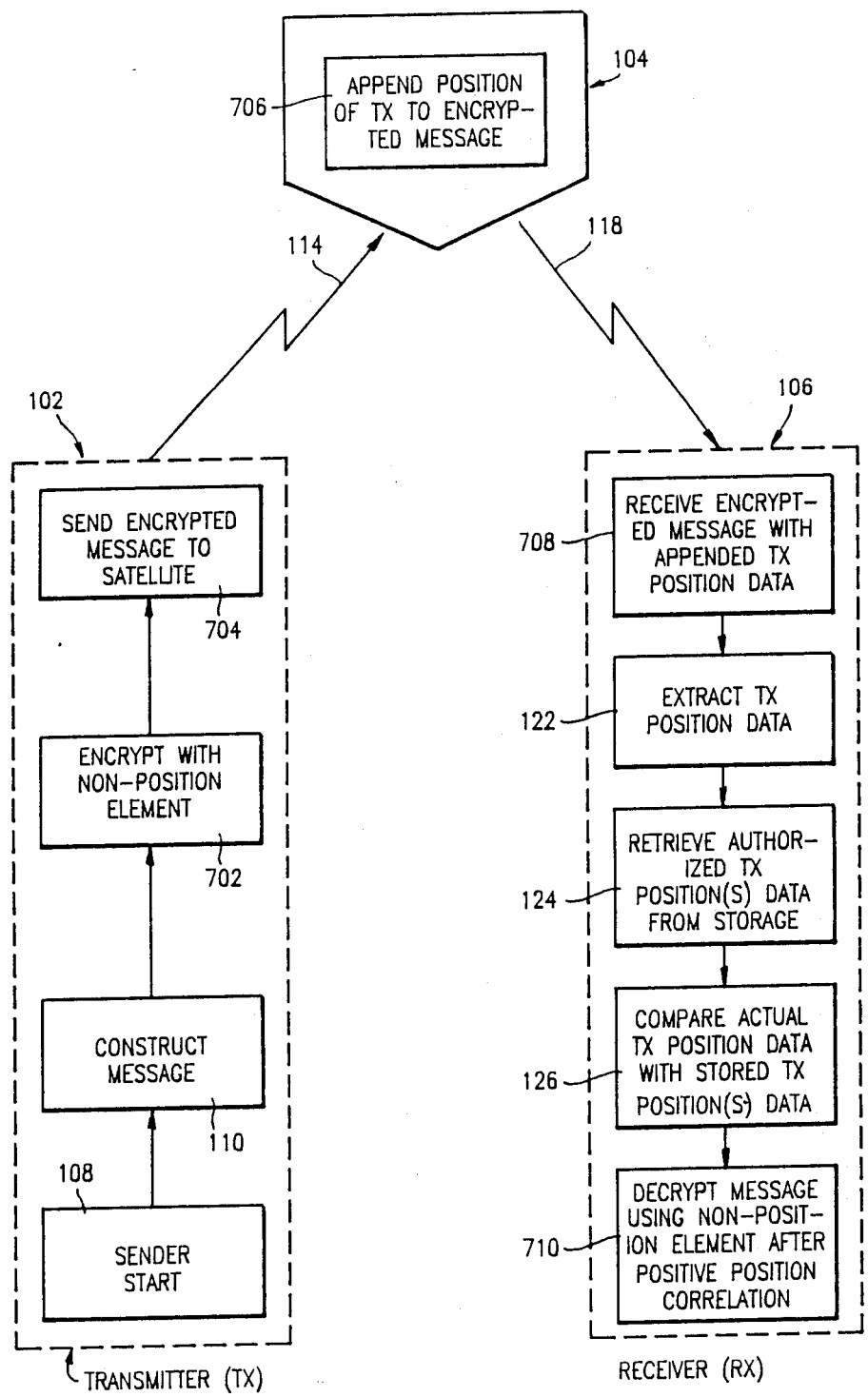
FIG. 7 is a block diagram of the generalized example of the non-position encryption version of the present invention.

The generalized example of the non-position encryption version of the present invention is shown in block diagram form in FIG. 7. Referring to transmitter 102 at the first location, the constructed message from block 110 is encrypted with a non-position element, as indicated by a block 702. The non-position element can be any suitable type of key used to encrypt the message. It can be a personal identification number (PIN), an access code, a location code, a device code, or a secret key. Moreover, several different non-position elements can be utilized by combining them to produce a session key, thus avoiding using a master key to transmit data. Any known encryption technique not relating to the position of the transmitter is encompassed by the non-position element used in step 702.

The non-position encrypted message, as indicated by a block 704, is sent by transmitter 102 over communications link 114 to satellite system 104. Satellite system 104 determines the position of the encrypted message received from transmitter 104. It appends this transmitter position to the encrypted message, as indicated by a block 706, and sends the encrypted message with the appended transmitter position data to the receiver 106 over communications link 118.

Receiver 106 receives the non-position encrypted message with the appended transmitter position data, as indicated by a block 708, and extracts the transmitter position data, as indicated by block 122. It then retrieves from a storage location the authorized transmitter position(s) data, which is compared with the actual transmitter position data, as indicated by block 126, to determine whether an authentic message has been received. If coincidence is detected between these two position data elements, the received message is decrypted using the non-position element, as indicated by a block 710. Receiver 106 stores the non-position element for this decryption process. The decrypted message is then supplied to the authorized user or to a utilization device (not shown).

b. Transceiver Example

Figure 8:
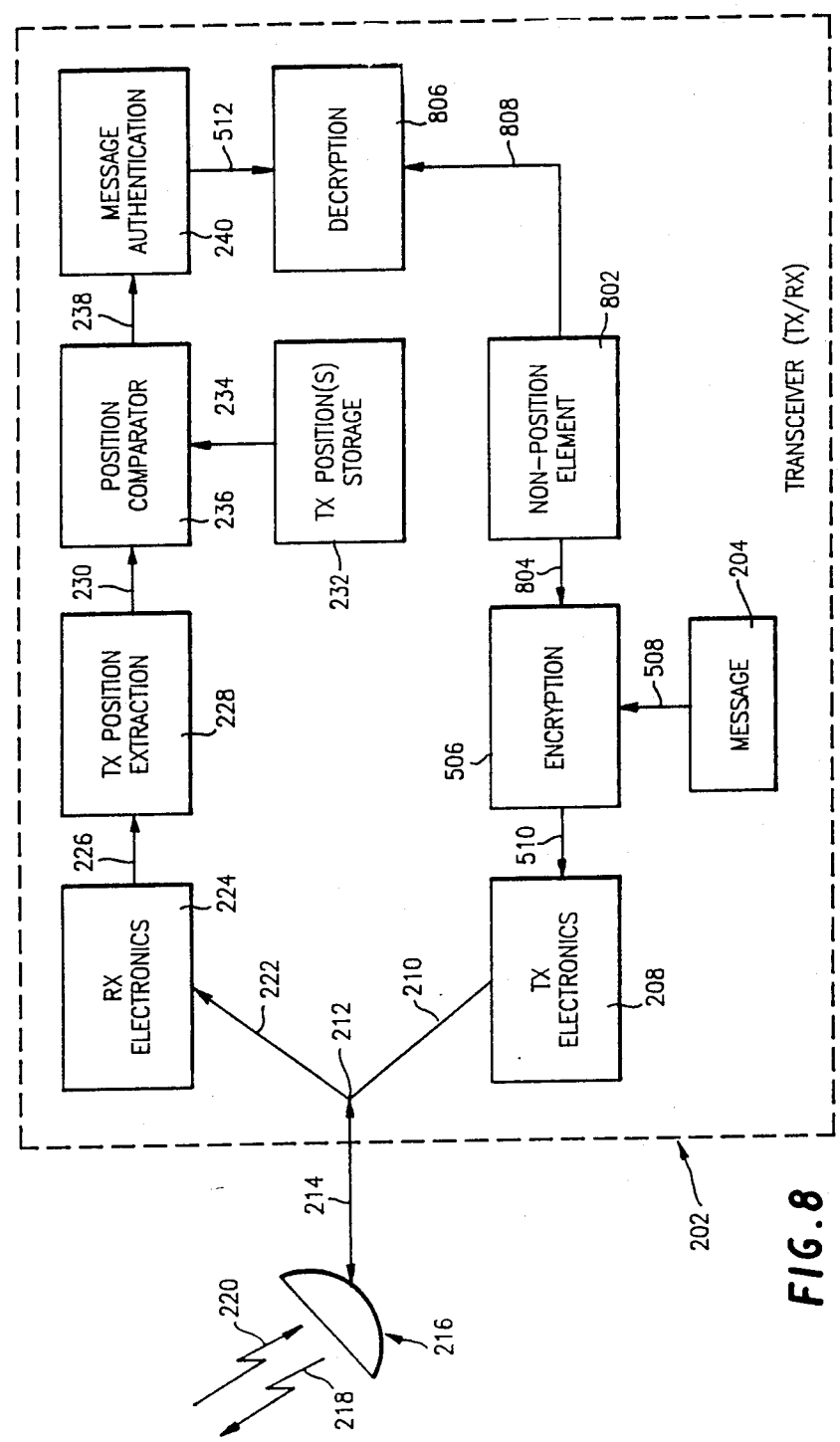
FIG. 8 is a block diagram of a transceiver for implementing the non-position encryption version of the present invention.

A block diagram of a transceiver for implementing the non-position encryption version of the present invention is shown in FIG. 8. Referring first to the transmitter side of transceiver 202, a non-position element stage 802 supplies the non-position element for encryption purposes to encryption stage 506 over a line 804. As stated above, the non-position encryption element can be any type of encryption element that is not a position encryption element. The clear text message from stage 204 is supplied by a line 508 to encryption stage 506, which encrypts it using the non-position element. The encrypted message is sent by line 510 to the transmitter electronics stage 208, which converts it into a signal for transmission by antenna 216 over communications link 218 to the satellite system 104.

Referring now to the receiver side of transceiver 202, the non-position encrypted message with the appended transmitter position data received by antenna 216 from communications link 220 is supplied via line 214 and line 222 to receiver electronics 224. Stages 224, 228, 232, 236 and 240 are identical in structure and operation to the similarly numbered stages discussed above. Once the message authentication stage 240 has determined that it has received an authentic message, it provides the non-position encrypted message over line 512 to a decryption stage 806, of conventional design. The non-position element used for the encryption is also supplied by a stage 802 via a line 808 to the decryption stage 806. Decryption stage 806 decrypts the encrypted message using the non-position element. The decrypted message is provided to the authorized user or to a utilization device (not shown).

c. Geostar Example

Figure 9:
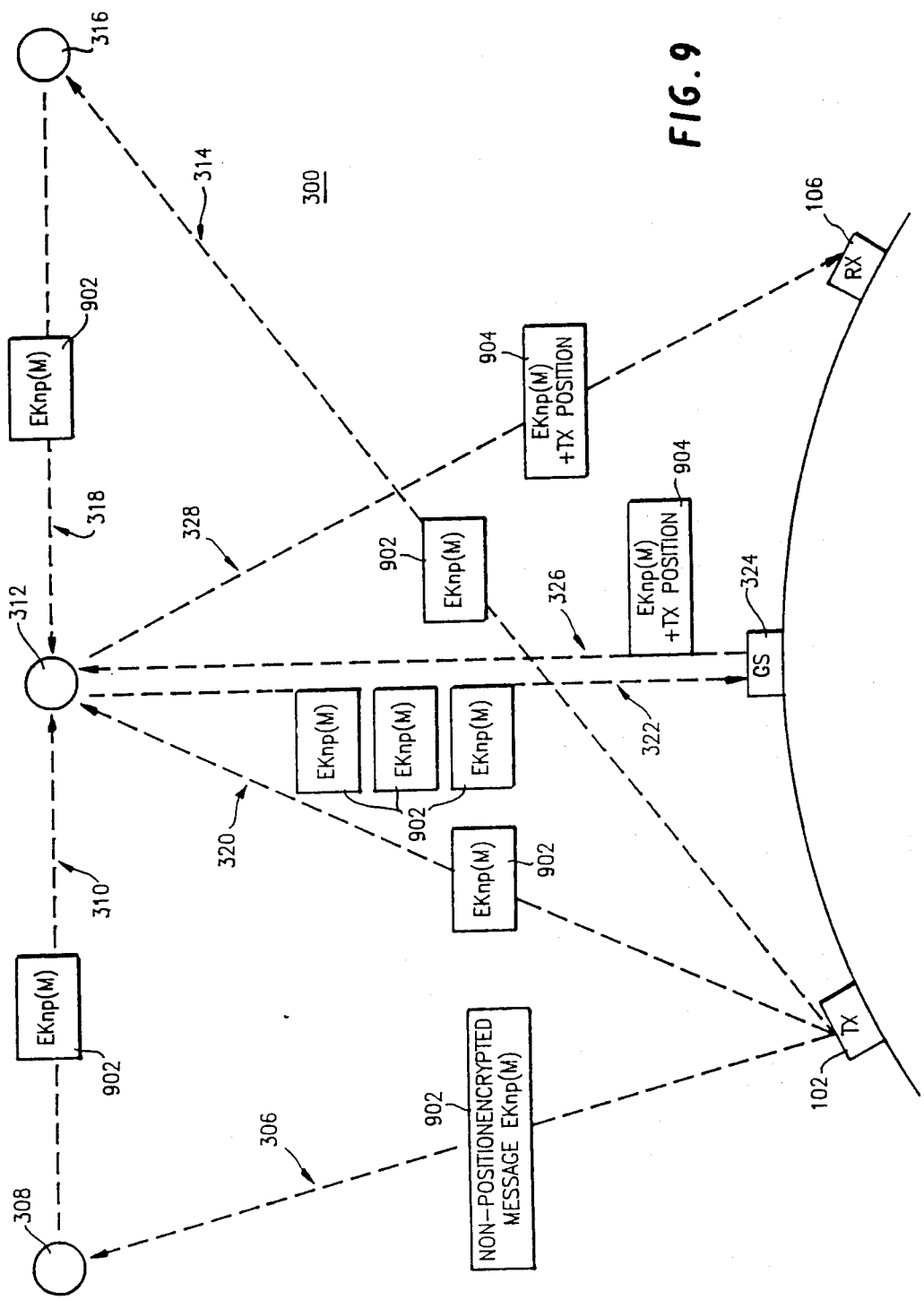
FIG. 9 is a block diagram of the non-position encryption version of the present invention utilizing the Geostar satellite system.

The non-position encryption version of the present invention utilizing the Geostar satellite system is shown in block diagram form in FIG. 9. The only difference between the position encrypted version shown in FIG. 6 and the clear text version shown in FIG. 3 is that the transmitter 102 sends a non-position encrypted message $EK_{NP}(M)$, as indicated by a block 902, to satellites 308, 312, and 316. Similarly, the ground station 324, after determining the position of the transmitter 102 at the first location, sends the non-position encrypted message $EK_{NP}(M)$ with the appended transmitter position, as indicated by a block 904, to satellite 312 over communications link 326. Satellite 312, in turn, sends the non-position encrypted message $EK_{NP}(M)$ with the appended transmitter position data to the receiver 106 over the communications link 328.

Receiver 106 determines whether the non-position encrypted message $EK_{NP}(M)$ is authentic by comparing the received transmitter position with the stored authorized transmitter position(s). If coincidence occurs, as discussed above with the generalized example and with the transceiver example, the receiver decrypts the received message utilizing the non-position encryption element that is stored at the receiver. The decrypted message is then provided to the authorized user or to a utilization device (not shown).

5. Position Plus Non-Position Encryption Stationary Transmitter Version a. Generalized Example

Figure 10:
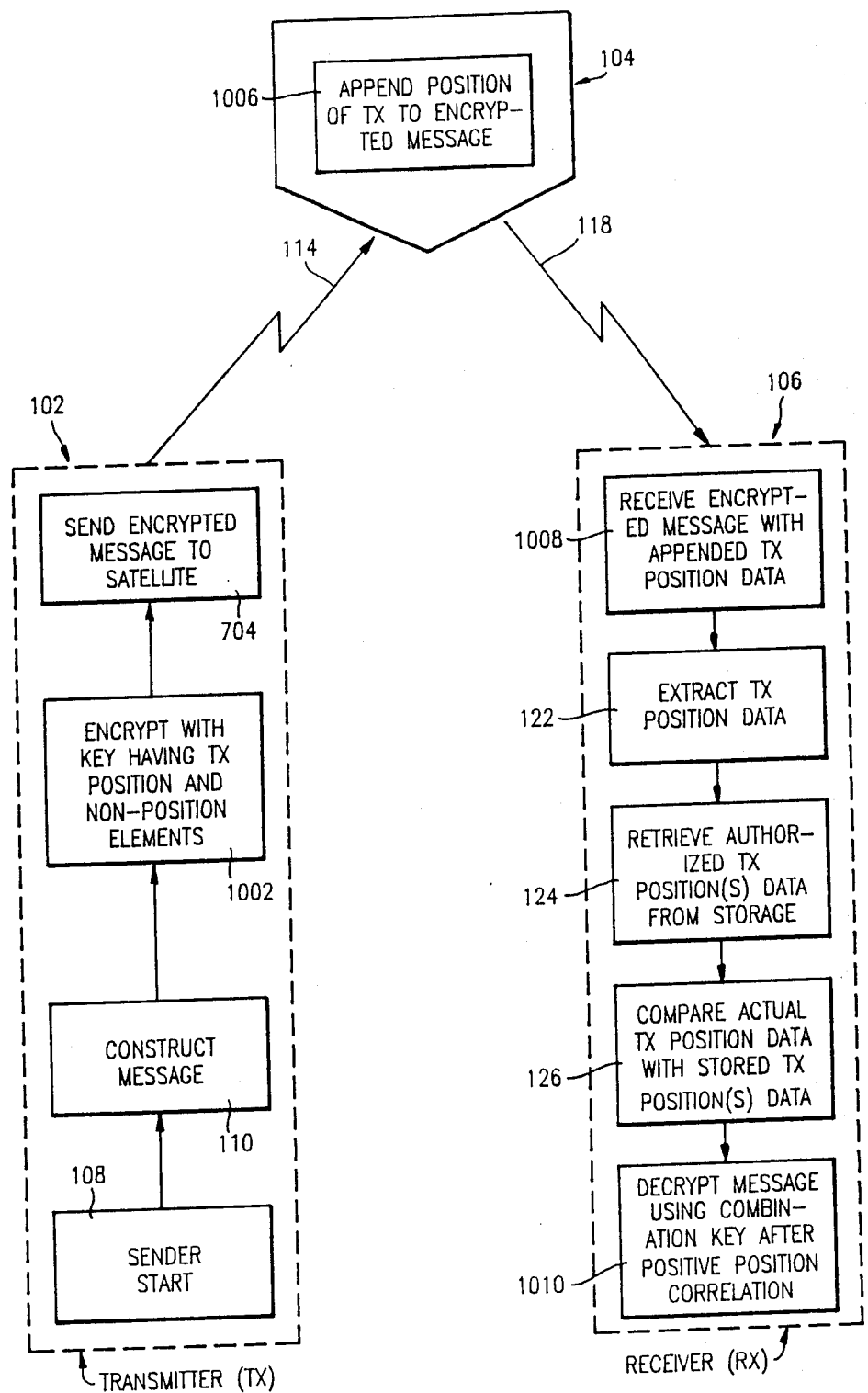
FIG. 10 is a block diagram of the generalized example of the position plus non-position encryption version of the present invention.

The generalized example of the position plus non-position encryption version of the present invention is shown in block diagram form in FIG. 10. The transmitter 102 at the first location constructs a message 110, which is encrypted with an encryption key comprising transmitter position and non-position elements, as indicated by a block 1002. As discussed above with respect to the non-position generalized version of the present invention, the non-position elements can comprise any type of encryption scheme not using the position of the transmitter 102. Obviously, it can be appreciated that the encryption key used with this version of the present invention can be extremely elaborate since it comprises both position and non-position elements. The non-position elements can be used to produce a single non-position element that is then combined with the transmitter position element to form the encryption key used in stage 1002.

Up to this point, only the transmitter position data has been used to encrypt the message. However, the position of the intended receiver can also be used. The use of the receiver position will effectively prevent reading of the encrypted message by other receivers within the authorized network. Other addressee identifiers may also be added to facilitate electronic mail capabilities. The receiver position and other addressee identifiers can be used with any position encryption version of the present invention.

The encrypted message is then sent by the transmitter 102, as indicated by block 704, to satellite system 104 over the communications link 114. Satellite system 104 determines the position of the transmitter 102 based on the received encrypted message. It then appends this transmitter position data to the encrypted message, as indicated by a block 1006, which encrypted message with the appended transmitter position data is sent over communications link 118 to the receiver 106.

Receiver 106 receives the encrypted message with the appended transmitter position data, as indicated by a block 1008. It then extracts the transmitter position data, as indicated by block 122, and retrieves the authorized transmitter position(s) data from a storage location, as indicated by block 124. It then compares the actual transmitter position data with the stored authorized transmitter position(s) data, as indicated by block 126, to determine whether an authorized message has been received.

If an authorized message is determined to have been received, receiver 106 then decrypts the message using a combination key made up of the transmitter position element and the non-position element, which are stored at the receiver. The decrypted message is then supplied to the authorized user or to the utilization device (not shown).

In all of the examples presented above, the position data sent over the satellite system 104 is in unencrypted form. It should be understood, however, that this position data also can be encrypted. Obviously, if the transmitter position data is encrypted, the unauthorized user will have even greater difficulty with active attack of the present invention.

b. Transceiver Example

Figure 11:
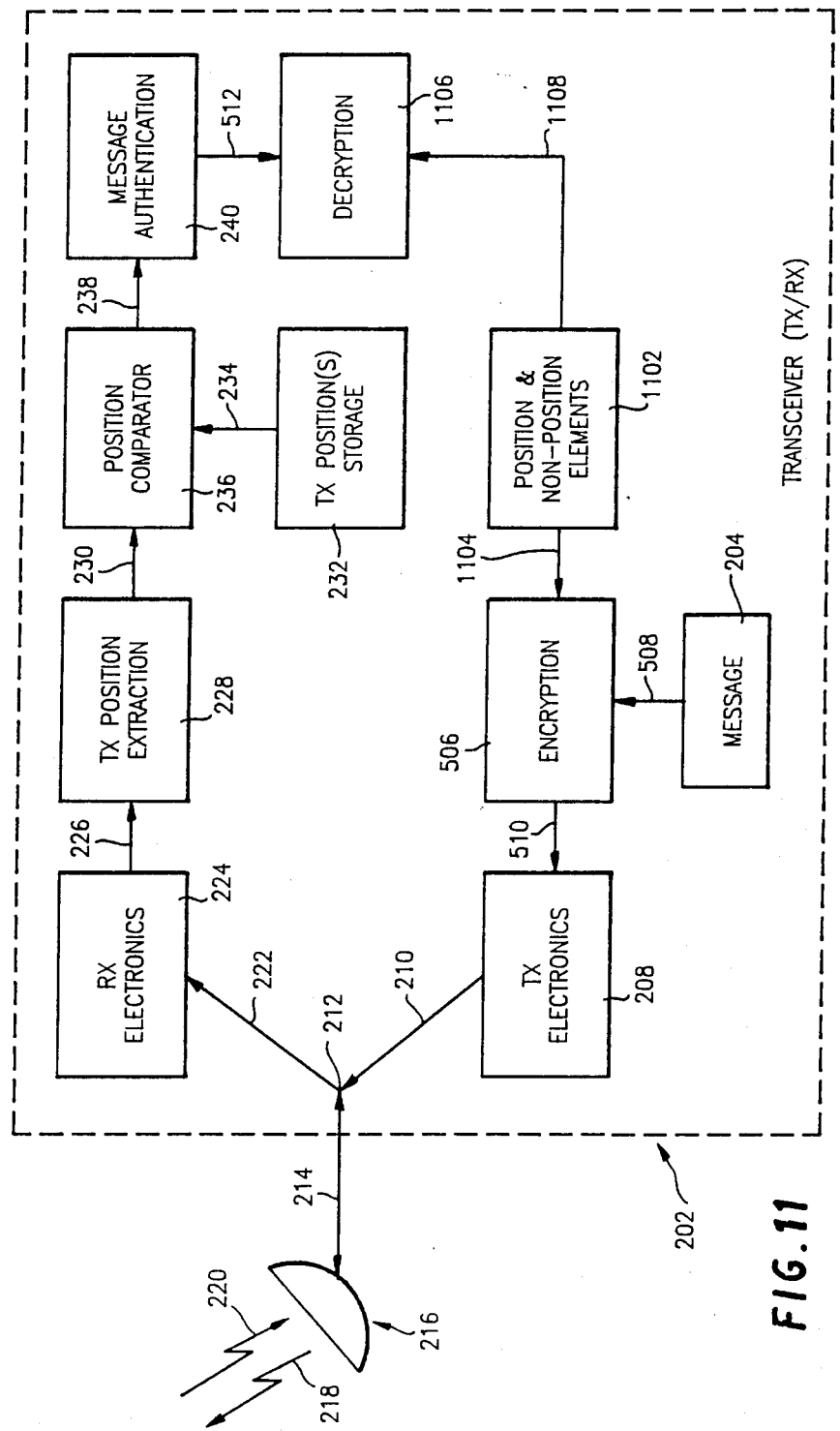
FIG. 11 is a block diagram of a transceiver for implementing the position plus non-position encryption version of the present invention.

A block diagram of a transceiver for implementing the position plus non-position version of the present invention is shown in FIG. 11. Referring first to the transmitter side of transceiver 202, a position and non-position elements stage 1102 provides these position and non-position elements used for encryption purposes to the encryption stage 506 over a line 1104. Encryption stage 506 receives the clear text message from stage 204 over line 508, and encrypts this message accordingly. The transmission of the encrypted message is the same as that used with the other transceiver examples discussed above.

Referring now to the receiver side of the transceiver 202, antenna 216 and stages 224, 228, 234, 236 and 240 are the same as the correspondingly numbered stages shown with the other transceiver examples discussed above. Once an authentic message has been detected, message authentication stage 240 supplies the encrypted message to a decryption stage 1106 over line 512. Decryption stage 1106 also receives the position and non-position elements that are stored at the receiver at the line 1108. It uses these position and non-position elements to decrypt the encrypted message. The encrypted message is supplied to the authorized user or to a utilization device (not shown).

c. Geostar Example

Figure 12:
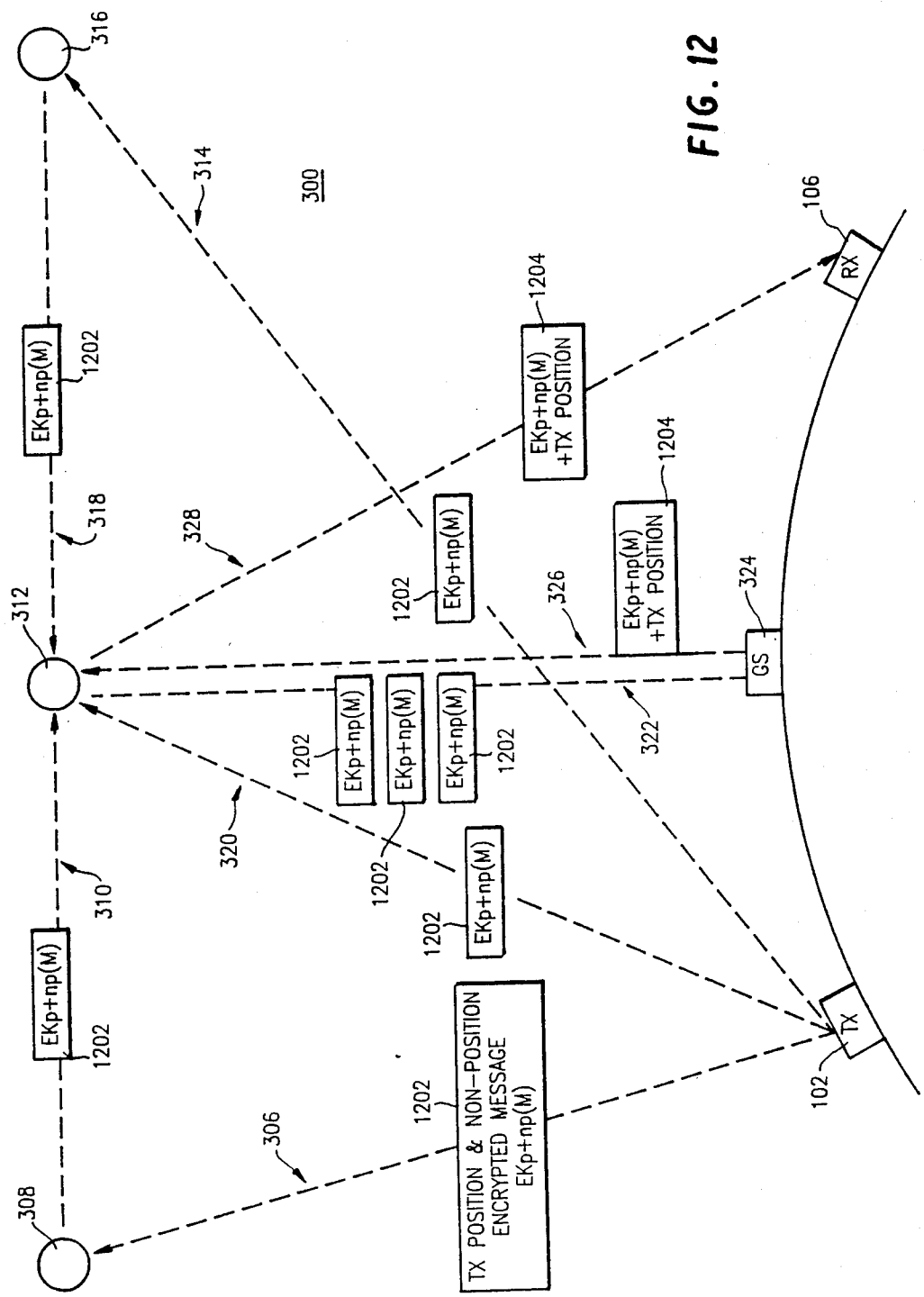
FIG. 12 is a block diagram of the position plus the non-position encryption version of the present invention utilizing the Geostar satellite system.

The position plus the non-position encryption version of the present invention utilized in the Geostar satellite system is shown in block diagram form in FIG. 12. The difference between the version shown in FIG. 12 and that shown in FIGS. 3, 6 and 9 is that transmitter 102 at the first location encrypts the message $EK_{P+NP}(M)$ using both the position and non-position elements. This encrypted message, as indicated by block 1202, is sent to satellites 308, 312 and 316.

The ground station 324, after determining the position of the received message from transmitter 102, sends the encrypted message with the appended transmitter position, as indicated by block 1204, to satellite 312. Satellite 312, in turn, sends the encrypted message with the appended transmitter position 1204 to the receiver 106 at the second location. The receiver 106 determines whether it has received an authentic message using the actual transmitter position comparison with the stored authorized transmitter position. If an authentic message is determined to be present, the message is decrypted using the position and non-position elements in the fashion discussed above with respect to the generalized example and the transceiver example. The decrypted message is provided to the user or to a utilization device (not shown).

6. Position Syncing Mobile Transceiver Example a. Generalized Example

Figure 13A:
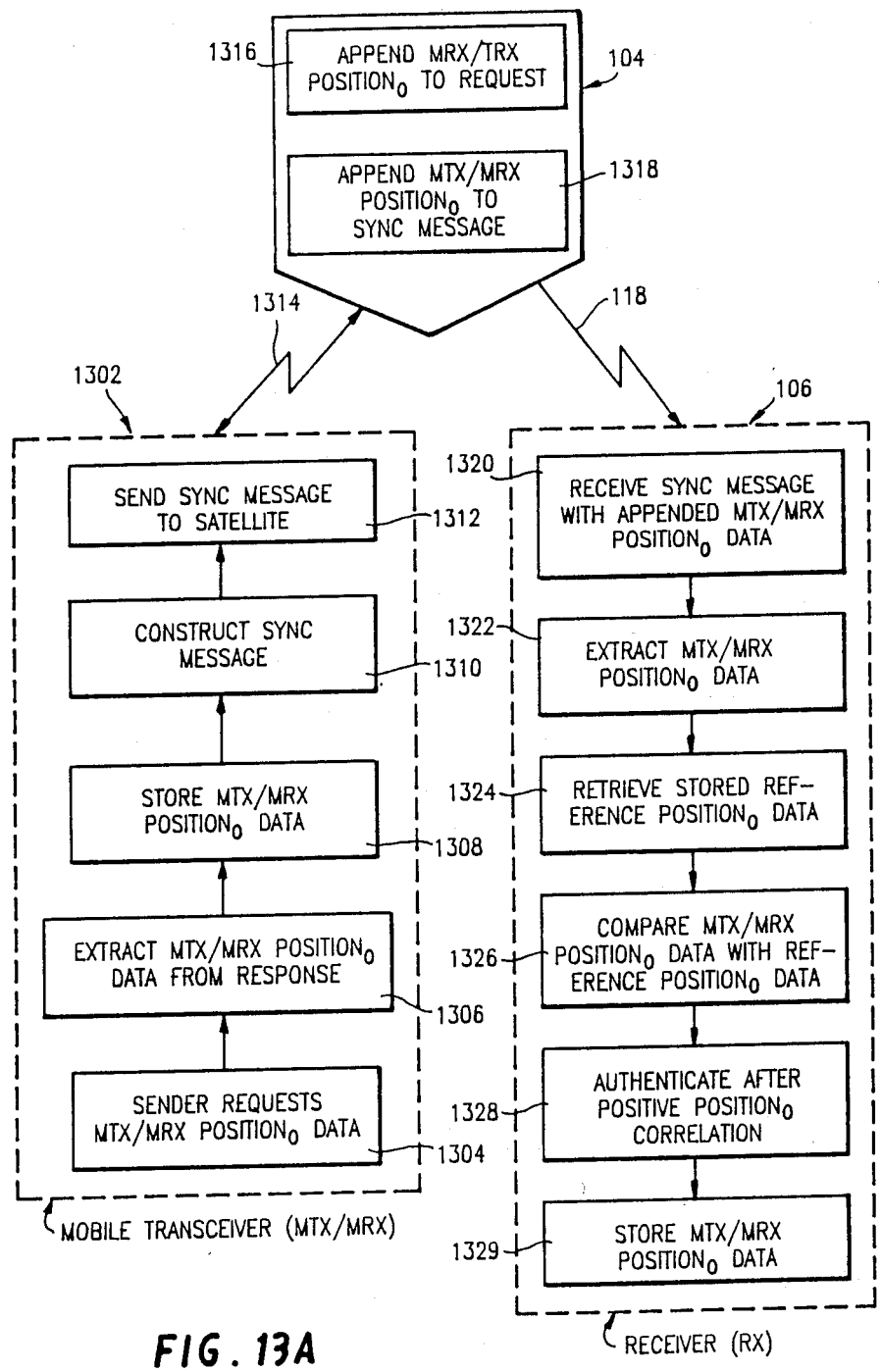
FIG. 13a is a block diagram of the initial transmission in the generalized example of the position syncing version of the present invention.
Figure 13B:
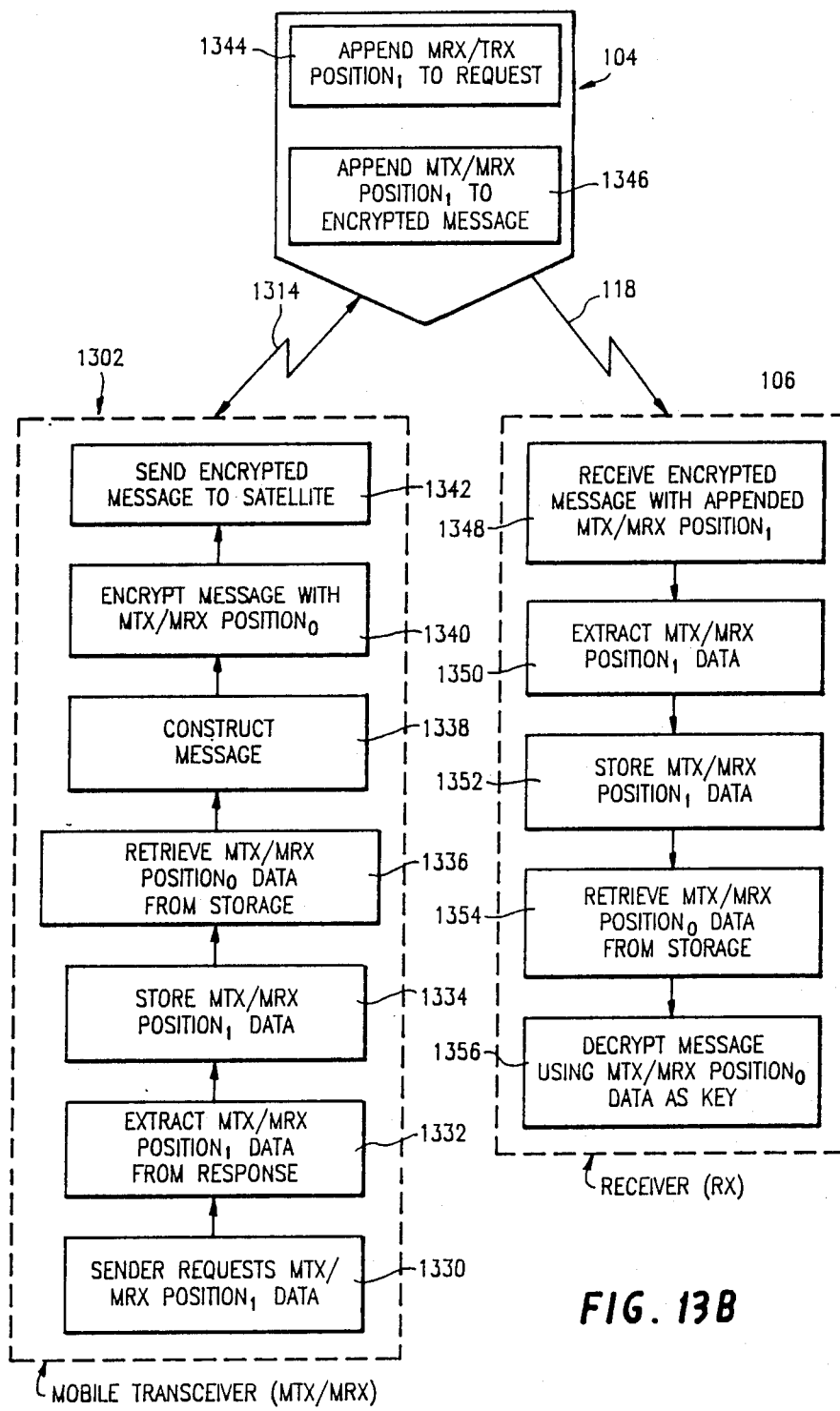
FIG. 13b is a block diagram of a subsequent transmission in the generalized example of the position syncing version of the present invention.

FIGS. 13A and 13B pertain to the generalized example of the position syncing version of the present invention. FIG. 13A is a block diagram of the initial transmission, while FIG. 13B is a block diagram of a subsequent transmission. The position syncing version of the present invention allows the transmitter to move while the receiver determines whether an authentic message has been received. Because the moving or mobile transmitter must also be able to receive information from the satellite communication system 104, a transceiver is required.

Referring now to FIG. 13A, the mobile transceiver (MTX/MRX) 1302 must begin the communications sequence with receiver 106 by being physically located at an initial MTX/MRX position$_0$ location. This initialization location, designated the MTX/MRX position$_0$ data, is required in order for the present invention to initialize the data sequence. The syncing process that is used can then take place after this initialization. This can easily take place by having the transceiver located at a starting position$_0$ before it starts its various movements. After it leaves the initial position$_0$ the transceiver can move anywhere, and its movements need not be planned in advance since the present invention can track the mobile transceiver and determine whether it has received authentic messages.

The first step in the initialization process is for the authorized user (sender) to request MTX/MRX position$_0$ data, as indicated by a block 1304, from the satellite communications system 104. Upon receipt of this request, the satellite communications system 104 determines the initial position$_0$ of the mobile transceiver 1302. It then appends this position$_0$ to the request, as indicated by a block 1316, and sends the request with the appended position$_0$ data back to the mobile transceiver 1302 via the bidirectional communications link 1314.

The mobile transceiver 1302 then extracts the MTX/MRX $position_0$ data from the response received from the satellite system 104, as indicated by a block 1306. It then stores the MTX/MRX $position_0$ data for later use, as indicated by a block 1308. A sync message is then constructed, as indicated by block 1310. The purpose of the sync message is to initialize the receiver 106 with respect to the initial $position_0$ of the mobile transceiver 1302. As discussed below, the mobile transceiver 1302 must be at the proper initial $position_0$ location in order for this sync message to initialize the communications link with the receiver 106.

The sync message is sent by the mobile transceiver 1302, as indicated by block 1312, over the bidirectional communications link 1314 to the satellite system 104. The satellite system 104 can again determine the position of the mobile transceiver 1302, or alternately, can go ahead and append the previously calculated MTX/MRX $position_0$ data from the previous request interchange. In either event, the sync message has appended to it the MTX/MRX $position_0$ data, as indicated by a block 1320, and then extracts the MTX/MRX $position_0$ data, as indicated by a block 1322. It then retrieves the stored reference $position_0$ data, as indicated by a block 1324, from a storage location at the receiver 106. It then compares the MTX/MRX $position_0$ data with the reference $position_0$ data, as indicated by a block 1326, to determine whether the mobile transceiver 1302 is at the proper initial location for the syncing message interchange.

If this is detected, i.e., positive $position_0$ correlation has taken place, as indicated by a block 1328, it then stores the MTX/MRX $position_0$ data for later use, as indicated by a block 1329. This constitutes the initialization transmission that must take place with the mobile transceiver version of the present invention.

Referring now to FIG. 13B, a subsequent transmission now that initialization has taken place is discussed. When the mobile transceiver 1302 wishes to send a message to the receiver 106, it first sends a request for the MTX/MRX $position_1$ data, as indicated by a block 1330, to the satellite communications system 104. The satellite communications system 104 determines the new position, $position_1$, of the mobile transceiver 1302, and then appends the MTX/MRX $position_1$ data to the step request, as indicated by a block 1344. This information is sent by the satellite communications system 104 over the bidirectional communications link 1314 to the remote transceiver 1302.

The mobile transceiver 1302 extracts the MTX/MRX $position_1$ data from the response received from the satellite communications system 104 It then stores this MTX/MRX $position_1$ data, as indicated by a block 1334.

Thereafter, the transceiver retrieves from a storage location the MTX/MRX $position_0$ data, as indicated by a block 1336. The MTX/MRX $position_0$ data, it may be recalled, was that received in the initialization exchange discussed with respect to FIG. 13A. The message is then constructed based on the data received from the authorized user, as indicated by block 1338. The message is then encrypted using the MTX/MRX $position_0$ data, as indicated by block 1314.

The mobile transceiver 1302 then sends the encrypted message to the satellite communications system 104 over the bidirectional data link 1314. The satellite communications system 104 then does the following. It either appends the MTX/MRX $position_1$ data that had been derived from the request interchange (block 1330), or it independently determines the MTX/MRX $position_1$ based on the encrypted message that it has just received In either case, it appends the MTX/MRX $position_1$ data to the encrypted message, as indicated by a block 1346, and then sends the encrypted message with this appended MTX/MRX $position_1$ data over communications link 118 to the receiver 106.

The receiver receives the encrypted message with the appended MTX/MRX $position_1$ data, as indicated by a block 1348. It then extracts the MTX/MRX $position_1$ data, as indicated by a block 1350, and stores the MTX/MRX $position_1$ data for later use, as indicated by a block 1352. It then retrieves the MTX/MRX $position_0$ data from a storage location, as indicated by block 1354, which was received from the initialization exchange discussed above with respect to FIG. 13A. Thereafter, it decrypts the message using the MTX/MRX $position_0$ data as a decryption key, as indicated by a block 1356. The decrypted message is provided by receiver 106 to the authorized user or to a utilization device (not shown).

It is thus seen that the position syncing version of the present invention allows the receiver to constantly change the encryption key using the most previously received position as the present key. In this way, this version of the present invention is highly resistant to passive and active attack because two transmitters cannot occupy the same physical location at the same time without detection.

b. Alternative Generalized Example

Figure 14A:
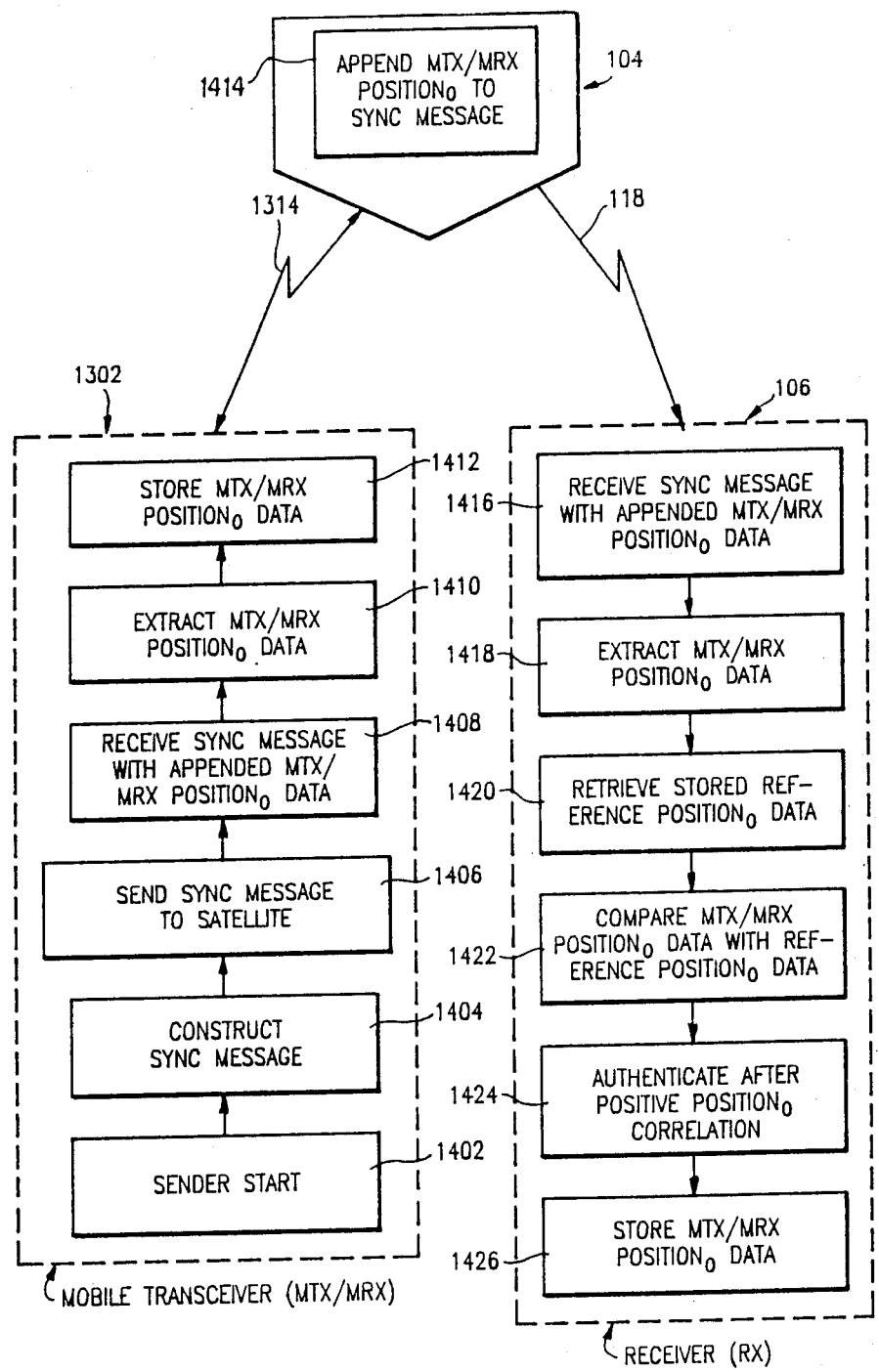
FIGS. 14a and 14b illustrate an alternate method of implementing the position syncing version of the present invention.
Figure 14B:
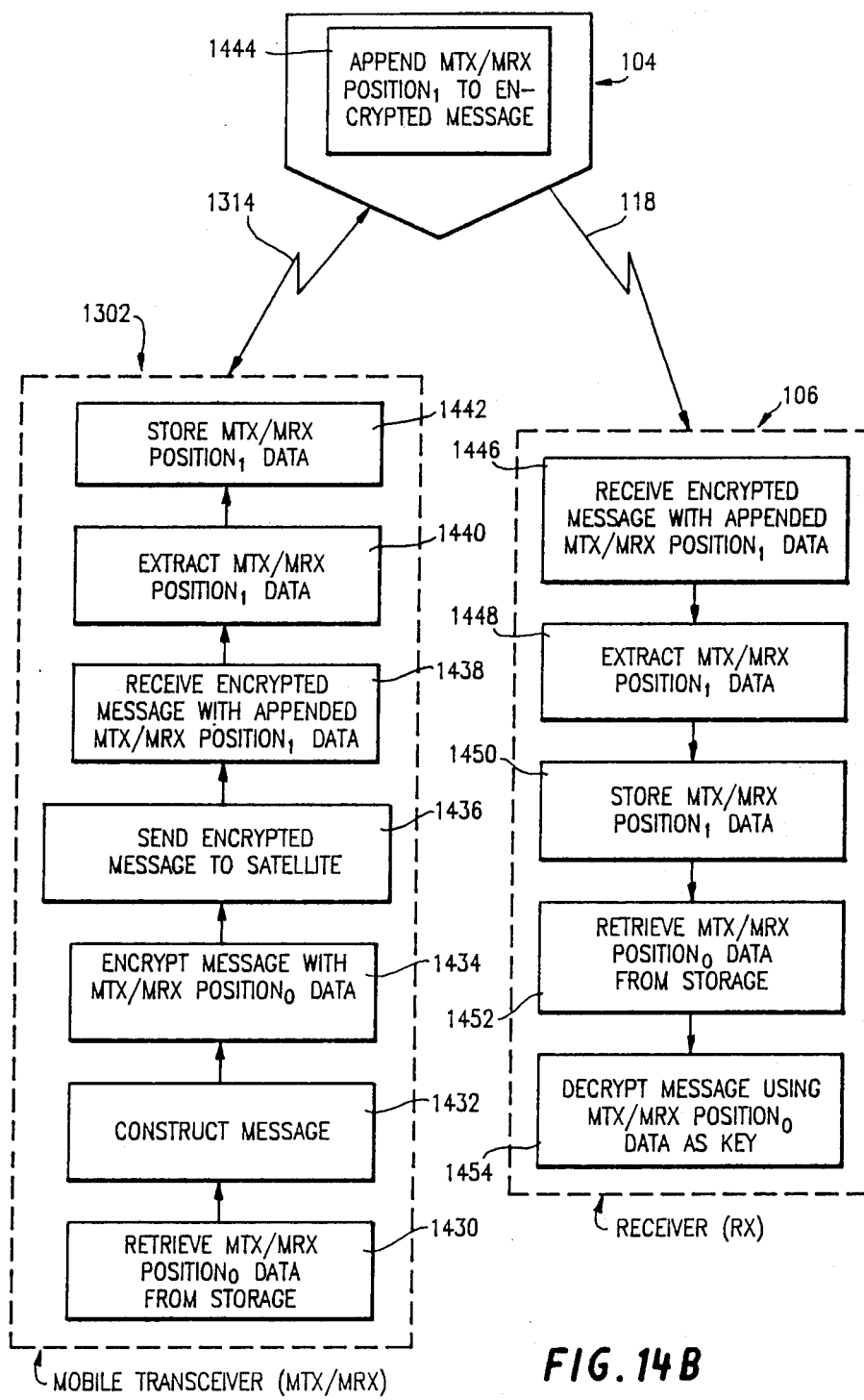

An alternative generalized example of the position syncing mobile transceiver version of the present invention is shown in FIGS. 14A and 14B. FIG. 14A shows the initialization transmission sequence, while FIG. 14B shows the subsequent data transmission sequence. The main difference between the version described above in FIGS. 13A and 13B and the present example shown in FIGS. 14A and 14B is that in the present example the transceiver 1302 does not have to use a sender request sequence for each transmission sequence that occurs.

Specifically, and referring to the initialization transmission sequence shown in FIG. 14A, the sender starts the operation of the transceiver 1302, as indicated by a block 1402. Thereafter, a sync message 1404 is constructed by transceiver 1302. This sync message is sent to the satellite system 104, as indicated by a block 1406. The satellite 104 then determines the position of the transceiver 1302 using the received sync message received over the transmission link 1314. This position must be the MTX/MRX $position_0$ data, which is the required initialization position for the transceiver 1302 in order for the transmission sequence to occur. The satellite system 104 then sends back the MTX/MRX $position_0$ data to the transceiver 1302 over the bidirectional communications link 1314.

The transceiver 1302 receives the sync message with the appended MTX/MRX $position_0$ data, as indicated by a block 1408. It then extracts the MTX/MRX $position_0$ data, as indicated by a block 1410, and stores it, as indicated by a block 1414.

The satellite system 104 also sends the sync message with the appended MTX/MRX $position_0$ data to the receiver 106 over the communications link 118, as indicated by a block 1416. Note that both the transceiver 1302 and the receiver 106 receive the sync message with the appended MTX/MRX $position_0$ data in this version of the present invention.

The receiver 106 then extracts the MTX/MRX position$_0$ data that is appended to the sync message, as indicated by a block 1418. It retrieves a stored reference position$_0$ data from a memory location, as indicated by a block 1420, and compares the received MTX/MRX position$_0$ data to the reference position$_0$ data, as indicated by a block 1422. If the comparison indicates coincidence, which shows that an authentic initialization sequence has occurred, as indicated by a block 1424, the receiver 106 stores the MTX/MRX position$_0$ data for subsequent use, as indicated by a block 1426. This completes the initialization transmission sequence.

Note that under the initialization transmission sequence, the transceiver 1302 must be physically located at the proper MTX/MRX position$_0$ data position. Obviously, as discussed above, the accuracy of position measurement will determine how close the mobile transceiver 1302 must be to the absolute MTX/MRX position$_0$. However, it is required that the transceiver 1302 be within the resolution zone around the absolute position$_0$ in order for the initialization sequence to occur (i.e., the receiver 106 to authenticate the received MTX/MRX position$_0$ data indicated in block 1424).

Referring now to FIG. 14B, the subsequent transmission sequence following the initialization transmission sequence is shown. First, the MTX/MRX position$_0$ data is retrieved from a storage location at the transceiver 1302, as indicated by a block 1430. Then transceiver 1302 constructs a message based on data received from an authorized user, as indicated by a block 1432. The constructed message is then encrypted using the MTX/MRX position$_0$ data, as indicated by a block 1434.

The encrypted message is then sent by the transceiver 1302 to the satellite system 104, as indicated by a block 1436. Satellite system 104, as it did with respect to the initialization sequence described above, determines the position of transceiver 1302 from the received message transmitted over the bidirectional communications link 1314. After determining the position of transceiver 1302, which is denominated MTX/MRX position$_1$, satellite system 104 sends the encrypted message along with the appended MTX/MRX position$_1$ data, as indicated by a block 1444, to the transceiver 1302, which receives it as indicated by a block 1438.

Transceiver 1302 then extracts the MTX/MRX position$_1$ data from the received encrypted message, as indicated by a block 1440, and stores the MTX/MRX position$_1$ data as indicated by a block 1442.

The satellite communication system 104 also sends the encrypted message with the appended MTX/MRX position$_1$ data over the communications link 118 to the receiver 106, as indicated by a block 1446. The receiver then extracts the MTX/MRX position$_1$ data, as indicated by a block 1448, and stores the MTX/MRX position$_1$ data for later use, as indicated by a block 1450.

Then, the receiver 106 retrieves the MTX/MRX position$_0$ data from a storage location, as indicated by a block 1452. It may be recalled that the MTX/MRX position$_0$ data was received from the initialization transmission sequence discussed above with respect to FIG. 14A. The receiver 106 then decrypts the received message using the MTX/MRX position$_0$ data as a key, as indicated by block 1454.

Subsequent transmission sequences follow the same sequence shown in FIG. 14B. It is thus seen that the previously received position data is used by the receiver 106 to decrypt the latest received message, and the latest position data is stored for subsequent decryption of an immediately succeeding message. In this way, the previous position data is used by the present invention for decryption of an immediately subsequent message. In this way, the present invention is highly resistant to active and passive attack.

c. Transceiver Example

Figure 15:
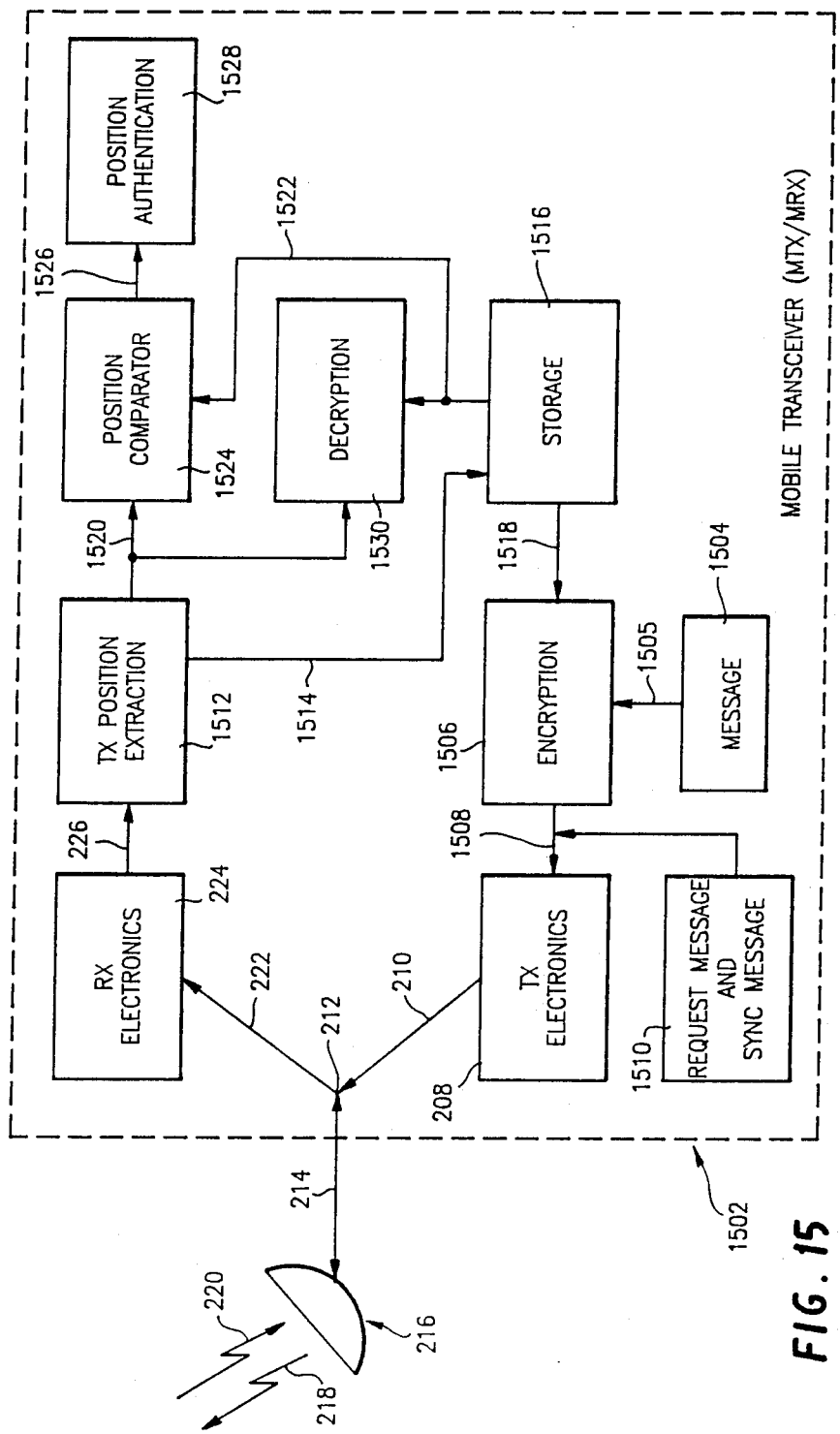
FIG. 15 is a block diagram of a transceiver for implementing the position syncing version of the present invention.

A transceiver for implementing the position syncing version of the present invention is shown in block diagram form in FIG. 15. A message from an authorized user is provided by a message stage 1504 over a line 1505 to an encryption stage 1506. Encryption stage 1506 also receives MTX/MRX position$_{n-1}$ data from a storage stage 1516, where n is a positive integer equal to the transmission sequence and where n=1 for the initialization sequence. A request message and sync message stage 1510 provides to the transmitter (TX) electronics stage 208 request messages and sync messages on demand. In this way, the transceiver 1502 can implement either the generalized version or the alternative generalized version described above, respectively, with respect to FIGS. 13A and 13B and FIGS. 14A and 14B.

On the receiver side of the transceiver 1502, RX electronics stage 224 receives the encrypted message along with the appended MTX/MRX position$_n$ data from the satellite communications system 104 (not shown in FIG. 15) over the transmission link 220. RX electronics stage 224 provides a base band signal on a line 226 of the received encrypted message and the appended MTX/MRX position$_n$ data.

A transmitter (TX) position extraction stage 1512 connected to line 226 extracts the MTX/MRX position$_n$ data from the received encrypted message. The extracted MTX/MRX position$_n$ data is provided via a line 1514 to the storage stage 1516 for storage therein Also, the transmitter position extraction stage 1512 provides the MTX/MRX position$_0$ data during the initialization transmission sequence to a position comparator stage 1524. During this initialization transmission sequence, the position comparator stage 1524 is also provided with the stored reference position$_0$ data from the storage stage 1516 to determine whether an authentic MTX/MRX position$_0$ data has been received, indicating that proper initialization of the transmission sequence has occurred. If authentication occurs, as indicated by a position$_0$ authentication stage 1528, the transceiver 1502 is now in a position to transmit subsequent data transmissions to the receiver 106 via the satellite system 104.

In subsequent transmissions after the initialization transmission sequence, the transmitter (TX) position extraction stage 1512 provides the encrypted message to the decryption stage 1530. Similarly, the storage stage 1516 provides the proper MTX/MRX position-$_{n<1}$ data to the decryption stage 1530 to allow proper decryption to occur. In this way, the most previously received MTX/MRX position data is used to decrypt the encrypted message received in the subsequent message.

In this way, transceiver 1502 implements this version of the present invention, which is highly immune to both active and passive attack. Note that all of the stages shown for transceiver 1502 above are conventional.

d. Geostar Example

Figure 16A:
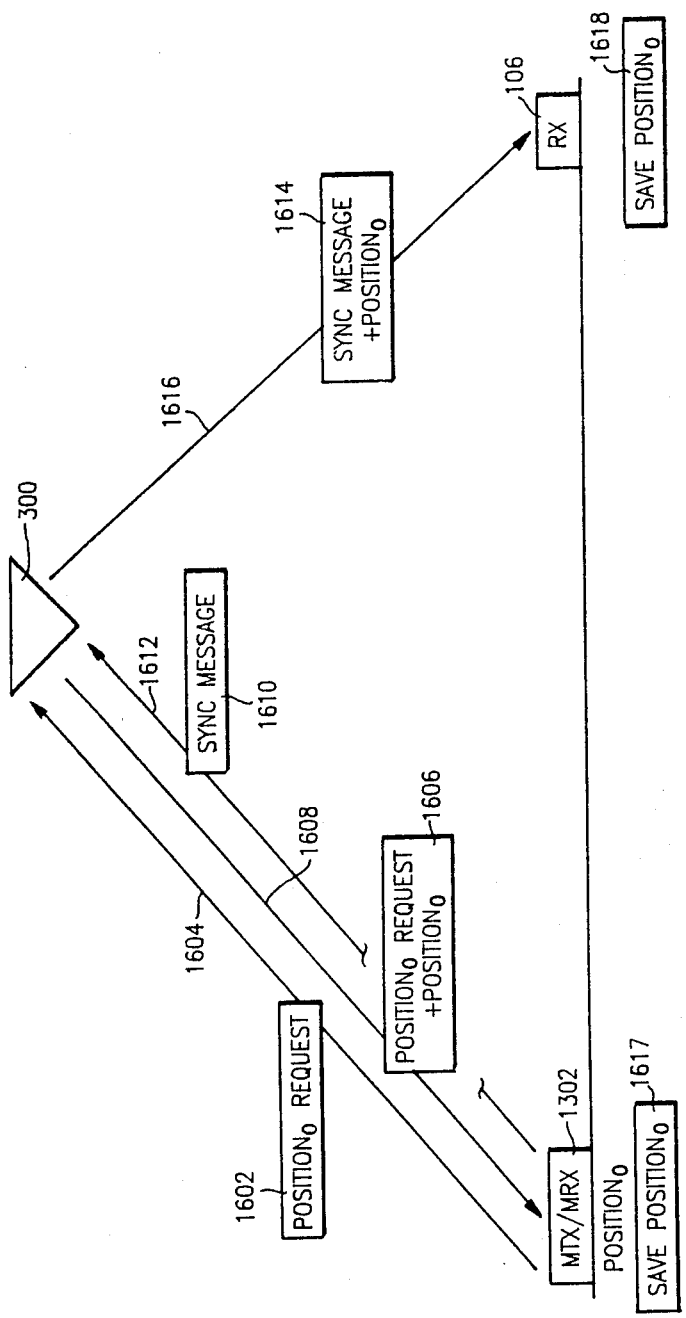
FIGS. 16a and 16b illustrate the position syncing version of the present invention utilizing the Geostar satellite system.
Figure 16B:
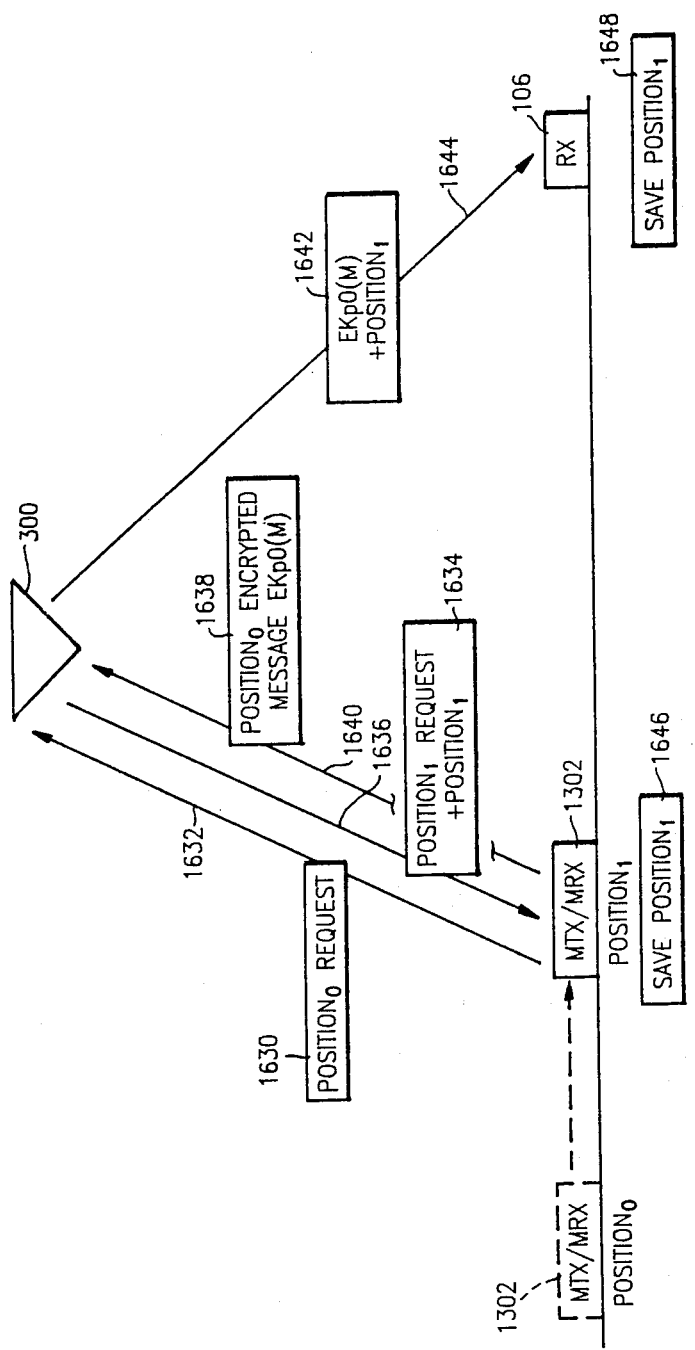

The position syncing version of the present invention utilizing the Geostar satellite system 300 is illustrated in FIGS. 16A and 16B. For purposes of brevity, the three satellites which make up the Geostar satellite system are not shown in FIGS. 16A and 16B. However, it should be understood that they are present in the version now being described, and a proper explanation of them can be obtained by referring to the Geostar examples described above in connection with the stationary transmitter versions of the present invention.

Referring now to FIG. 16A, in the initialization sequence, the transceiver MTX/MRX 1302 first sends a $position_0$ request 1602 to the Geostar satellite system 300 over transmission link 1604. The Geostar satellite system 300 then determines the position of the transceiver 1302 based on the $position_0$ request message 1602. After the Geostar system 300 has determined the $position_0$ of the MTX/MRX transceiver 1302, it appends the $position_0$ data to the $position_0$ request, as indicated by a block 1606, and transmits the combined message to the transceiver 1302, as indicated at block 1608.

After the transceiver 1302 has received the $position_0$ request (sender request) with the appended $position_0$ data, it stores the MTX/MRX $position_0$ data. It then constructs a sync message 1610, which is sent to the Geostar satellite system 300, as indicated by a transmission 1612.

The Geostar satellite system 300 then appends the MTX/MRX $position_0$ data to the sync message 1610. The Geostar satellite system 300 either can retrieve the MTX/MRX $position_0$ data generated in the $position_0$ request 1602 exchange described above, or can again determine the MTX/MRX $position_0$ based on the receipt of the sync message 1610.

In either case, the Geostar satellite system 300 then transmits the sync message with the appended $position_0$ data 1614 to the receiver 106 at the second location, as indicated by a transmission 1616 in FIG. 16A. The receiver 106 then extracts the MTX/MRX $position_0$ data, and stores it at a memory location, as indicated by a block 1618. This completes the initialization transmission exchange used by the Geostar version of the present invention.

Turning now to the next transmission that occurs using the mobile transceiver 1302, reference is made to FIG. 16B. It is seen in the lefthand corner of the Figure that the transceiver 1502 has moved from the illustrative dashed-line $position_0$ to the solid-line $position_1$. At $position_1$, the transceiver 1302 sends a $position_1$ request message 1630 to the Geostar satellite system 300, as indicated by a transmission 1632. The Geostar satellite system 300 then determines the $position_1$ of the transceiver 1302. It appends its $position_1$ to the $position_1$ request, as indicated by a block 1632, which is sent to the transceiver 1302, as indicated by transmission 1636. The transceiver 1302 then retrieves the $position_1$ data, and stores it for later use, as indicated by block 1646.

Transceiver 1302 then constructs a message (not shown) and encrypts this message utilizing the $position_0$ data as the encryption key. The $position_0$ encrypted message, denominated for purposes of brevity only as $EK_{PO}(M)$, and indicated by a block 1638, is then sent to the Geostar satellite system 300, as indicated by a transmission 1640.

The Geostar satellite system 300 then determined the $position_1$ of the transceiver 1302, in the manner discussed above. Specifically, the Geostar satellite system 300 can use the $position_1$ generated by the $position_1$ request 1630 previously discussed, or alternatively, can again determine the $position_1$ from the $position_0$ encrypted message $EK_{PO}(M)$.

In either case, the Geostar satellite system 300 appends the $position_1$ data to the $position_0$ encrypted message $EK_{PO}(M)$, as indicated by a block 1642, and sends it to the receiver 106, as indicated by a transmission 1644. The receiver 106 then extracts the $position_1$ data from the $position_0$ encrypted message $EK_{PO}(M)$ data and stores the $position_1$ data at a memory location, as indicated by a block 1648. In this way, the position syncing version of the present invention utilizing the Geostar satellite system 300 can use the previous position of the mobile transceiver 1302 to decrypt the encrypted message, thereby improving the resistance of the present invention to both passive and active attack.

e. Alternative Geostar Example

Figure 17A:
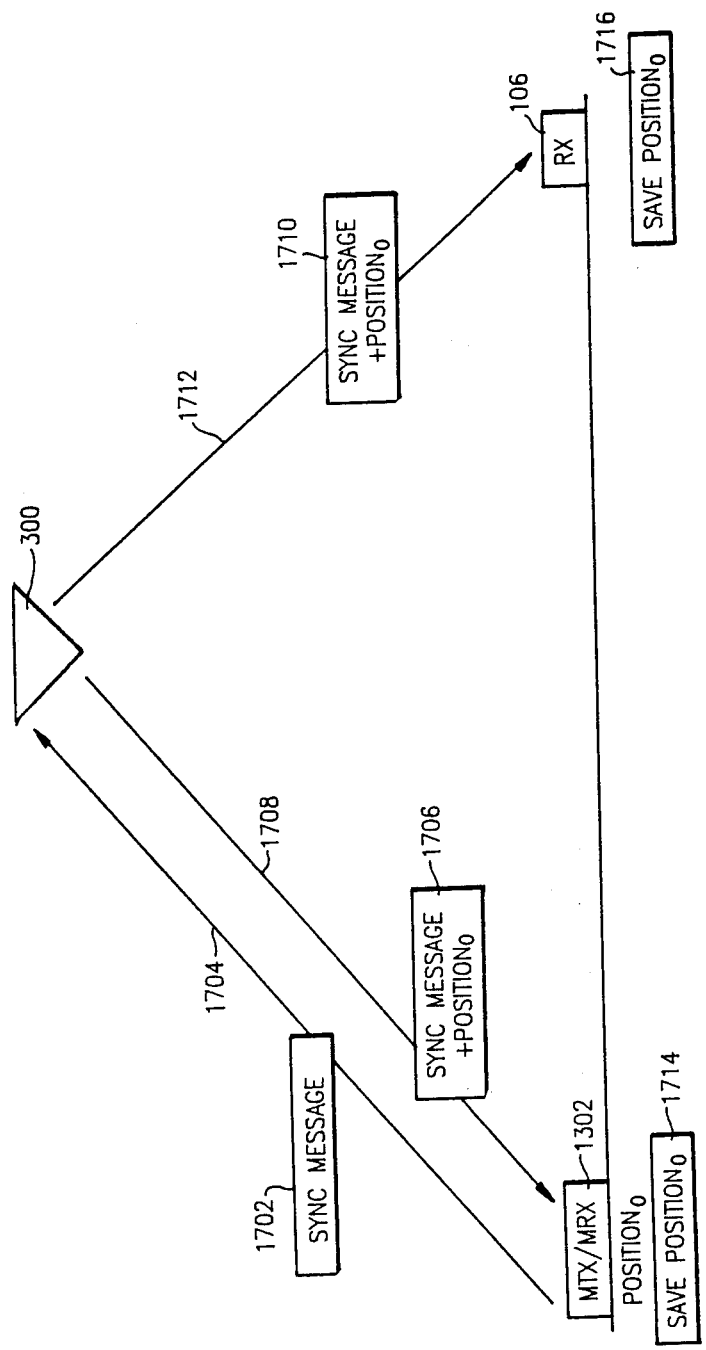
FIGS. 17a and 17b illustrate the alternate method of implementing the position syncing version utilizing the Geostar satellite system.
Figure 17B:
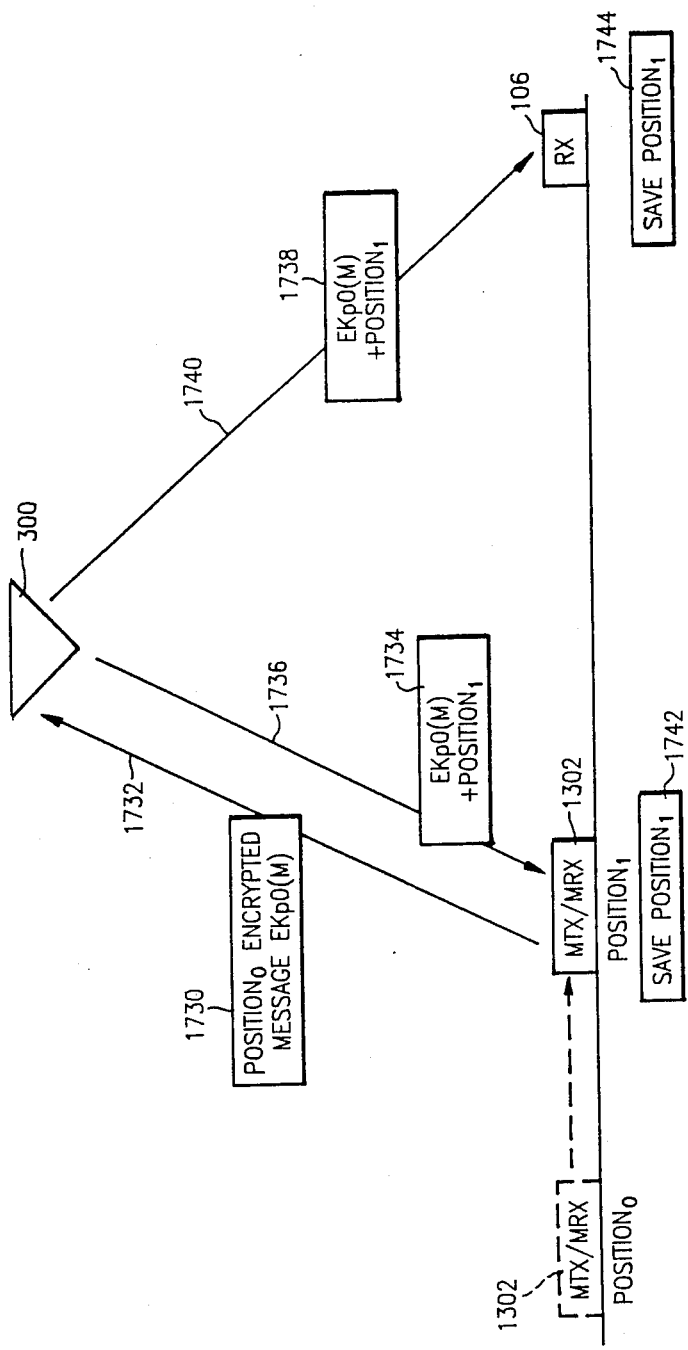

An alternate method of implementing the position syncing version utilizing the Geostar satellite system 300 is shown in FIGS. 17A and 17B. This is an application of the alternate version of the present invention described with respect to FIGS. 14A and 14B utilizing the Geostar satellite system 300.

Considering first the initialization transmission sequence, the mobile transceiver (MTX/MRX) 1302, located at the initialization $position_0$, sends a sync message 1702 to the Geostar satellite system 300, as indicated by a transmission 1704. The Geostar satellite system 300 then determines the actual location of the mobile transceiver 1302. It sends this $position_0$ data appended to the sync message, as indicated by a block 1706, back to the mobile transceiver 1302, as indicated by a transmission 1708. It also sends the sync message with the appended $position_0$ data, as indicated by a block 1710, to the receiver 106 at the second location, as indicated by a transmission 1712. As discussed above with respect to FIG. 14A, the receiver then determines whether the mobile transceiver 1302 is at the proper $position_0$ location, and if so, saves the $position_0$ data as indicated by a block 1716, and allows the first data transmission to then occur.

Referring now to the first data transmission, illustrated in FIGS. 17B, the mobile transceiver 1302 has moved from the dashed-line $position_0$ position to the solid-line $position_1$ position, as shown in the lefthand corner of the drawing. The transceiver 1302 encrypts the message from the authorized user (not shown) using the $position_0$ data to produce the $position_0$ encrypted message $EK_{PO}(M)$ 1730, which is transmitted to the Geostar satellite system 300 by a transmission 1732.

The Geostar satellite system 300 then determines the $position_1$ of the transceiver 1302 from the $position_0$ encrypted message $EK_{PO}(M)$ 1730, and appends this $position_1$ data to the $position_0$ encrypted message $EK_{PO}(M)$, as indicated by blocks 1734 and 1738. Block 1734 is sent to the mobile transceiver 1302 at $position_1$ by a transmission 1736, while the block 1738 is sent by the Geostar satellite system 300 to the receiver 106 at the second location, as indicated by a transmission 1740. At the transceiver 1302, the $position_1$ data is extracted from the $position_0$ encrypted message $EK_{PO}(M)$. The $position_0$ encrypted message $EK_{PO}(M)$ is typically discarded at the transceiver 1302 since the transceiver 1302 only needs to obtain the $position_1$ data for storage, as indicated by the block 1742.

At the receiver 106, the $position_1$ data is extracted from the $position_0$ encrypted message $EK_{PO}(M)$ and saved as indicated by a block 1744. The receiver 106 then decrypts the $position_0$ encrypted message $EK_{PO}(M)$ using the stored $position_0$ data 1716 from the initialization transmission discussed above with respect to FIG. 17A.

It thus can be seen that the alternate method of implementing the position syncing version of the present invention using the Geostar satellite system 300 utilizes the stored position$_{n-1}$ data (where n is a positive integer and where n=1 for the initialization transmission) for decrypting the encrypted message$_n$ from the latest transmission. In this way, the present invention is highly resistant to passive and active attack.

7. Position Plus Non-Position Syncing Mobile Transceiver Example a. Generalized Example

Figure 18A:
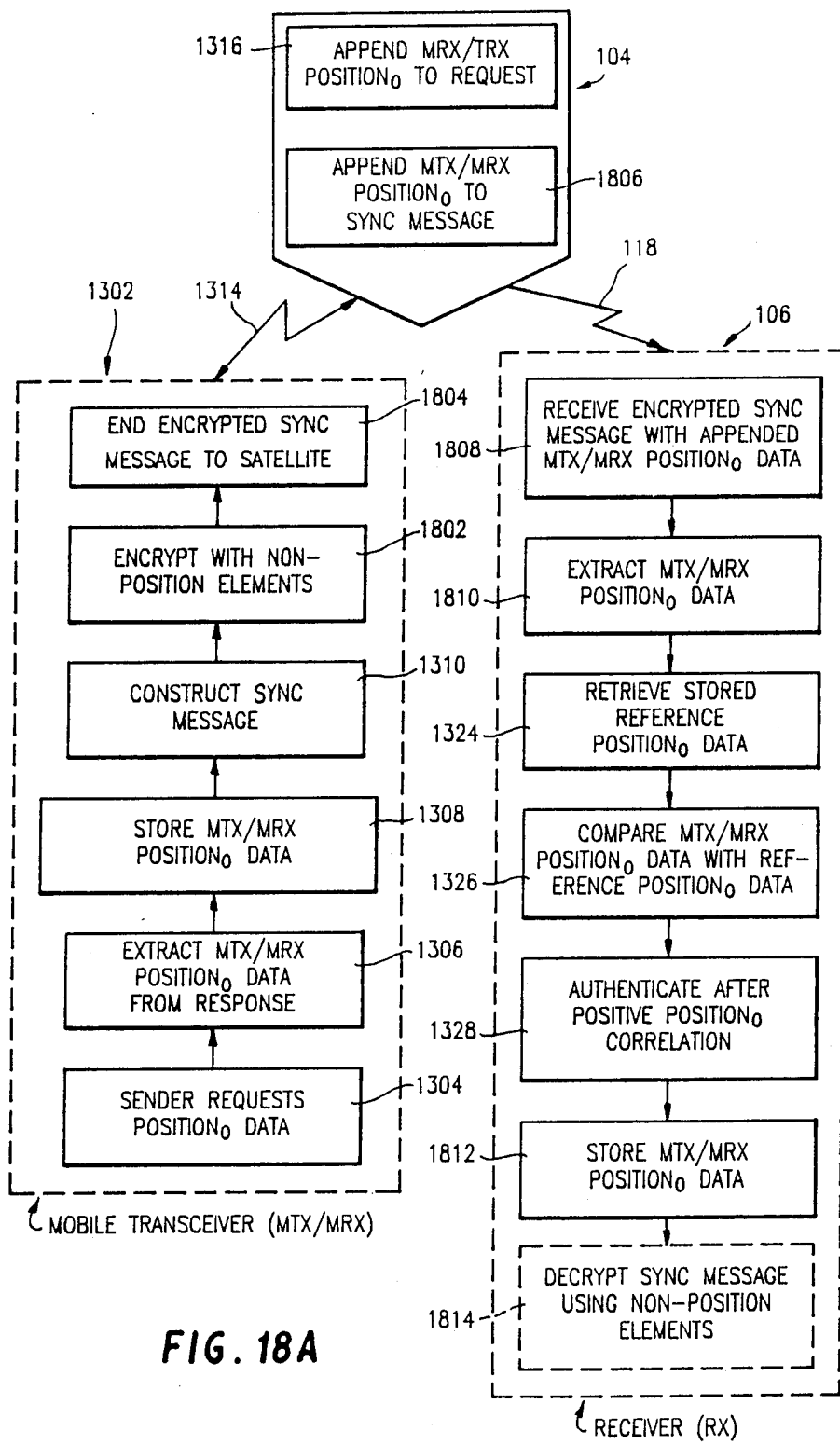
FIGS. 18a and 18b illustrate the generalized example of the position plus non-position syncing version of the present invention.
Figure 18B:
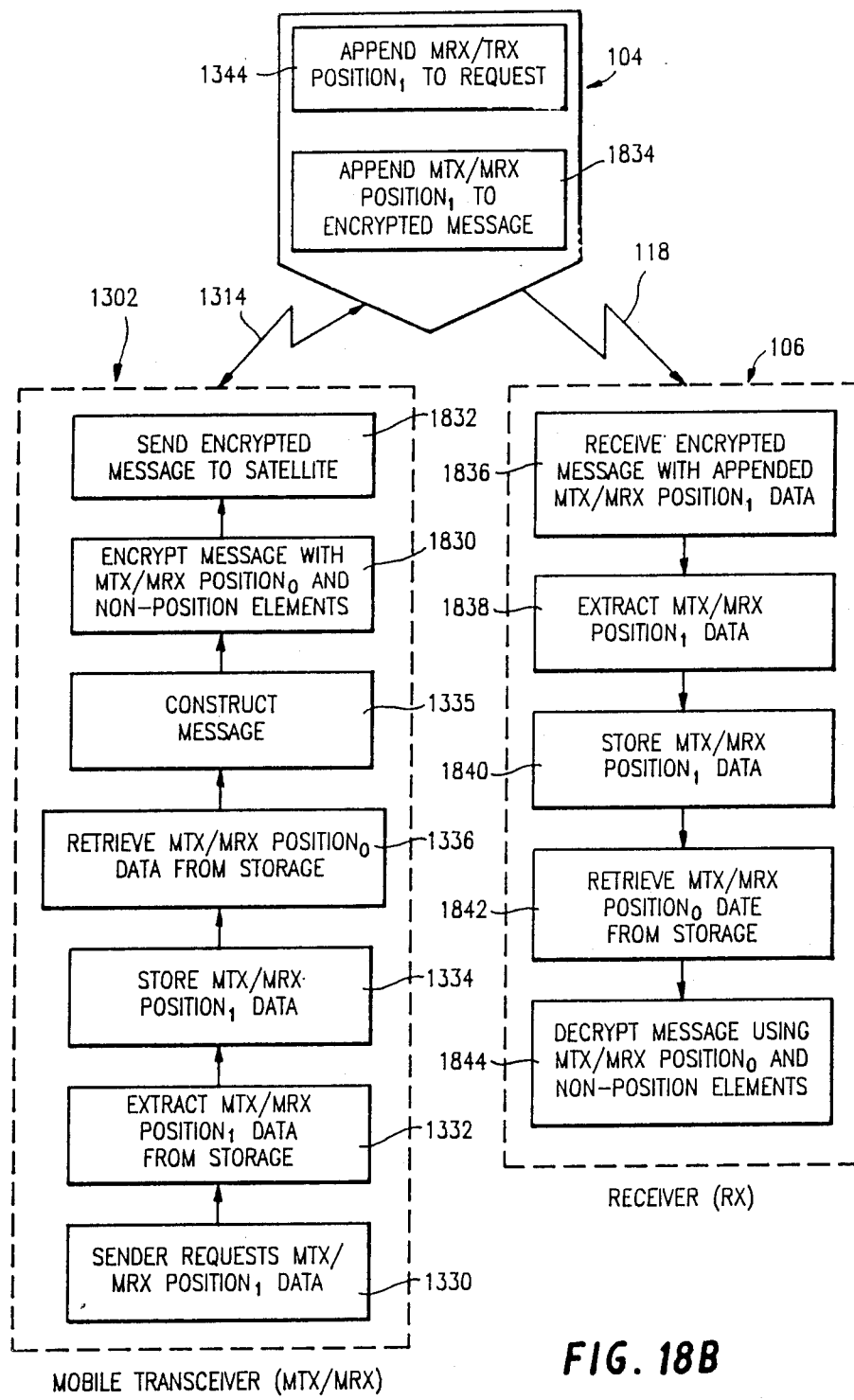

The generalized example of the position plus non-position syncing version of the present invention is illustrated in FIGS. 18A and 18B. FIG. 18A shows the initialization transmission sequence used when the mobile transceiver 1302 is located at the position$_0$ location at the start of the syncing sequence. FIG. 18B shows the next transmission of data which occurs after the initialization transmission sequence has been successfully completed.

The main difference between the generalized version described above in connection with FIGS. 13A and 13B and the generalized version now being discussed with respect to FIGS. 18A and 18B is that the messages being transmitted through the system are encrypted using not only the MTX/MRX position$_{n-1}$ data (where n equals a positive integer and where n=1 for the initialization sequence), but also using a non-position element(s). The non-position element(s) can be any suitable type of encryption scheme not utilizing the previous position of the mobile transmitter 1302.

Thus, with respect to the initialization transmission sequence shown in FIG. 18A, it is seen that the sync message 1310 is encrypted with the non-position element(s), as indicated by a block 1802. The encrypted sync message is sent by the mobile transceiver 1302 via the bidirectional communications link 1314 to the satellite system 104. Satellite system 104 then determines the position$_0$ data and appends it to the encrypted sync message, as indicated by a block 1316. The encrypted sync message with the appended MTX/MRX position$_0$ data is then sent to the receiver 106, which receives it, as indicated by a block 1808. The receiver 106 then extracts the MTX/MRX position$_0$ data, as indicated by a block 1810, and uses it for the comparison and authentication procedure indicated by blocks 1324, 1326 and 1328. If authentication has occurred, the receiver 106 stores the MTX/MRX position$_0$ data, as indicated by a block 1812. It then can decrypt the sync message using the non-position element(s) at the receiver, as indicated by dashed-line block 1814, and compare the decrypted sync message with a stored proper sync message. It should be understood that the sync message need not be decrypted and compared. All of the remaining steps and stages shown in FIG. 18A correspond to those shown in FIG. 13A, and thus are not described in detail here.

Once the initialization transmission sequence has successfully been completed, data is transmitted by the mobile transceiver 1302 to the receiver 106 in the fashion shown at FIG. 18B. Reference is also made to the generalized version shown in FIG. 13B. Everything is identical between the two, except for the fact that the message is also encrypted with the non-position element(s) in the version shown in FIG. 18B.

Specifically, once the message 1335 has been constructed based on data received from the authorized user (not shown), the message is encrypted with the MTX/MRX position$_0$ data, as well as the non-position element(s), as indicated by a block 1830. The encrypted message 1832 is then sent to the satellite system 104 over the bidirectional transmission link 1314. The satellite system 104 then determines the position$_1$ of the mobile transceiver 1302 either from the request message or from the encrypted message, and appends the MTX/MRX position$_1$ data to the encrypted message, as indicated by a block 1834. The encrypted message with the appended MTX/MRX position$_1$ data is then sent to the receiver 106, which receives it as indicated by a block 1836. The receiver then extracts the MTX/MRX position$_1$ data from the encrypted message, as indicated by a block 1838, and then stores the extracted MTX/MRX position$_1$ data, as indicated by block 1814, and subsequently uses it to decrypt the next encrypted message received from the mobile transceiver 1302 located at position$_2$ (not shown).

The receiver 106 also retrieves from the storage location the MTX/MRX position$_0$ data, as indicated by a block 1842. It then decrypts the received message using the MTX/MRX position$_0$ and the non-position element(s) stored at the receiver 106. In this way, the present invention is highly resistant to both active and passive attack.

b. Alternative Generalized Example

Figure 19A:
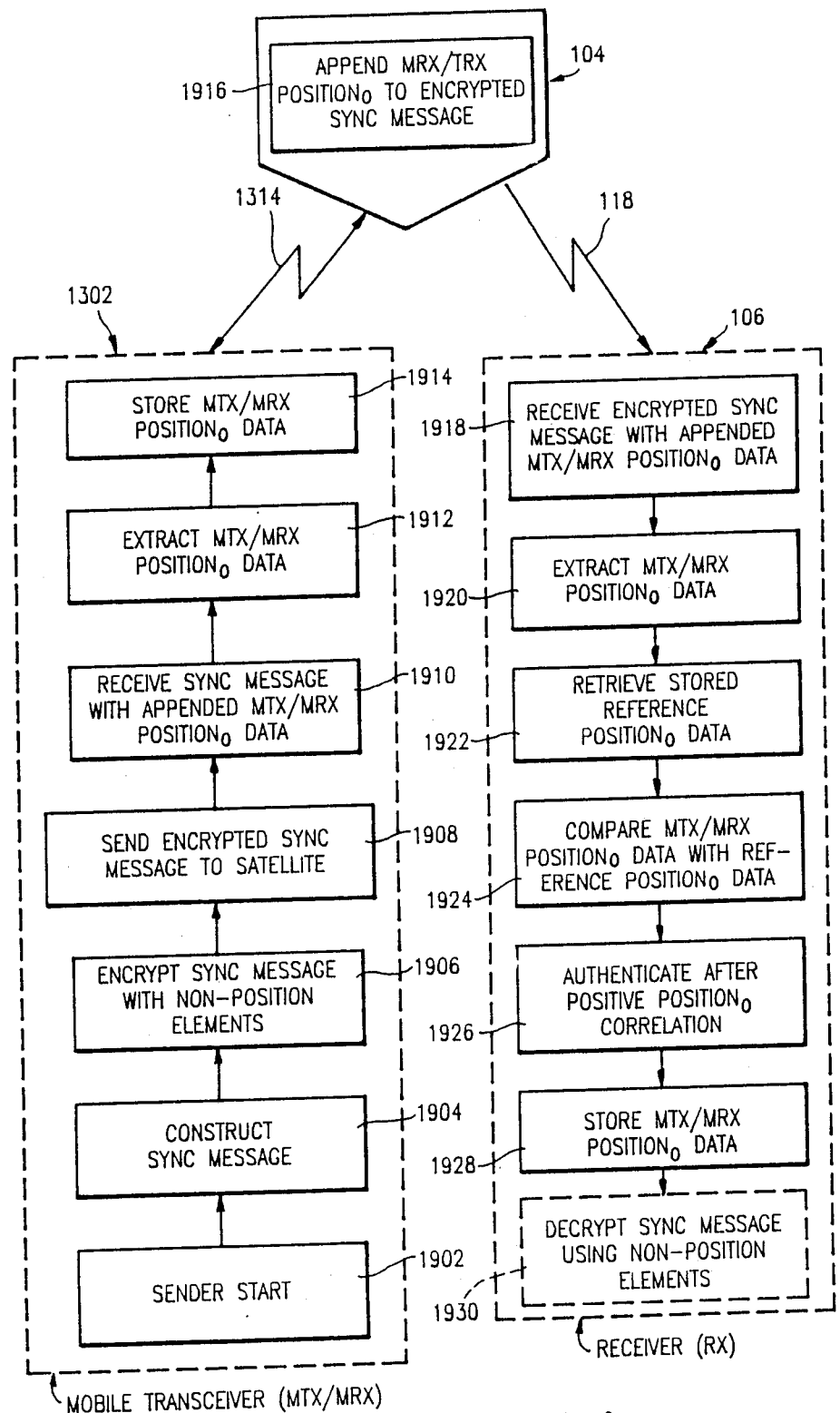
FIGS. 19a and 19b illustrate an alternate method of implementing the position plus non-position syncing version of the present invention.
Figure 19B:
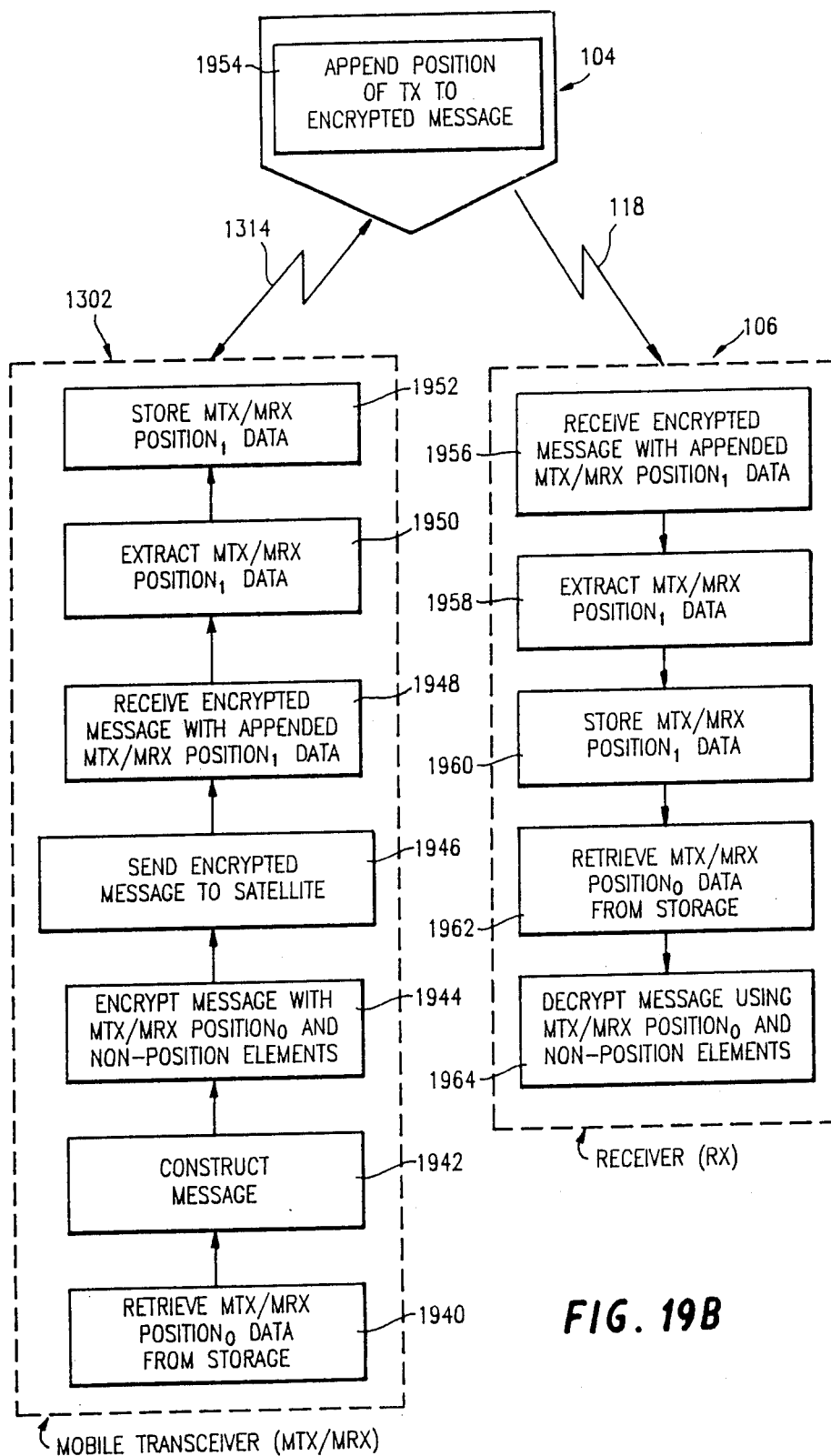

An alternative method of implementing the position plus non-position syncing version of the present invention is shown in FIGS. 19A and 19B. The main difference between the version shown in FIGS. 14A and 14B and the present version shown in FIGS. 19A and 19B is that the sync message for the initialization transmission sequence and the authorized user message for the subsequent transmissions each are encoded using non-position elements, as well as the position$_{n-1}$ data used in the version shown in FIGS. 14A and 14B. For purposes of brevity, only the differences between the present version and that shown in FIGS. 14A and 14B are described here.

Referring now to the initialization transmission sequence, the sync message is encrypted with a non-position element(s), as indicated by a block 1906. Any type of non-position element or element(s) can be employed. The encrypted sync message 1908 is then sent to the satellite system 104, which determines the position$_0$ of the mobile transceiver 1302. It then sends back the encrypted sync message with the appended MTX/MRX position$_0$ data 1916 to the receiver 106 over the communications link 1314. The transceiver 1302 receives the sync message with the appended MTX/MRX position$_0$ data, as indicated by a block 1910, and extracts the MTX/MRX position$_0$ data, as indicated by a block 1912. It then stores the MTX/MRX position$_0$ data for later use, as indicated by a block 1914.

The satellite communications system 104 also sends to the receiver 106 over the communications link 118 to the receiver 106 the encrypted sync message with the appended MTX/MRX position$_0$ data, as indicated by a block 1918. The only difference between that done in receiver 106 in FIG. 14A and that done in receiver 106 in FIG. 19A is that the receiver 106 in FIG. 19A decrypts the sync message using the non-position element(s), as indicated by a block 1913, after authentication has occurred of the position$_0$ received from the mobile transceiver 1302. While the sync message 1930 need not be decrypted, authentication can be further enhanced by including personal identification information embedded within the encrypted sync message, and retrieved at the receiver 106 and then compared with proper personal identification information.

Once the initialization transmission sequence has occurred, and position$_0$ correlation has taken place, the authorized user can send data. Referring now to FIG. 19B, the difference between it and that shown in FIG. 14B is that the message from the authorized user is encrypted using the non-position element(s) together with the MTX/MRX position$_0$ data, as indicated by a block 1944. Thereafter, everything is the same on the transceiver 1302 side.

Referring to the receiver 106, the only main difference between that shown in FIG. 14B and that shown in FIG. 19B is that in the present version, the message is decrypted using both the non-position element(s) and the MTX/MRX position$_0$ data, as indicated by a block 1964. The use of the non-position element(s) to encrypt the message from the mobile transceiver 1302 via the satellite system 104 to th receiver 106 increases the active and passive resistance of the present invention.

c. Transceiver Example

Figure 20:
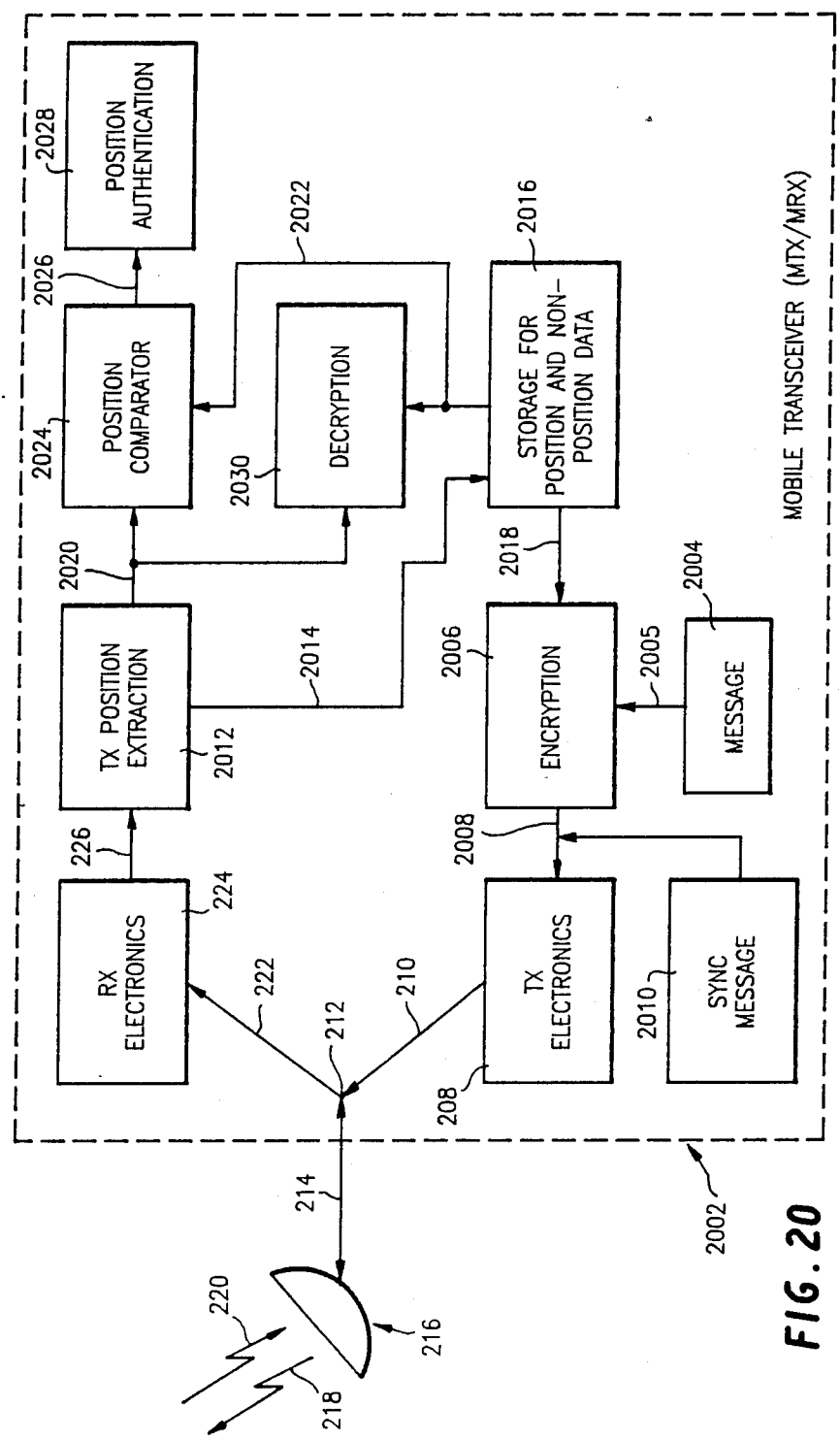
FIG. 20 is a block diagram of a transceiver for implementing the position plus non-position syncing version of the present invention.

A transceiver 2002 for implementing the position plus non-position syncing version of the present invention is shown in block diagram form in FIG. 20. Reference should be made to FIG. 15 which shows a comparable transceiver 1502 used in the position syncing version of the present invention. While different numbering is used, it should be understood that the major difference between these two transceivers is that the transceiver 2002 of FIG. 20 must also store the non-position element(s) or data in a storage stage 2016 for use both by the transmitter side and the receiver side of the present invention. In other respects, however, the two transceivers are identical in structure and operation. It is for this reason, that the mobile transceiver 2002 of FIG. 20 is not described in detail.

d. Geostar Example

Figure 21A:
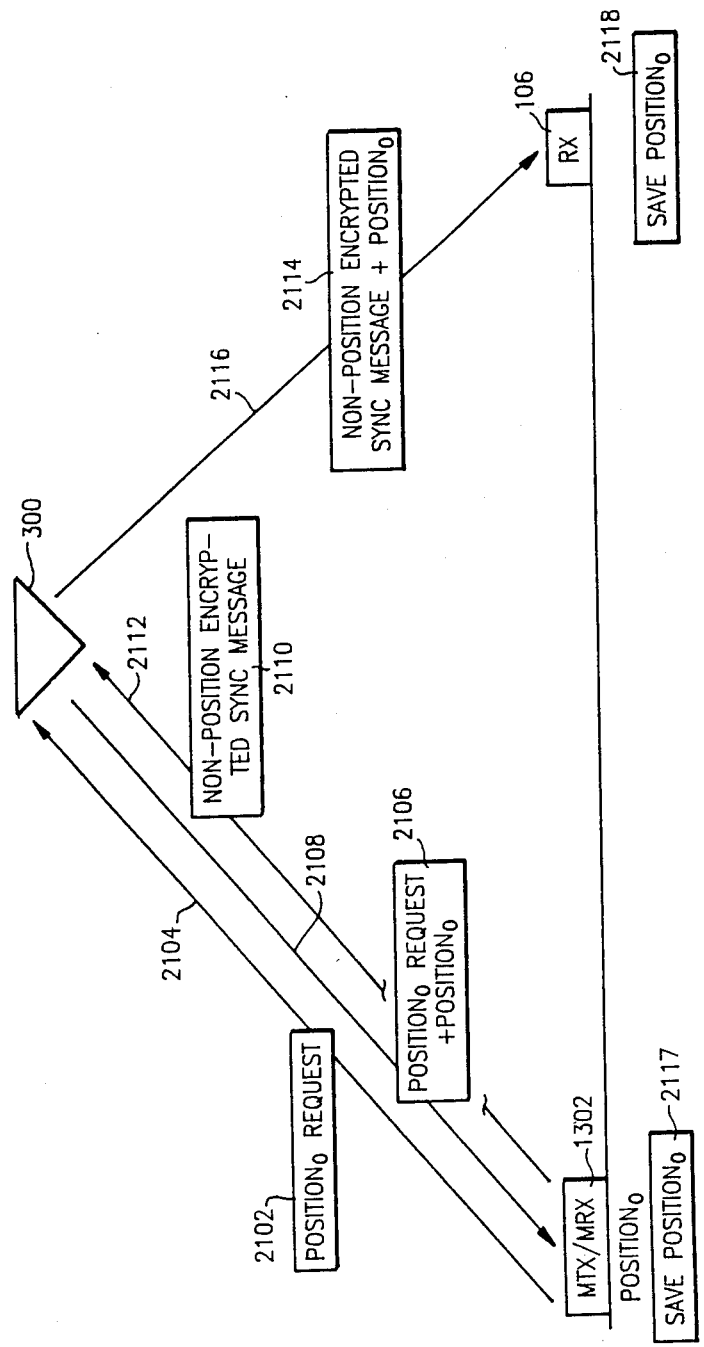
FIGS. 21a and 21b illustrate the position plus non-position syncing version of the present invention utilizing the Geostar satellite system.
Figure 21B:
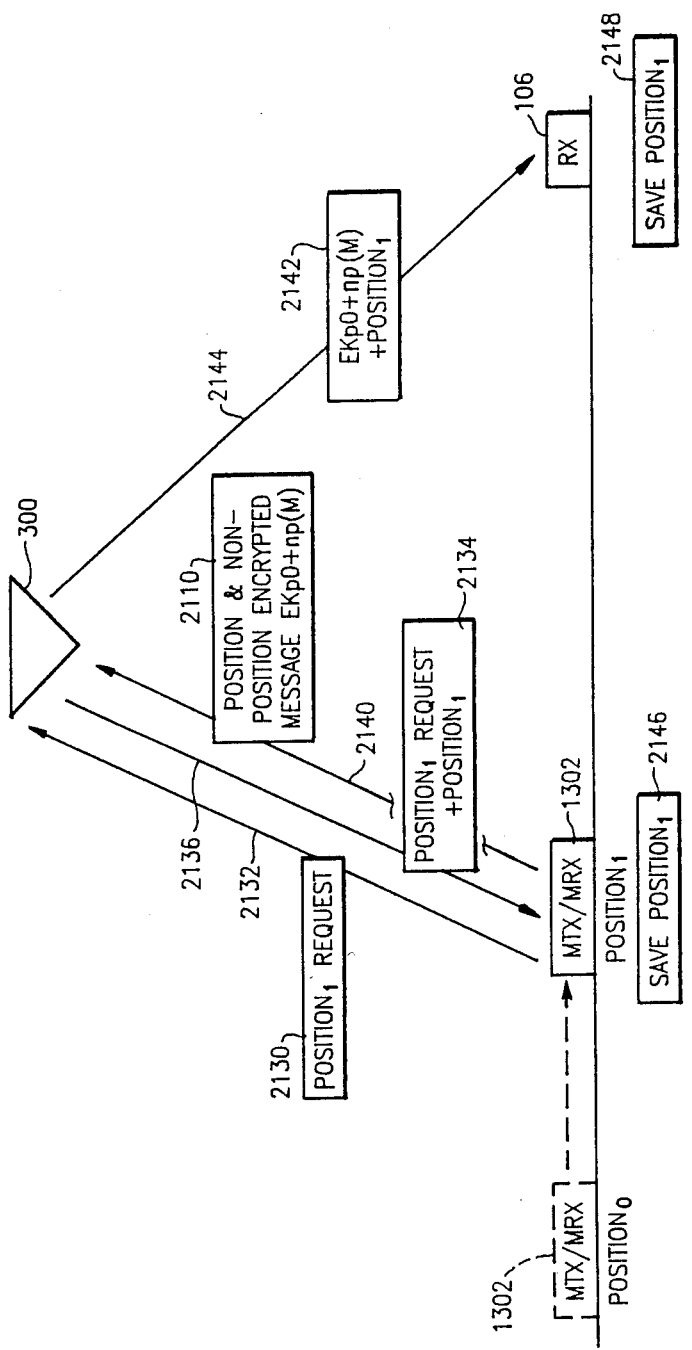

The position plus non-position syncing version of the present invention utilizing the Geostar satellite system is shown in FIGS. 21A and 21B. The major difference between the position syncing version of the present invention utilizing the Geostar satellite system shown in FIGS. 16A and 16B from the position plus non-position syncing version of the present invention utilizing the Geostar satellite system shown in FIGS. 21A and 21B is that in the present version shown in FIGS. 21A and 21B, non-position element(s) is used for encryption purposes. For purposes of brevity, only the differences between the two systems are discussed here.

Specifically, in the initialization transmission sequence, the sync message is encrypted using the non-position element(s), as indicated by a block 2110. This non-position encrypted sync message with the appended position$_0$, as indicated by a block 2114, is sent by the Geostar satellite system 300 to the receiver 106 by a transmission 2116. After the initialization transmission sequence and proper authentication of position$_0$ data have occurred, the system is ready for data transmission. Here, as shown in FIG. 21B, the message 2138 is encrypted using position and non-position element(s) or data. The position and non-position encrypted message $EK_{PO+NP}(M)$ with the appended position$_1$ data 2142 is sent by the Geostar satellite system 300 to the receiver 106 by a transmission 2144.

As is the case with respect to the generalized position plus non-position syncing version of the present invention shown in FIGS. 18A and 18B, the use of the non-position element(s) acts to increase resistance to passive and active attack.

e. Alternative Geostar Example

Figure 22A:
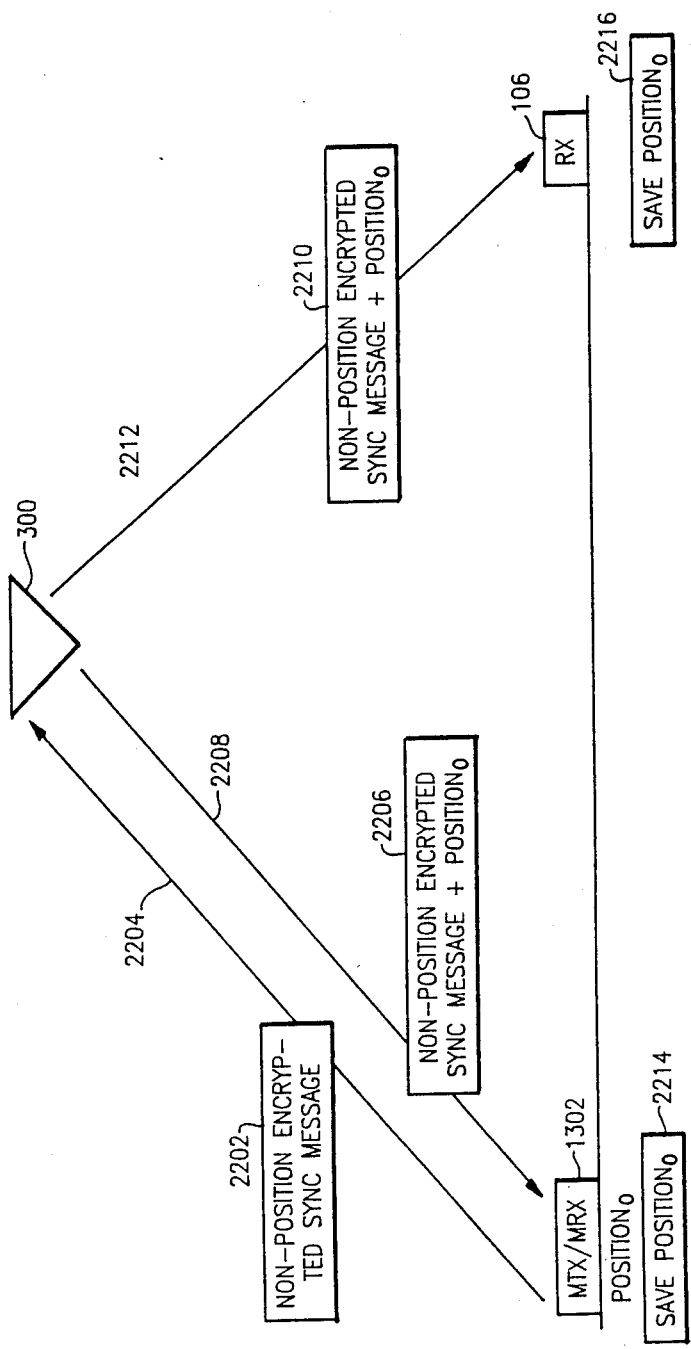
FIGS. 22a and 22b illustrate the alternate method for implementing the position plus non-position syncing version of the present invention utilizing the Geostar satellite system.
Figure 22B:
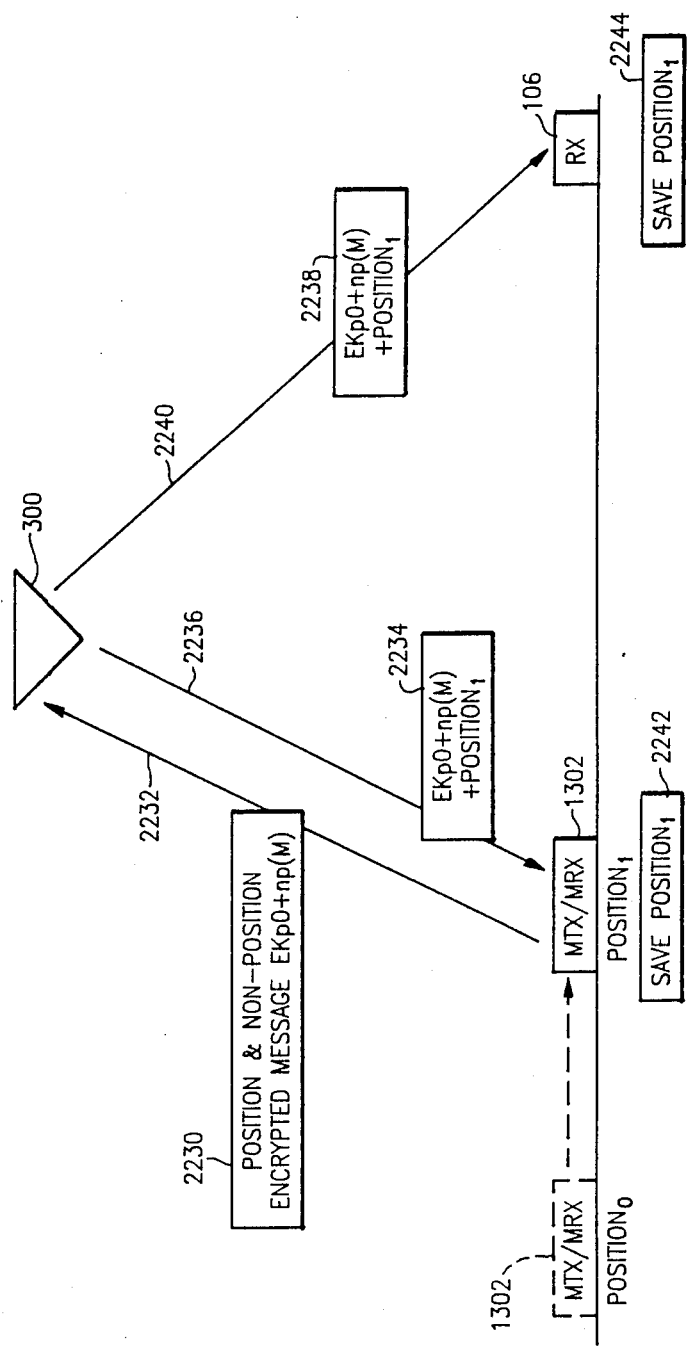

An alternate method for implementing the position plus non-position syncing version of the present invention utilizing the Geostar satellite system 300 is shown in FIGS. 22A and 22B. Reference should be made to the position syncing version of the present invention utilized in the Geostar satellite system 300 shown in FIGS. 17A and 17B. The main difference between these two versions is that in the version shown in FIGS. 22A and 22B, a non-position element(s) is also used for encryption purposes. For purposes of brevity, only the differences between these two versions are discussed here.

With respect to the initialization transmission sequence illustrated in FIG. 22A, the sync message is encrypted using a non-position element(s) as indicated by a block 2202. The Geostar satellite system 300, after determining the position$_0$ data which it appends to the non-position encrypted sync message, sends the non-position encrypted sync message with the appended position$_0$ data 2206 back to the mobile transceiver 1302. It also sends the non-position encrypted sync message with the appended position$_0$ data 2210 to the receiver 106 over a transmission 2212.

Once the initial transmission sequence has been completed and authentication of position$_0$ data has occurred, data can be transmitted by the mobile transceiver 1302 to the receiver 106 over the Geostar satellite system 300. The message transmitted by the mobile transceiver 132 from position1 is encrypted using the position as well as the non-position element(s) or data. The position and non-position encrypted message $EK_{PO+NP}(M)$ 2230 is sent by transmission 2232 to the Geostar system 300, who determines the position$_1$. The Geostar satellite system 300 then transmits the position and non-position encrypted message with the appended position$_1$ data 2238 to the receiver 106 over a transmission 2240. As is the case with the generalized version shown in FIGS. 19A and 19B, the use of the non-position element(s) to encrypt the message acts to increase the resistance to active and passive attack.

II. SPECIFIC APPLICATIONS

1. Financial Network a. Generalized Example

Figure 23:
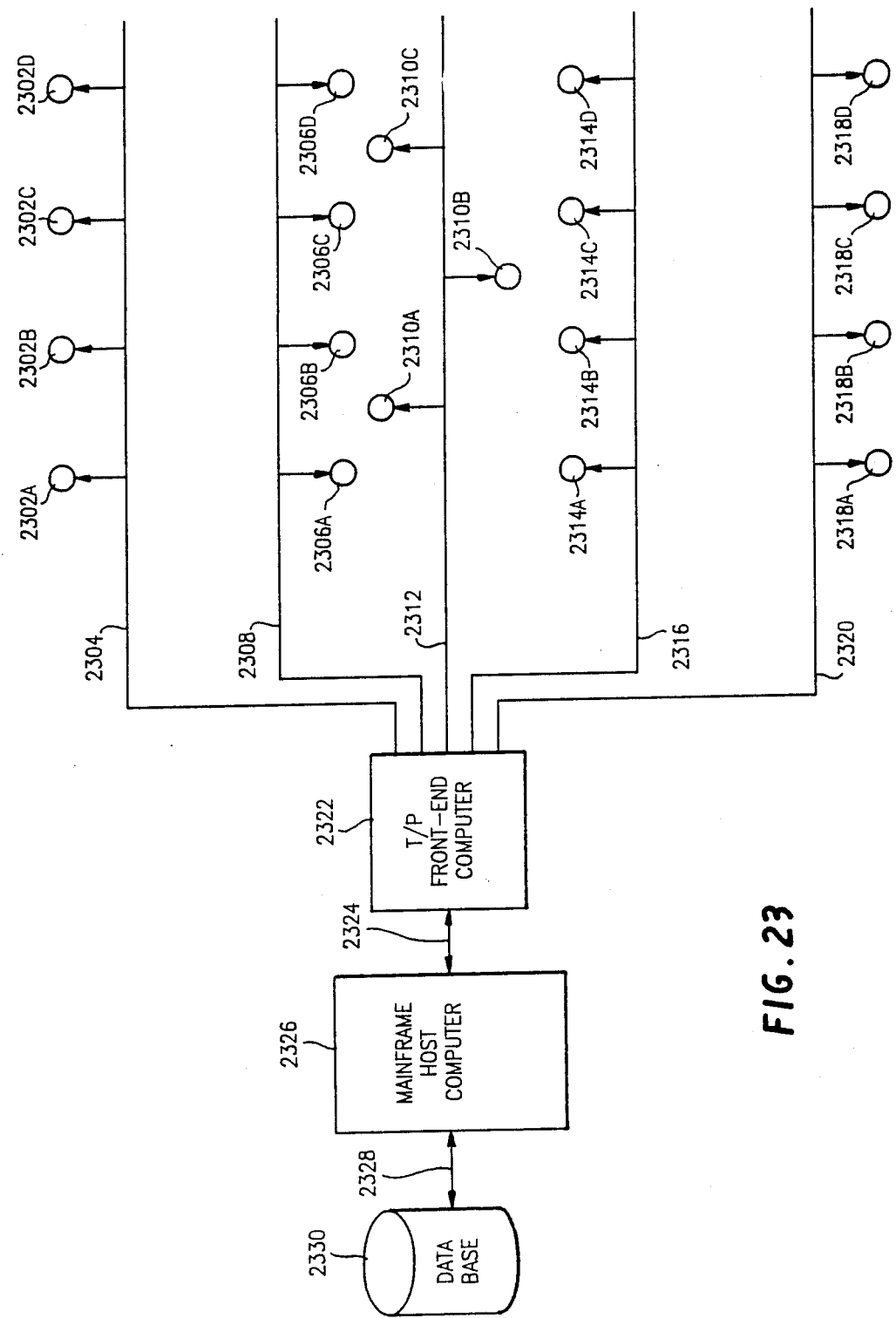
FIG. 23 is a block diagram of a typical conventional computerized financial network utilizing telephone line links between a host computer and remote terminal or computer locations.

A typical conventional computerized financial network utilizing telephone line links between a host computer and remote computer locations is shown in block diagram form in FIG. 23. The conventional system shown in FIG. 23 can utilize financial terminals or automatic teller machines (ATMs) at the remote locations along with any other type of suitable utilization device. Each of these is connected to the main computer at the central site over the telephone line links.

Specifically, remote terminals, ATMs or other utilization devices 2302A, 2302B, 2302C and 2302D are connected via a telephone link 2304 to the teleprocessing (TP) front-end computer 2322 at the central site. Similarly, remote terminals, ATMs or other utilization devices 2306A-2306D are connected via a telephone link 2308 to the TP front-end computer 2322 at the host or central site. This also applies to the remote terminals connected by telephone lines or links 2312, 2316, 2320; these are not discussed in detail since they are similar to those described with respect to telephone links 2304 and 2308.

At the central site, the TP front-end computer 2322 is connected by a bidirectional bus 2324 to a main frame host computer 2326. The main frame host computer 2326 is connected by a bidirectional data bus 2328 to an electronic data base 2330, such as hard disk drives. The data base 2330 stores vast amounts of information utilized by the main frame host computer 2326.

Making a normal transaction for illustrative purposes only, an authorized user enters a request from an ATM machine 2302A remote from the central location where the main frame host computer 2326 is located. Typically, the authorized user gains access to the system using a proper personal identification number (PIN) or other access code. The PIN and/or other access code is then sent by the ATM 2302A via the telephone link 2304 to the TP front-end computer 2322. The TP front-end computer 2322 either alone or in conjunction with the main frame host computer 2326 then determines whether an authentic PIN number and/or access code has been received.

If a proper PIN number and/or access code has been received, the TP front-end computer 2322 then sends back a message over the telephone link 2304 to the ATM 2302A indicating that the authorized user has gained access to the computer system and now can input a user request. At that time, the authorized user inputs a user request. For purposes of illustration, let's assume that the authorized user inputs a request for payment of a certain specified amount of cash at the ATM 2302A. The user inputs this information at the ATM 2302A, which sends this data over the telephone link 2304 to the TP front-end computer 2322.

The TP front-end computer 2322 receives this user request data and supplies it over bidirectional bus 2324 to the main frame host computer 2326. The main frame host computer 2826 under stored program control accesses data base 2330 over bidirectional bus 2328 to determine whether there is an adequate balance in the authorized user's account to allow for the disbursement of the requested dollar amount. If there is an adequate balance, the main frame host computer 2326 then sends an authorization command over bidirectional bus 2324 to the TP front-end computer 2322. It also causes the data base 2330 to reflect this debit on the authorized user's balance in the authorized user's account.

The authorization command is sent by the TP front-end computer 2322 to the ATM 2302A over the telephone link 2304. The ATM 2302A receives the authorization command. It then disburses money to the authorized user based on the information contained in the authorization command.

All of this works well if an unauthorized user cannot gain access into the conventional system and cause the main frame computer to either change data or to perform a function. It is readily apparent, however, that the telephone link 2304 offers an incredible advantage for making such unauthorized entry into the system. Anywhere along the telephone link 2304, unauthorized entry may be possible. Since it is almost physically impossible to protect the telephone link 2304 over its entire span from the various utilization devices to the central site, the system is very vulnerable to unauthorized entry by an unauthorized user. The consequences of such an unauthorized entry are enormous. It is said by many experts on electronic fund transfers and automatic teller machines that millions of dollars are being stolen each year by technically sophisticated thieves. Oftentimes, these thefts go undetected. Even if they are detected, it is often impossible to track down the thief since the transaction occurred some time previously and/or no physical trace has been left on the system which allows the thief to be apprehended and/or convicted.

Figure 24:
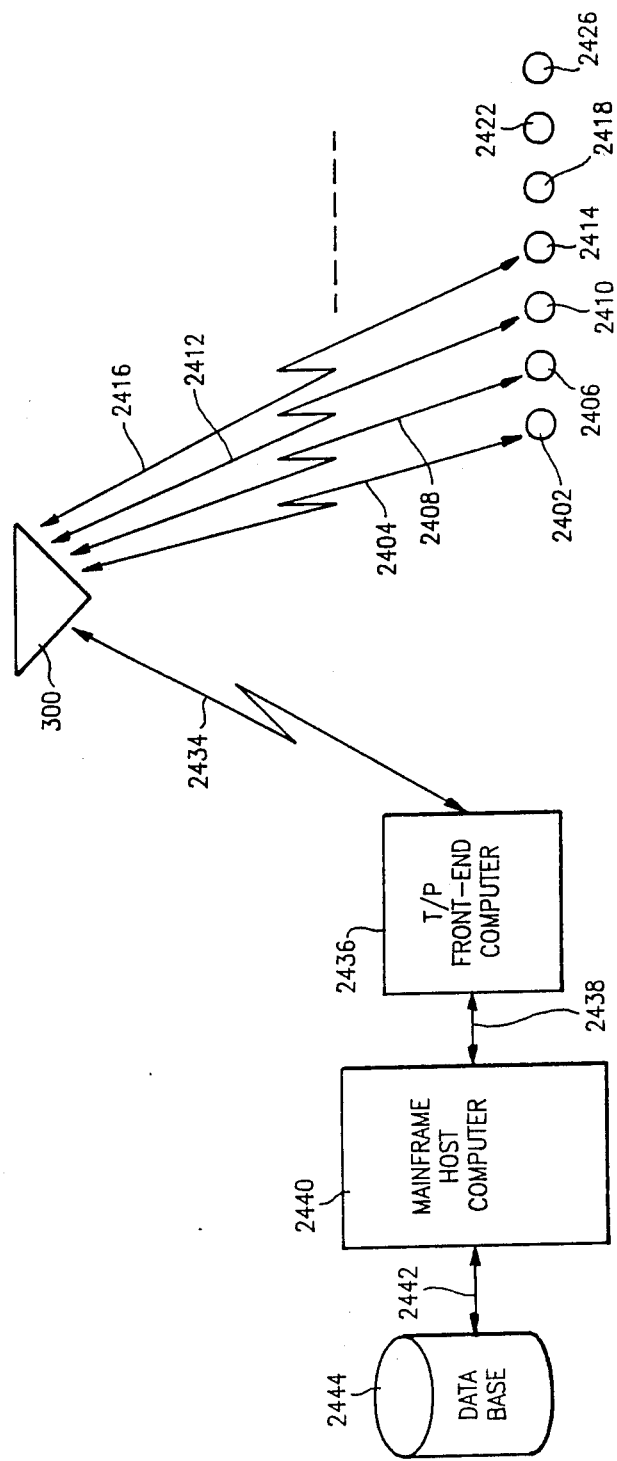
FIG. 24 is a computerized financial satellite communications network in accordance with the present invention.

The same computerized financial network shown in FIG. 23 implemented using the satellite communications system of the present invention is shown in brief block diagram form in FIG. 24. Each of the ATMs, financial terminals, or other utilization devices 2402, 2406, 2410, 2414, 2418, 2422 and 2426 are connected over separate bidirectional satellite communication links 2404, 2408, 2412, 2416, etc. to the Geostar satellite system 300. It should be understood that the Geostar satellite system 300 is shown only for purposes of illustration; the generalized satellite system 104 can also be used.

The main frame host computer 2440 at the central site communicates with these remote financial terminals, ATMs, or other utilization devices over a bidirectional communications link 2434 to the Geostar satellite system 300. The financial network application of the system and method of the present invention is highly resistant to active attack because of the use of the position information for authentication and, in some cases, for encryption purposes.

In rural or suburban applications, it is contemplated that the remote financial terminals, ATMs or other utilization devices that are in communications with the main frame host computer 2440 at the central site, will each have its own separate antenna that will be located at its authorized TX position location. Unless the unauthorized user can transmit from one of these authorized TX position locations, that is to say, within the perimeter around this authorized TX location equal to the resolution being utilized by the satellite communications system 104 or the Geostar satellite system 300 (whichever is being used), the unauthorized user cannot gain access into the financial network of the present invention. It is much easier to guard the antenna site for each of these remote financial terminals, ATMs or other utilization devices than it is to guard the entire communications link used in conventional systems. For this reason, the financial network utilizing the present invention is highly resistant to active attack.

In those urban applications where the location of buildings will interfere with the radiation patterns of individual antennas, or in any application where there is a plurality of financial networks, ATMs, or other utilization devices located within the same building or physical location, it is possible to employ a node technique (not shown). Specifically, a plurality of financial terminals, ATMs or other utilization devices can be connected by hard lines to a single antenna system located at the authorized TX position location. In such a situation, it can be appreciated that the lines linking these financial terminals, ATMs or other utilization devices, must also be guarded as well as the location of the antenna in order to prevent unauthorized users from gaining access into the financial network of the present invention. However, this is much easier to do than guarding the entire line from the building or physical location to the central site as is the case with a conventional system. It is for this reason that this variation of the financial network of the present invention is also highly resistant to active attack.

It is contemplated that in some applications, the antenna will actually be located physically with the financial terminal, ATM, or other utilization device. However, in some other applications, there may be an antenna line that will run from the terminal to the authorized TX transmitter location. In either case, it can be appreciated that the resistance of the financial network of the present invention to active attack is much higher than that exhibited by a conventional system, since much less of the transmission link has to be protected with the present invention as compared to the conventional system.

Figure 25:
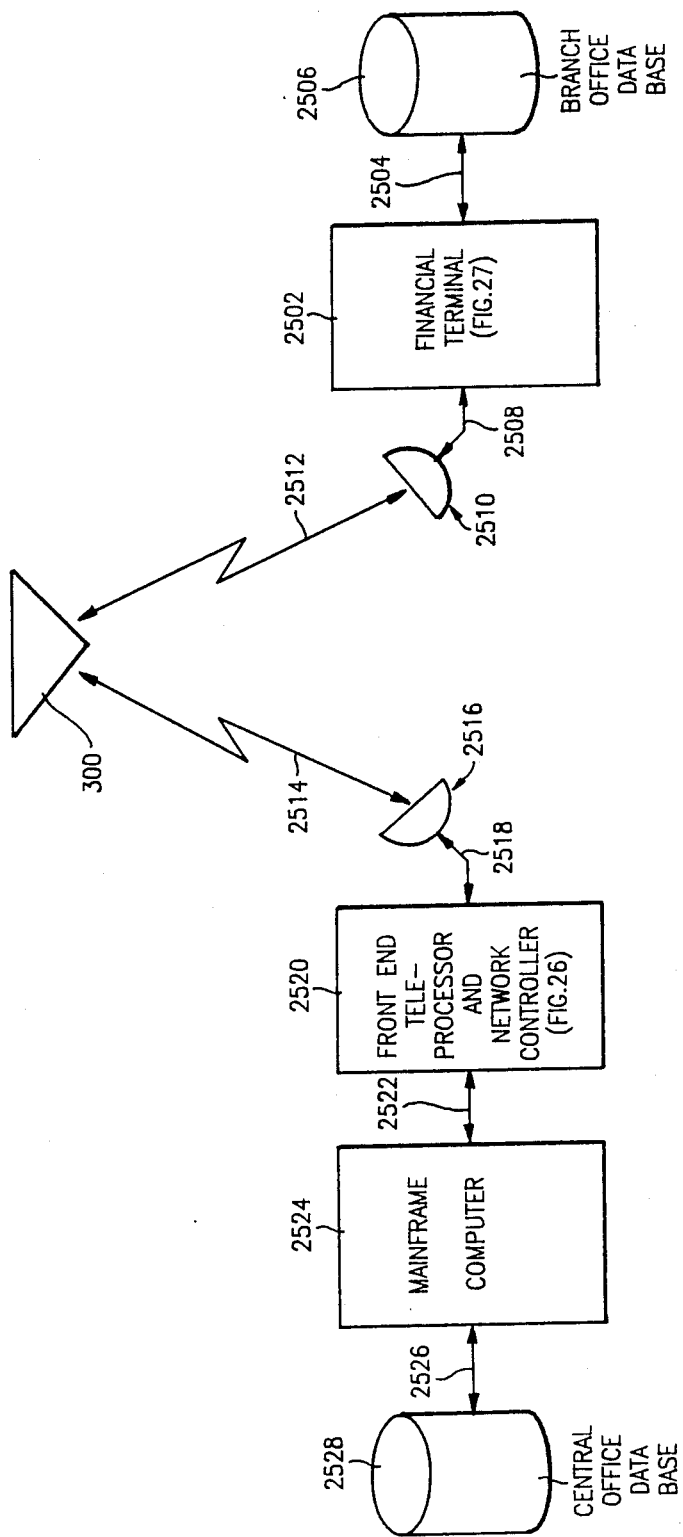
FIG. 25 is a block diagram illustrating the various components utilized in establishing the satellite communication link between the host computer and a remote computer location of FIG. 24.

The various components utilized in establishing the satellite communications between the host computer and the remote computer location and vice versa of the financial network of the present invention are shown in block diagram form in FIG. 25. Again, it should be understood that this is only for purposes of illustration and other arrangements are contemplated by the present invention.

Figure 27:
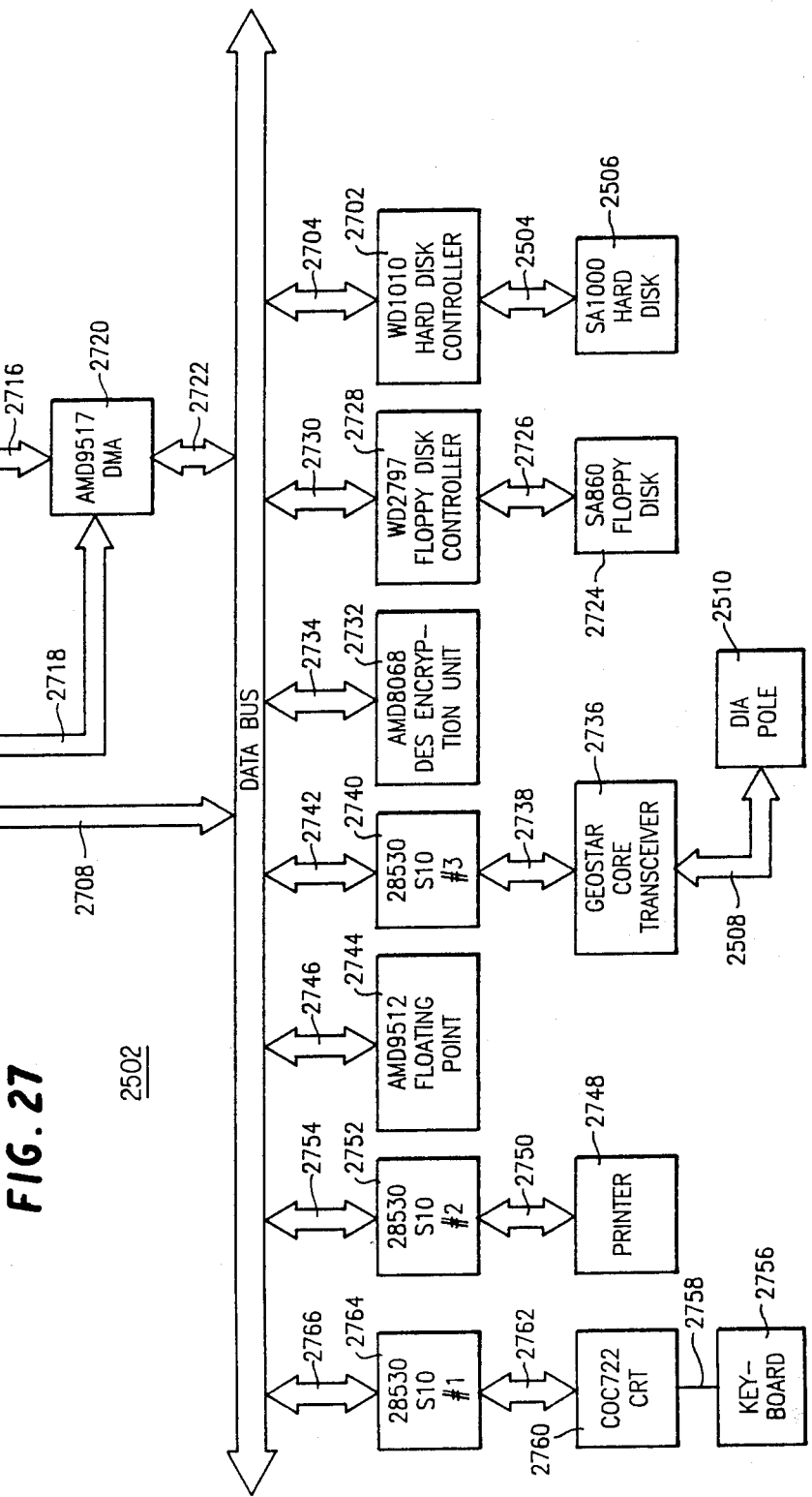
FIG. 27 is a block diagram of a financial terminal which interfaces a remote computer location with the satellite communication system of FIG. 24.

Referring first to the financial terminal side of the financial network, a financial terminal 2502 described below in detail with respect to FIG. 27, is connected by a bidirectional bus 2504 to a branch office data base 2506. The branch office data base 2506 stores electronic data related to transactions which occur at this remote location. The financial terminal 2502 via a bidirectional bus 2508 and an antenna 2510 communicates to the Geostar satellite system 300 over a bidirectional transmission link 2512.

Turning now to the central site side of the example shown in FIG. 25, the main frame computer 2524 is connected via the bidirectional bus 2522 to the front-end teleprocessor and network controller 2520, which is described in detail below with respect to FIG. 26. The front-end teleprocessor and network controller over a bidirectional bus 2518 and an antenna 2516 is in communications with the Geostar satellite system 300 over a bidirectional communications link 2514. The main frame computer 2524 is also in communication with an electronic central office data base 2528 over a bidirectional bus 2526.

In this way, the financial terminal at the remote location can store data over time and then communicate this data over the Geostar satellite system to the main frame computer 2524 at the central location. In some situations, it may be advisable for the financial terminal 2502 to communicate directly with the main frame computer 2524 for each transaction and merely to use the branch office data base 2506 and other storage means to store the various data exchanges that occur.

b. Front-End Teleprocessor and Network Controller Example

Figure 26:
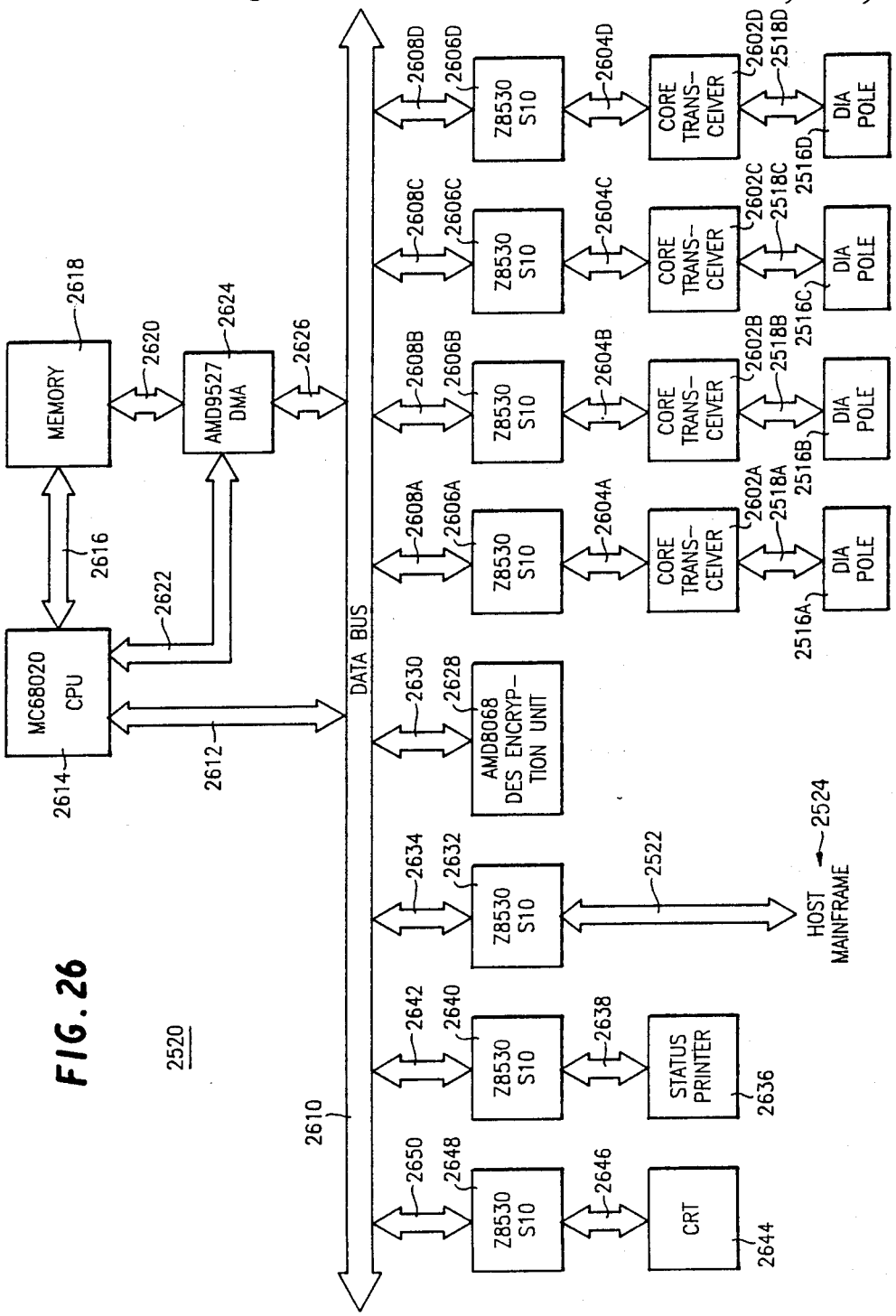
FIG. 26 is a block diagram of a front end teleprocessor and network controller which interfaces the host computer with the satellite communications system of FIG. 24.

A block diagram of the front-end teleprocessor and network controller 2520 which interfaces the main frame (host) computer 2524 with the satellite communications system 300 is shown in FIG. 26. It should be noted that this is only an illustrative example, and that any other suitable approach can be used. Also, in many situations, the front-end teleprocessor and network controller can be eliminated and the main frame host computer 2524 can be connected directly to the communications equipment of the present invention.

The main frame computer 2524 is connected by a bidirectional bus 2522 to a serial input/output stage 2632 of conventional design. A suitable form for SIO 2632 is a Z8530 chip made by Zilog of Cupertino, Calif. The serial input/output chip 2632 is connected by a bidirectional bus 2634 to a main data bus 2610 of conventional design. The SIO 2632 allows the main frame host computer (not shown) 2524 to transfer data to and from the data bus 2610 in suitable fashion.

The data bus 2610 operates under control of a microprocessor system as follows. The CPU 2614, such as a Motorola MC68020 single-chip microprocessor, is in bidirectional communications over bidirectional bus 2612 with the data bus 2610. The memory stage 2618 of any suitable design is in bidirectional communications with the microprocessor 2614 over a bidirectional bus 2616. A direct memory access (DMA) of any suitable type, such as a 9587 by Advanced Micro Devices of Sunnyvale, Calif., is in communication with the data bus 2610 over a bidirectional bus 2626, in communication with the microprocessor 2614 over a bidirectional bus 2622, and in communication with the memory stage 2618 over the bidirectional bus 2620. The operation of the microprocessor 2614, memory stage 2618, and the DMA stage 2624 is conventional, and thus is not described here.

The main frame host computer 2524 can communicate with the Geostar satellite system 300 as follows. For purposes of illustration, assume that the main frame computer 2524 sends a command over bus 2522 to the SIO stage 2632, which then transmits these commands to the data bus 2610 under command of the microprocessor 2614. A serial input/output (SIO) stage 2606A, for example, is caused by the microprocessor 2614 to receive this command information from the data bus 2610 and to provide it to a core transceiver 2602A over a bidirectional bus 2604A. As shown in FIG. 26, a suitable form for SIO stage 2606A is a Z8530 chip.

The core transceiver 2602A, which can be of any of the types of transceivers described above, transmits the command information to the satellite communications system using a dipole antenna 2516A of conventional design, which is connected to the core transceiver 2602A via a bidirectional link 2518A. Similarly, the core transceiver 2602A can receive communications from the Geostar satellite system 300 from dipole antenna 2516A.

Three other core transceivers and associated dipole antennas and serial input/output stages are shown in the embodiment of FIG. 26 only for purposes of illustration. It should be understood that any number of these additional communications links can be used.

Also in the example of FIG. 26 is a DES encryption unit 2628, which is connected to the data bus 2610 by a bidirectional bus 2630. This is shown to illustrate that the encryption used by certain versions of the present invention can be implemented using conventional chips. A suitable DES encryption chip is a Model 8068 made by AMD. As is discussed above on numerous occasions, any suitable type of encryption technique can be employed. There are many suitable encryption chips presently available.

Also shown are peripherals that are connected to the data bus 2610 to allow monitoring the status of data bus 2610 for the inputting or outputting of data by an authorized user. Specifically, a cathode ray terminal (CRT) 2644 is connected via a SIO stage 2648 to data bus 2610. Similarly, a status printer 2636 is connected to data bus 2610 via a SIO stage 2640. It should be understood that any other type of utilization device can be used.

c. Financial Terminal Example

A block diagram of the financial terminal 2502 which interfaces a remote computer location with the satellite communications system of the present invention is shown in FIG. 27. Again, it is only illustrative of a financial terminal that can be used with the financial network of the present invention; the present invention encompasses any other suitable financial terminal, ATM, or other utilization device.

The financial terminal 2502 is connected to the Geostar satellite system 300 (not shown in FIG. 27) by a dipole antenna 2510, bidirectional bus 2508 and a Geostar core transceiver 2736. Any of the transceivers discussed above can be utilized for the transceiver 2736. The transceiver 2736 is connected to a main data bus 2706 via a bidirectional bus 2738, a SIO stage 2740 (such as a Z8530 chip), and a bidirectional bus 2742. The SIO stage 2740 controls the exchange of data between the data bus 2706 and the transceiver 2736.

The financial terminal operates under control of a microprocessor system. The microprocessor comprises a CPU stage 2710, a memory stage 2714, and a direct memory access stage 2720. A MC68020 system of the type shown in FIG. 26 can be used for this microprocessor. Obviously, any other type of microprocessor system can be employed.

The financial terminal 2502 can have any number of capabilities. For example, it can have floppy disk storage. As shown, a floppy disk 2724, such as a SA860 made by Shugart Corporation of San Jose, California, is connected by a bidirectional bus 2726 to a floppy disk controller, such as a WD2797 made by Western Digital of Newport Beach, Calif. The floppy disk controller is connected to the data bus by a bidirectional bus 2730.

Similarly, a hard disk can be employed. For example, hard disk 2606 can be a Model SA1000 made by Shugart. It can be connected over a bidirectional bus 2504 to a hard disk controller 2702. A suitable example for hard disk controller 2702 is a WD1010 made by Western Digital. The hard disk controller 2702 is connected by a bidirectional bus 2704 to the data bus 2706.

Encryption and decryption can be accomplished using any type of encryption scheme or method. For example, if the DES encryption scheme is employed, an encryption unit 2732 made up of an 8068 chip made by Advanced Micro Devices of Sunnyvale, California, can be connected via bidirectional bus 2734 to the data bus 2706.

Floating point capabilities can be provided, if desired. For example, floating point stage 2644 can be connected by a bidirectional bus 2746 to the data bus 2706. A suitable form for the floating point stage 2744 is a chip Model 9512 by Advanced Micro Devices.

Various other peripherals can be used. For example, a printer 2748 of conventional design can be connected via bus 2750 to a SIO stage 2752 of conventional design. SIO stage 2752 is connected via bidirectional bus 2754 to data bus 2706.

Data can be inputted and outputted to the financial terminal using a CRT 2706 of conventional design, having a keyboard 2756 of conventional design connected via bus 2758. A suitable form for CRT 2760 is a model 732 made by Control Data Corporation of Minneapolis, Minnesota. CRT 2760 is connected via bidirectional bus 2762 to a SIO stage 2764 of conventional design. SIO stage 2764 is connected to the data bus 2706 by a bidirectional bus 2766.

Automatic Weather Observation and Reporting Network

Figure 28:
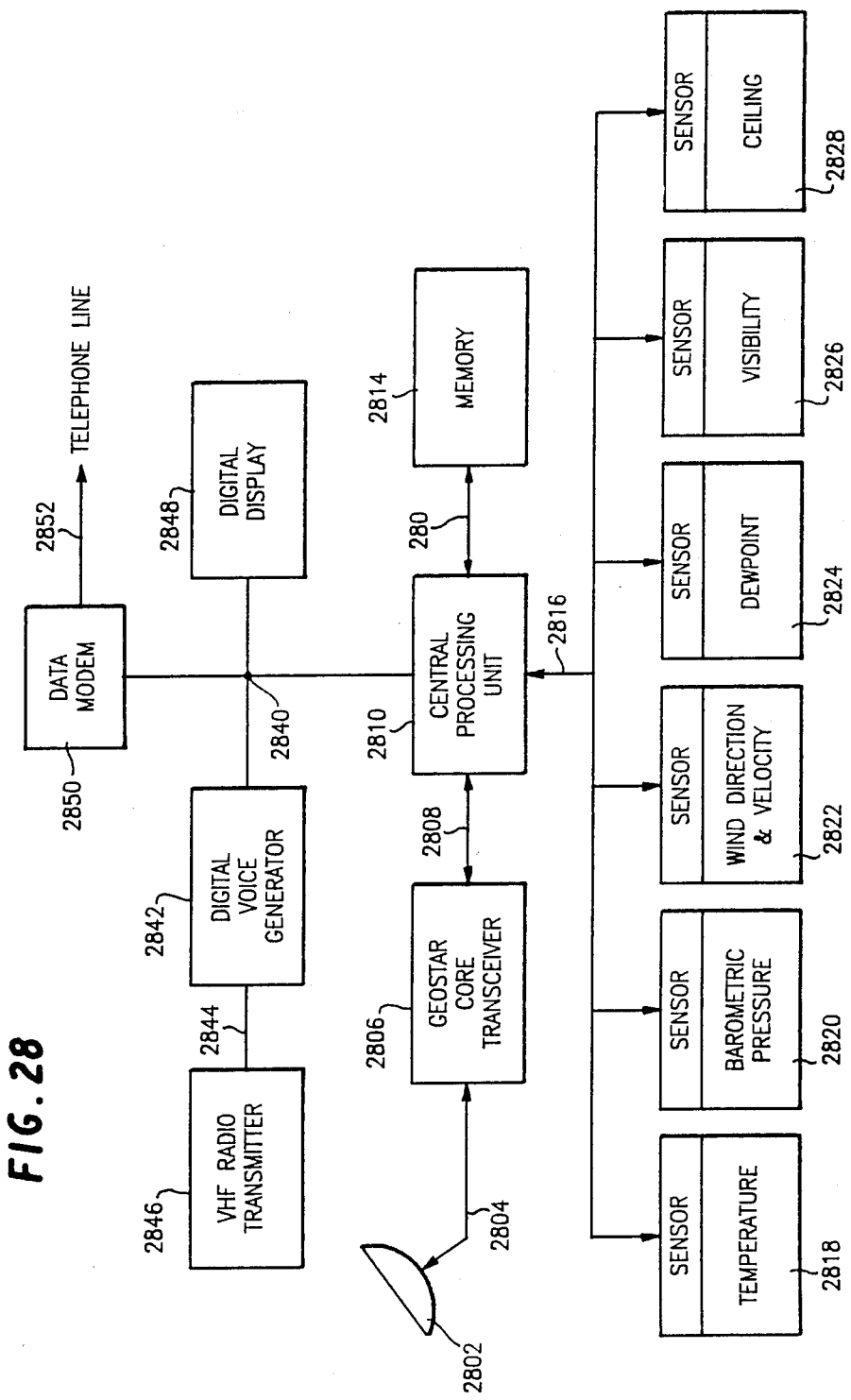
FIG. 28 is a block diagram of an automatic weather observation and reporting system.

A block diagram of an automatic weather observation and reporting system of the present invention is shown in FIG. 28. Here, remote automatic weather observation and reporting stations are located at unmanned airports and at other suitable locations where weather conditions need to be monitored. These remote automatic weather observation and reporting systems are connected to the satellite system of the present invention. At the central site, the information received from these remote automatic weather observation reporting systems can be stored, analyzed and used.

Note that the example shown in FIG. 28 is only for purposes of illustration. As shown in FIG. 28, a plurality of sensors are provided for measuring specific weather conditions. For example, a temperature sensor 2818 can be used. A barometer pressure sensor 2820 can be used. Wind direction and velocity sensor 2822, dew point sensor 2824, visibility sensor 2826, and cloud ceiling sensor 2828 can be used. Obviously, any suitable type of sensor can be used. These sensors are connected over a common communications line 2816 to a central processor 2810 of conventional design. The central processing unit 2810 controls the automatic weather observation and reporting system of FIG. 28.

Specifically, central processing unit 2810 controls the communications from the Geostar core transceiver 2606 and the Geostar satellite system 300 (not shown) utilizing the system and method of the present invention. Central processing unit 2810 also has connected to it a memory stage 2814.

Additional peripherals can be connected to the central processing unit 2810, if desired. For example, a digital voice generator stage 2842 can be connected to a very high frequency (VHF) radio transmitter 2846 for separate communications with the central site. Digital display 2848 can be provided to give an authorized user information about the operation and status of the automatic weather observation and reporting system. Finally, a data modem 2850 can connect the central processing unit 2810 to a telephone line 2852 which allows remote access for diagnostic and testing purposes.

What should be appreciated is that these automatic weather observation and reporting systems can be located at remote unmanned sites. The information that is being received from them can be authenticated using the system and method of the present invention to be certain that authentic information is being received. In this way, aircraft and other activities can be significantly improved since these unmanned locations will be reporting weather information to central sites for use by pilots and others.

Obviously, numerous modifications and variations of the present invention are possible in light of the above teachings. It is therefore to be understood that within the scope of the appended claims, the invention may be practiced otherwise than as specifically described herein.

What is claimed is:

1. A radio communication system for communicating an authorized user message from a first transmitting antenna location to a second receiving antenna location, which comprises:
   (a) first means for transmitting the authorized user message from the first antenna location;

(b) transmission source location system means comprising:
  (1) message receiving means for receiving the authorized user message form said first means,
  (2) position determining means for determining the actual position of the first antenna location by receiving the authorized user message over a plurality of difference communication paths to produce by triangulation transmitter position data from the differences between the communication paths, and
  (3) retransmitting means for transmitting over the same communication channel the authorized user message having said transmitter position data appended thereto; and
(c) second means at the second location comprising:
  (1) utilization means for receiving from said transmission source location system means the authorized user message with said transmitter position data appended thereto, and
  (2) means for comparing said transmitter positioned data with an authorized position data to authenticate the authorized user message received from said transmission source location system means, whereby the determination of said transmitter antenna position data by said transmission source location system means introduces an independently verifiable message authentication parameter.

2. The system of claim 1,
wherein said first means further comprises encryption means for encrypting the authorized user message using position data indicative of the first location to produce an encrypted authorized user message,
wherein said first means transmits said encrypted authorized user message;
wherein said message receiving means receives said encrypted authorized user message from said first means;
wherein said position determining means determines the actual position of said first means by receiving said encrypted authorized user message;
wherein said retransmitting means transmits said encrypted authorized user message with said transmitter position data appended thereto;
wherein said utilization means for receiving receives said encrypted authorized user message with said transmitter position data appended thereto from said retransmitting means;
wherein said means for comparing compares said transmitter position data with said authorized position data to authenticate said encrypted authorized user message received from said retransmitting means; and
wherein said second means further comprises decryption means, responsive to said means for receiving and said means for comparing, for decrypting the authenticated encrypted authorized user message using either said transmitter position data or said authorized position data.

3. The system as defined in claim 1,
wherein said first means further comprises encryption means for encrypting the authorized user message using a non-position element to produce an encrypted authorized user message;
wherein said first means transmits said encrypted authorized user message;
wherein said message receiving means receives said encrypted authorized user message from said first means;
wherein said position determining means determines the actual position of said first means by receiving said encrypted authorized user message;
wherein said retransmitting means transmits said encrypted authorized user message with said transmitter position data appended thereto;
wherein said means for receiving receives said encrypted authorized user message with said transmitter position data appended thereto from said retransmitting means;
wherein said means for comparing compares said transmitter position data with said authorized position data to authenticate said encrypted authorized user message received from said retransmission means; and
wherein said second means further comprises decryption means, responsive to said means for receiving and said means for comparing, for decrypting the authenticated encrypted authorized user message using said non-position element.

4. The system as defined in claim 1,
wherein said first means further comprises encryption means for encrypting the authorized user message using position data indicative of the first location and a non-position element to produce an encrypted authorized user message;
wherein said first means transmits said encrypted authorized user message;
wherein said message receiving means receives said encrypted authorized user message from said first means;
wherein said position determining means determines the actual position of said first means by receiving said encrypted authorized user message;
wherein said retransmitting means transmits said encrypted authorized user message with said transmitter position data appended thereto;
wherein said means for receiving receives said encrypted authorized user message with said transmitter position data appended thereto from said retransmitting means;
wherein said means for comparing compares said transmitter position data with said authorized position data to authenticate said encrypted authorized users message received from said retransmitting means; and
wherein said second means further comprises decryption means, responsive to said means for receiving and said means for comparing, for decrypting the authenticated encrypted authorized user message using said non-position element and either said transmitter position data or said authorized user position data.

5. The system as defined in any one of claims 1 through 4, wherein said position determining means of said transmission source location system means comprises:
  at least three satellites communicating with a ground station, wherein said ground station calculates the position of said first means by comparison of the time taken for the authorized user message to travel between said first means and said satellites, and transmits said authorized user messages with said transmitter position data appended thereto to one of said satellites for transmission to said second means.

6. A method for transmitting an authorized user message from a first transmitter location to a second receiver location, comprising the steps of:

(a) transmitting the authorized user message from the first location;

(b) receiving the authorized user message by a transceiver system;

(c) determining at said transceiver system the position of the first location by receiving the authorized user messages by triangulation over a plurality of different communication paths to produce therefrom transmitter position data accurately defining the transmission site;

(d) appending at said transceiver system the transmitter position data to the authorized user message;

(e) retransmitting the authorized user message and said transmitter position data over a common communication channel;

(f) receiving said authorized user message and said transmitter position data at said second location; and (g) comparing at said second location said transmitter position data with an authorized position data to authenticate the authorized user message, whereby the determination of said transmitter position data by said transceiver system introduces an independently verifiable message authentication parameter.

7. The method of claim 6, comprising the additional steps of:

encrypting at said first location the authorized user message using position data indicative of the first location to produce an encrypted authorized user message; and wherein said transceiver system receives said encrypted authorized user message, determines the position of the first location by receiving said encrypted authorized user message to produce said transmitter position data, and appends said transmitter position data to said encrypted authorized user message; and decrypting the authenticated encrypted authorized user message using either said transmitter position data or said authorized position data.

8. The method of claim 6, comprising the additional steps of:

encrypting said authorized user message prior to transmission using a non-position element to produce an encrypted authorized user message;

wherein said transceiver system receives said encrypted authorized user message, determines the position of the first location by receiving said authorized user message to produce said transmitter position data, appends said transmitter position data to said encrypted authorized user message, and transmits the same; and decrypting the received authorized user message after authentication thereof using said non-position element.

9. The method of claim 6 comprising the additional steps of:

encrypting at said first location said authorized user message using position data indicative of the first location and a non-position element to produce an encrypted authorized user message;

wherein said transceiver system receives said encrypted authorized user message, determines the position of the first location by receipt of said authorized user message to produce said transmitter position data, appends said transmitter position data to said encrypted authorized user message, and transmits the same; and decrypting at said second location said encrypted authorized user message after authentication thereof using said non-position element and either said transmitter position data or said authorized position data.

10. The method of any of claims 6 through 9, wherein said transceiver system comprises at least three satellites and a ground station, and said ground station performs said step of determining the position of said first location by comparison of the time taken for authorized user messages to reach said satellites from said first location in order to produce said transmitter position data, and transmits said transmitter position data to one of said satellites.

11. A radio transceiver for communicating with a position determining system for establishing the position of a transmitted signal by triangulation from radio signals comparing the transmission time thereof over different paths, said transceiver comprising:

means for constructing a first authorized user message and transmitting it to the position determining system for appending thereto transceiver position data and forming thereby a second authorized user message;

means for receiving said second authorized user message with a transceiver position data appended thereto from the position determining system, said transceiver position data indicative of the position of the transceiver which transmitted said first authorized user message;

means for extracting said transceiver position data from said second authorized user message received from said position determining system;

means for comparing said extracted transceiver position data with authorized position data; and means for authenticating said authorized user message responsive to said means for comparing.

12. The transceiver of claim 11, further comprising means for encrypting said first authorized user message prior to transmission thereof using transceiver position data indicative of the location of said transceiver, and means for decrypting said second authorized user message received from said position determining system using either transceiver position data appended to said second authorized user message by the satellite system or said authorized position data.

13. The transceiver of claim 11, further comprising means for encrypting said first authorized user message prior to transmission thereof using a non-position element; and means for decrypting said second authorized user message received from said position determining system using a stored non-position element.

14. The transceiver of claim 11, further comprising:

means for encrypting said first authorized user message prior to transmission to said position determining system using said transceiver position data and a non-position element to produce an encrypted message prior to transmission to said satellite system; and means to decrypt said second authorized user message received from said position determining system using said non-position element and either said transceiver position data or said authorized position data.

15. A transceiver for communicating with a satellite system, said satellite system being of the type comprising at least three satellites in communication with a ground station, said satellite system comprising means for determining the position of a transceiver communicating therewith by comparison of the time taken for authorized user messages to reach said satellites by different communication paths from a single transceiver location and to append transceiver position data indicative of the location of said transceiver to second authorized user messages transmitted by said transceiver, said transceiver comprising:
 means for constructing a first authorized user message;
 means for transmitting said first authorized user message;
 means for receiving a second authorized user message from said satellite system; and
 a message authentication system comprising means for extracting said transceiver position data appended by said satellite system to said second authorized user message concerning the location of the transmitter of said second authorized user message;
 means for comparing said extracted transceiver position data to an authorized position data; and
 means for authenticating said second authorized user message based on said comparison of said extracted position data and said authorized position data.

16. The transceiver of claim 15, wherein said transceiver further comprises:
 means for encrypting a first authorized user message prior to transmission thereof using a position data indicative of the location of said transceiver; and
 means for decrypting said second authorized user message received from said satellite system using either said transceiver position data or said authorized position data.

17. The transceiver of claim 15, wherein said transceiver further comprises:
 means for encrypting a first authorized user message prior to transmission using a non-position element; and
 means for decrypting said second authorized user message received from said satellite system using said non-position element.

18. The transceiver of claim 15, further comprising:
 means for encrypting a first authorized user message prior to transmission using a position data indicative of the location of said transceiver and using a non-position element; and
 means for decrypting said second authorized user message received from said satellite system using said non-position element and either said transceiver position data or said authorized position data.

19. A system for communicating authorized user messages from a previous position and a present position to a second location, which comprises:
(a) mobile transceiver means located at a present position, comprising:
 (1) means for storing a previous position data indicative of the previous position of said mobile transceiver means, said previous position data having been received from satellite system means;
 (2) sender request means for transmitting a sender request to said satellite system means;
 (3) means for receiving said sender request with present position data appended thereto from said satellite system means;
 (4) means for storing said received present position data;
 (5) encryption means for encrypting an authorized user message using said previous position data to produce an encrypted authorized user message, and
 (6) transmitter means for transmitting said encrypted authorized user message to said satellite system means;
(b) satellite system means, which comprises:
 (1) first means for receiving said sender request from said mobile transceiver;
 (2) position determining means for determining by triangulation the actual position of the mobile transceiver by receiving said sender request therefrom from different communication paths to determine said present position data;
 (3) second means for transmitting said sender request with said present position data appended thereto to said mobile transceiver;
 (4) third means for receiving said encrypted authorized user message from said mobile transceiver;
 (5) fourth means for appending said present position data to said encrypted authorized user message; and
 (6) fifth means for transmitting said encrypted authorized user message with said present position data appended thereto to receiver means; and
(c) receiver means located at the second location, which comprises:
 (1) means for receiving said encrypted authorized user message with said present position data appended thereto from said satellite system means;
 (2) means for storing said present position data; and
 (3) means for decrypting said encrypted authorized user message using said previous position data.

20. The system of claim 19, wherein said mobile transceiver means further comprises means for encrypting said authorized user message using said previous position data and a non-position element, and said receiver means further comprises means for decrypting said encrypted authorized user message using said previous position data and said non-position element.

21. The system of either of claims 19 or 20, wherein said satellite system each comprise at least three satellites and a ground station, and wherein said satellites each comprise means for transmitting to said ground station the relative time at which said authorized message is received, and wherein said ground station comprises means for determining the position of said transceiver which transmitted said authorized user messages to said satellites, and means for transmitting said transceiver position data responsive thereto to said satellites.

22. A system for communicating authorized user messages from a previous location and a present location to a remote location, which comprises:
(a) mobile transceiver means located first at said previous location and presently at the present location, comprising:
 (1) means for storing a previous position data indicative of the previous position of said mobile transceiver means, said previous position data having been received from satellite system means;

(2) means for encrypting an authorized user message using said previous position data;
(3) means for transmitting said encrypted authorized user message to said satellite system;
(4) means for receiving a present position data from said satellite system means; and
(5) means for storing said received present position data;

(b) satellite system means, comprising:
(1) first means of determining by triangulation the present position of said mobile transceiver means by receiving said encrypted authorized user message from said mobile transceiver means over different paths, and for generating said present transceiver position data responsive to the time of transmission over the different paths; and
(2) means for appending said present transceiver position data to said encrypted authorized user message, and for transmitting to receiver means said encrypted authorized users message with said present transceiver position data appended thereto; and (c) receiver means, located at the remote location, comprising:
(1) means for receiving from said satellite system means said encrypted authorized user message with said present transceiver position data appended thereto;
(2) means for extracting said present transceiver position data from said encrypted authorized user message and for storing the same; and
(3) means for decrypting said encrypted authorized user message using said previous position data.

23. The system of claim 22, wherein said means for encrypting uses said previous position data and a non-position element, and wherein said means for decrypting uses said previous position data and said non-position element.

24. The system of either of claims 22 or 23, wherein said satellite system comprises at least three satellites and an ground station, wherein said earth station comprises means for determining the location of said mobile transceiver means responsive to the relative time at which said encrypted authorized user messages are received by said satellites, and means for transmitting said location to said satellites.

25. A transceiver for use in connection with a satellite system of the type comprising means for detecting the position of a transmitter of a message, for appending information indicative of the location of said transmitter to said message, and for transmitting the same, said transceiver comprising:
(a) triangulation means for causing said satellite system to determine the position of the transceiver by comparison of signals transmitted over different communication paths and to transmit a first and second present transceiver position data responsive thereto;
(b) means for receiving said first transceiver position data from said satellite system and for storing the same;
(c) means for encrypting a first authorized user message using a first previous transceiver position data;
(d) means for transmitting said first encrypted authorized user message to said satellite system;
(e) means for receiving a second encrypted authorized user message from said satellite system, said satellite system having appended thereto said second present position of the transmitter of said second authorized user message;
(f) means for decrypting said second authorized user message using a second previous position data; and
(g) means for storing said second present position information for use in subsequent decryption of received authorized user messages.

26. The transceiver of claim 25, wherein said means for encrypting said first authorized user message uses said first previous position data and a first non-position element; and
wherein said means for decrypting said second authorized user message used said second previous position data and a second non-position element.

27. A radio transceiver for use in connection with a satellite system, said satellite system being of the class comprising means for determining by triangulation means the location of a transmitter antenna by processing radio signals communicated over different paths to determine therefrom the location and for transmitting a message indicative of said location, said transceiver comprising:
means for storing a first transceiver position data;
means for combining a first authorized user message with transceiver position data;
means for transmitting the combined position data and authorized user message on a single communication channel;
means for receiving authorized user messages from said satellite system; and
means for authenticating the authorized user messages by comparison with a second transceiver position data at the receiving means.

28. The transceiver of claim 27, including means for encrypting said message with a first non-position key element and said position data.

29. A transceiver for use in connection with a satellite system, said satellite system being of the class comprising at least three satellites and a ground station, said ground station comprising means for determining by the triangulation the location of a transmitter responsive to the relative time taken by a message sent by said transmitter to reach each of said satellites, and said satellite system comprising means for appending present transceiver position data to said message, said transceiver comprising:
means for interrogating the satellite system with a request for information indicative of the transceiver present position;
means for encrypting a first authorized user message based on a first previous position data previously received from the satellite system;
means for storing a first present position data received from said satellite system;
means for transmitting said first encrypted authorized user message encrypted using said first previous position data to said satellite system;
means for receiving a second encrypted authorized user message from said satellite system having appended thereto a second present transceiver position data;
means for extracting said second present transceiver position data from said second encrypted authorized user message; and
means for decrypting said second authorized user message using a second previous position data received from said satellite system.

30. The transceiver of claim 29, wherein said means for encrypting uses a first a non-position element and said first previous transceiver position data, and wherein said means for decrypting uses a second non-position element and said second previous transceiver position data.

31. A transceiver for use in connection with a satellite system of the type comprising at least three satellites and a ground station, said ground station being adapted to determine the position of a transmitter of a given authorized user message responsive to measurement of the relative time taken for the given message to reach the satellites over different communication paths, and for appending that position information to said messages, said transceiver comprising:
- means for storing a first present transceiver position data representative of the transmitter position determined by said satellite system;
- means for encrypting a first authorized user message incorporating previously stored transceiver position data;
- means for transmitting said encrypted first authorized user message to said satellite system;
- means for receiving second present transceiver position data from said satellite system and for storing the same;
- means for receiving a second encrypted authorized user message from said satellite system; and
- means for authenticating said second authorized user message responsive to a second previous position data received from said satellite system.

32. The transceiver of claim 31, wherein said means for encrypting uses a first non-position element and said first previous transceiver position data, and wherein said means for decrypting uses a second non-position element and said second previous transceiver position data.

33. A system for communication of information between remote locations and a central location, said system comprising:
- a number of remote terminal means at said remote locations, said remote terminal means each being enabled to accept user input data and each being operatively connected to means for transmitting authorized user messages responsive to said user input data;
- a position determining system, comprising means for receiving said authorized user messages and for determining by triangulation from the differences in transmission time from the different remote locations the remote terminal location of a means transmitting the received authorized user message, means for appending the remote terminal location information indicative of the location of said remote terminal means to said authorized user message, and means for transmitting a composite signal of said authorized user message and said remote terminal location information; and
- central station means at said central location, said central station means comprising means for receiving said authorized user message transmitted by said position determining system, means for extracting said remote terminal location information from said authorized user message received from said position determining system, means for comparing said remote terminal position information to an authorized terminal position information key, and means for authenticating said authorized user message responsive to matching of the key information with the transmitted location information.

34. The system of claim 33, wherein said positioning determining system comprises a satellite system capable of determining the location of the transmitted messages from said remote locations and said remote terminal means further include means for encrypting said authorized user message prior to transmission thereof to said satellite system, and said central station means further comprises means for decrypting said encrypted authorized user message.

35. The system of claim 34, wherein said encryption is performed using position data indicative of the position of said remote terminal means, and said decryption is performed using either said authorized terminal position information or said terminal position information appended by said satellite system to said encrypted authorized user message.

36. The system of claim 34, wherein said authorized user message is encrypted using a non-position element, and is decrypted using said non-position element.

37. The system of claim 34, wherein said remote terminal means comprises means for encrypting said authorized user message using position information indicative of the location of said remote terminal and a non-position element, and said central station means comprises means for decrypting said encrypted authorized user message using said non-position element and either said authorized terminal position information or position data appended to said encrypted authorized user message by said satellite system.

38. The system of any one of claims 33-37, wherein said position determining system comprises at least three satellites and a control station.

39. A method of communication of information between remote terminal devices and a central processing station, said method comprising the steps of:
- at a remote terminal means, assembling an authorized user message;
- transmitting said authorized user message to a satellite system;
- at said satellite system, detecting by triangulation from the transmission time between the remote terminal devices over different paths to the satellite system the position of a transmitter from which said authorized user message has been received;
- combining the detected transmitter position data with said authorized user message and transmitting the combined signals;
- at said central station, extracting said transmitter position data from said combined signals;
- comparing said extracted transmitter position data to an authorized position data; and
- authenticating said authorized user message responsive to said comparison step when the detected position data corresponds to the authorized position data.

40. The method of claim 39, further comprising the steps of encrypting said authorized user message prior to transmission thereof and decrypting said authorized user message after authentication thereof.

41. The method of claim 40, wherein said encryption is performed using position data indicative of the location of said transmitter, and said decryption is performed using either said authorized position data or said extracted position data.

42. The method of claim 40, wherein said encryption is performed using a non-position element, and said decryption is performed using said non-position element.

43. The method of claim 40, wherein said encryption is performed using a non-position element and position data indicative of the location of said transmitter, and said decryption is performed using said non-position element and either said transmitter position data appended to said authorized user message by said satellite system or said authorized position data.

44. The method of any one of claims 39–43, wherein said satellite system is of the type comprising at least three satellites and a control station, and wherein said detection of the position of a transmitter is performed by comparison of the time taken by said authorized user messages to reach said satellites.

45. Method for transmitting data from a mobile transceiver having a previous location and a present location to a second location, comprising the steps of:
(a) at said present location:
  (1) receiving present transceiver position data with a satellite system in response to triangulation analysis of signals transmitted from a transmitter site over different communication paths;
  (2) storing a former said present transceiver position data to provide previous transceiver position data;
  (3) combining with a present authorized user message a stored previous transceiver position; and
  (4) transmitting said combined authorized user message;
(b) at said satellite system:
  (1) receiving said transmitted combined authorized user message;
  (2) further combining present transceiver position data to said combined authorized user message;
  (3) transmitting said authorized user message combined with said present transceiver position data; and
(c) at said remote location:
  (1) receiving said authorized user message together with said present transceiver position data;
  (2) storing said present transceiver position data to provide stored previous transceiver position data; and
  (3) authenticating said authorized user message using stored previous transceiver position data.

46. The method of claim 45, comprising the additional step of:
at said present transceiver location:
causing said satellite system to determine and transmit said present transceiver position data.

47. The method of claim 45, wherein said encryption step is additionally performed using a non-position element, and said decryption step is performed using said non-position element.

48. The method of any of claims 45–47, wherein said satellite system is of the type comprising at least three satellites and a control station, said satellite system comprising means for determining the position of the transceiver by comparison of the times taken for a said authorized user message to reach said satellites.

49. In a radio data transmission authentication system including a data message transmitter and data receiving station therefor, the improvement comprising:
an intermediate system adapted to detect by triangulation the location of said transmitter by receiving and timing data transmission messages transmitted by said transmitter over multiple paths to the intermediate system and to formulate a combined signal by combining with the data transmission signal a further signal representative of the detected location of the transmitter;
means for transmitting said combined signal indicative of the transmitter location on a common communication channel to said data receiving station; and
data authentication means at the data receiving station for receiving said combined signal and correlating said further signals representative of the location of the transmitter with a designated position of the transmitter to authentic transmitted data whereby unauthorized communications not sent from an actual authorized location are eliminated so that the authorized location only need be secured against unauthorized communications.

50. A data transmission authentication system, comprising in combination,
source means at a transmission location for introducing and transmitting a message over a communication channel,
message modification means for determining by means of messages transmitted over different paths using triangulation the transmission location and combining with said message for transmission therewith on the same channel a further message identifying the determined transmission location of the source means,
utilization means at a message reception station for receiving the combined message,
a common communication channel for transmitting the message combined with the further message to said utilization means,
authentication means at the message reception station for comparing the further message with locally derived source location data at the reception station, and
means qualifying said message for utilization by the utilization means only upon satisfactory comparison of the further message and the locally derived source location data to assure that the transmission came from its authorized source location.

51. The method of transmitting an authorized user message from a first location to a second location, comprising the steps of:
(a) transmitting the authorized user message from a transmitter at the first location,
(b) identifying the transmitter location from which the message was transmitted by triangulation analysis of the message transmitted over a plurality of paths,
(c) combining with the message an authenticating message derived from the location identified to provide a combined message transmitted over a common transmission channel,
(d) receiving the combined message at a reception station for utilizing the message contents,
(e) authenticating the message contents by verifying an authorized location of the source with the transmitted authenticating message, and
(f) securing the first location against the transmission of unauthorized messages.

* * * * *